United States Patent
Kastner et al.

(10) Patent No.: US 12,335,612 B1
(45) Date of Patent: Jun. 17, 2025

(54) SYSTEMS AND METHODS FOR MULTI-MODE IMAGE CAPTURE DEVICE OPERATION

(71) Applicant: Pano AI, Inc., San Francisco, CA (US)

(72) Inventors: Sonia Kastner, San Francisco, CA (US); Seva Safris, Las Vegas, NV (US); Kira Greco, San Francisco, CA (US); Sean Donohue, Bellingham, WA (US); Ryan McKenzie White, Menlo Park, CA (US)

(73) Assignee: Pano AI, Inc., San Francisco, CA (US)

( * ) Notice: Subject to any disclaimer, the term of this patent is extended or adjusted under 35 U.S.C. 154(b) by 0 days.

(21) Appl. No.: 18/635,789

(22) Filed: Apr. 15, 2024

(51) Int. Cl.
*H04N 23/667* (2023.01)
*H04N 23/61* (2023.01)
*H04N 23/62* (2023.01)
*H04N 23/66* (2023.01)
*H04N 23/69* (2023.01)

(52) U.S. Cl.
CPC .......... *H04N 23/667* (2023.01); *H04N 23/61* (2023.01); *H04N 23/62* (2023.01); *H04N 23/66* (2023.01); *H04N 23/69* (2023.01)

(58) Field of Classification Search
CPC ...... H04N 23/667; H04N 23/61; H04N 23/62; H04N 23/66; H04N 23/69
See application file for complete search history.

(56) References Cited

U.S. PATENT DOCUMENTS

| | | | | |
|---|---|---|---|---|
| 7,636,105 | B2* | 12/2009 | Sun | H04N 23/695 348/169 |
| 7,719,568 | B2* | 5/2010 | Hung | H04N 5/272 382/284 |
| 8,488,001 | B2* | 7/2013 | Mohanty | G08B 13/19643 348/143 |
| 10,979,645 | B2* | 4/2021 | Kim | H04N 17/002 |
| 11,153,495 | B2* | 10/2021 | Heo | H04N 5/2628 |
| 2010/0141767 | A1* | 6/2010 | Mohanty | G08B 13/19643 348/E5.024 |
| 2011/0310219 | A1* | 12/2011 | Kim | H04N 7/188 348/36 |
| 2012/0274776 | A1* | 11/2012 | Gupta | G08B 13/19641 382/103 |
| 2016/0065829 | A1* | 3/2016 | Kiso | H04N 23/662 348/211.3 |
| 2019/0306408 | A1* | 10/2019 | Hofer | H04N 23/90 |
| 2021/0368104 | A1* | 11/2021 | Bian | H04N 23/698 |
| 2024/0056686 | A1* | 2/2024 | Tsunashima | H04N 23/61 |

* cited by examiner

*Primary Examiner* — Boubacar Abdou Tchoussou
(74) *Attorney, Agent, or Firm* — Foley & Lardner LLP

(57) ABSTRACT

The technical solutions described herein are systems and methods for multi-mode image capture device operation. The system can obtain, from a first image capture device in accordance with a first mode, a first set of images corresponding to a first range of angles about an axis. The system can obtain, from a second image capture device in accordance with the first mode, a second set of images corresponding to a second range of angles about the axis. The system can cause, responsive to an interruption of the first mode, the second image capture device to obtain a third set of images corresponding to the first range of angles about the axis in accordance with a second mode.

20 Claims, 19 Drawing Sheets

SYSTEMS AND METHODS FOR MULTI-MODE IMAGE CAPTURE DEVICE OPERATION

BACKGROUND

Image capture systems can be used for a variety of applications, including monitoring and identification of events or incidents. Applications can extend to observation of incidents occurring over broad regions or areas. Collecting and processing captured images can be implemented using remote systems and functions, depending on the applications and design.

SUMMARY

The technical solutions of the present disclosure are directed to controlling modes of one or more image capture systems. For example, the present disclosure is directed to controlling modes of one or more image capture systems (for example, cameras) of a plurality of image capture systems based on interactions with user interfaces presenting images captured by the plurality of image capture systems. In particular, an incident monitoring system can be used to monitor incidents, such as forest fires, using cameras capturing images to generate panoramic images of the field of view of the cameras. In such configurations, cameras can continuously scan their respective predetermined portions of the field of view, capturing the images for generating the panoramic images. However, a user at a client device may desire to zoom one or more cameras onto a particular object or a location for a detailed look. In such instances, it may be challenging for the incident monitoring system to continue capturing images to generate a panoramic image, while simultaneously servicing the client device's request to zoom a camera onto a requested object or location. The technical solutions disclosed herein overcome these challenges by managing camera operating modes to configure a first camera of the plurality of cameras to capture a zoomed image of the object or location, while remaining cameras can take over the scanning operation of the first camera.

At least one aspect of the technical solutions is directed to a system. The system can include one or more processors coupled with memory. The one or more processors can be configured to obtain, from a first image capture device in accordance with a first mode, a first set of images corresponding to a first range of angles about an axis. The one or more processors can be configured to obtain, from a second image capture device in accordance with the first mode, a second set of images corresponding to a second range of angles about the axis. The one or more processors can be configured to cause, responsive to an interruption of the first mode, the second image capture device to obtain a third set of images corresponding to the first range of angles about the axis in accordance with a second mode.

The one or more processors can be configured to cause, responsive to the interruption of the first mode, the second image capture device to obtain the third set of images corresponding to the first range of angles about the axis and a fourth set of images corresponding to the second range of angles about the axis. To obtain the first set of images, the first image capture device can be configured to obtain images at a first zoom level. The one or more processors can be configured to receive a request to cause the first image capture device to obtain an image at a second zoom level. The one or more processors can be configured to interrupt the first mode responsive to the request.

The one or more processors can be configured to cause the interruption of the first mode responsive to receiving a request to cause the first image capture device to restrict the first image capture device from obtaining images in accordance with the first mode. To obtain the first set of images from the first image capture device in accordance with the first mode, the one or more processors can be configured to obtain each image of the first set of images in accordance with a timing schedule. The first image capture device can be configured to capture a first image of the first set of images corresponding to a first subset of the first range of angles at a first time corresponding to the timing schedule and a second image of the first set of images corresponding to a second subset of the first range of angles at a second time corresponding to the timing schedule. The first set of images can be obtained at a first time interval and the third set of images can be obtained at a second time interval subsequent to the first time interval.

The one or more processors can be configured to cause, on a user interface at a client device, presentation of the first set of images. The one or more processors can be configured to receive, from the client device, a request to initiate the second mode via the user interface. The one or more processors can be configured to interrupt the first mode responsive to the request to initiate the second mode.

The one or more processors can be configured to receive a request to obtain an image corresponding to a first angle about the axis. The one or more processors can be configured to determine that the first angle corresponds to the first range of angles of the first image capture system. The one or more processors can be configured to interrupt, responsive to the determination, the first mode according to which the first image capture device is obtaining images. The one or more processors can be configured to cause the first image capture device to obtain an image corresponding to the first angle.

The one or more processors can be configured to receive the request from a client device to obtain an image of an object identified within the first set of images. The one or more processors can be configured to determine a zoom setting according to which to obtain the image of the object. The one or more processors can be configured to transmit to the client device the image of the object captured according to the zoom setting.

At least one aspect of the technical solutions is directed to a method. The method can include obtaining, by one or more processors coupled with memory, from a first image capture device in accordance with a first mode, a first set of images corresponding to a first range of angles about an axis. The method can include obtaining, by the one or more processors, from a second image capture device in accordance with the first mode, a second set of images corresponding to a second range of angles about the axis. The method can include causing, by the one or more processors, responsive to an interruption of the first mode, the second image capture device to obtain a third set of images corresponding to the first range of angles about the axis in accordance with a second mode.

The method can include causing, by the one or more processors, responsive to the interruption of the first mode, the second image capture device to obtain the third set of images corresponding to the first range of angles about the axis and a fourth set of images corresponding to the second range of angles about the axis.

The method can include configuring, by the one or more processors, the first image capture device to obtain images at a first zoom level. The method can include configuring, by the one or more processors, to receive a request to cause the first image capture device to obtain an image at a second zoom level. The method can include interrupting, by the one or more processors, the first mode responsive to the request.

The method can include causing, by the one or more processors, the interruption of the first mode responsive to receiving a request to cause the first image capture device to restrict the first image capture device from obtaining images in accordance with the first mode.

The method can include configuring, by the one or more processors, the first image capture device to obtain each image of the first set of images in accordance with a timing schedule of the first mode. The first image capture device can be configured to capture a first image of the first set of images corresponding to a first subset of the first range of angles at a first time corresponding to the timing schedule and a second image of the first set of images corresponding to a second subset of the first range of angles at a second time corresponding to the timing schedule.

The method can include configuring, by the one or more processors, the first image capture device to obtain the first set of images at a first time interval. The method can include configuring, by the one or more processors, the second image capture device to obtain the third set of images at a second time interval subsequent to the first time interval.

The method can include causing, by the one or more processors, on a user interface at a client device, presentation of the first set of images. The method can include receiving, by the one or more processors, from the client device, a request to initiate the second mode via the user interface. The method can include interrupting, by the one or more processors, the first mode responsive to the request to initiate the second mode.

The method can include receiving, by the one or more processors, a request to obtain an image corresponding to a first angle about the axis. The method can include determining, by the one or more processors, that the first angle corresponds to the first range of angles of the first image capture system. The method can include interrupting, by the one or more processors, responsive to the determination, the first mode according to which the first image capture device is obtaining images. The method can include causing, by the one or more processors, the first image capture device to obtain an image corresponding to the first angle.

The method can include receiving, by the one or more processors, the request from a client device to obtain an image of an object identified within the first set of images. The method can include determining, by the one or more processors, a zoom setting according to which to obtain the image of the object. The method can include transmitting, by the one or more processors, to the client device the image of the object captured according to the zoom setting.

An aspect of the technical solutions is directed to a non-transitory computer readable medium storing instructions. The instructions can be such that, when executed by one or more processors, cause the one or more processors to obtain, from a first image capture device in accordance with a first mode, a first set of images corresponding to a first range of angles about an axis. The instructions can be such that, when executed by one or more processors, cause the one or more processors to obtain, from a second image capture device in accordance with the first mode, a second set of images corresponding to a second range of angles about the axis. The instructions can be such that, when executed by one or more processors, cause the one or more processors to cause, responsive to an interruption of the first mode, the second image capture device to obtain a third set of images corresponding to the first range of angles about the axis in accordance with a second mode.

The instructions can be such that, when executed by one or more processors, cause the one or more processors to cause, responsive to the interruption of the first mode, the second image capture device to obtain the third set of images corresponding to the first range of angles about the axis and a fourth set of images corresponding to the second range of angles about the axis. To obtain the first set of images, the first image capture device can be configured to obtain images at a first zoom level. The instructions can be such that, when executed by one or more processors, cause the one or more processors to receive a request to cause the first image capture device to obtain an image at a second zoom level. The instructions can be such that, when executed by one or more processors, cause the one or more processors to interrupt the first mode responsive to the request.

The instructions can be such that, when executed by one or more processors, cause the one or more processors to cause the interruption of the first mode responsive to receiving a request to cause the first image capture device to restrict the first image capture device from obtaining images in accordance with the first mode. To obtain the first set of images from the first image capture device in accordance with the first mode, the instructions can be such that, when executed by one or more processors, cause the one or more processors to obtain each image of the first set of images in accordance with a timing schedule. The first image capture device can be configured to capture a first image of the first set of images corresponding to a first subset of the first range of angles at a first time corresponding to the timing schedule and a second image of the first set of images corresponding to a second subset of the first range of angles at a second time corresponding to the timing schedule. The first set of images can be obtained at a first time interval and the third set of images can be obtained at a second time interval subsequent to the first time interval.

The instructions can be such that, when executed by one or more processors, cause the one or more processors to cause, on a user interface at a client device, presentation of the first set of images. The instructions can be such that, when executed by one or more processors, cause the one or more processors to receive, from the client device, a request to initiate the second mode via the user interface. The instructions can be such that, when executed by one or more processors, cause the one or more processors to interrupt the first mode responsive to the request to initiate the second mode.

The instructions can be such that, when executed by one or more processors, cause the one or more processors to receive a request to obtain an image corresponding to a first angle about the axis. The instructions can be such that, when executed by one or more processors, cause the one or more processors to determine that the first angle corresponds to the first range of angles of the first image capture system. The instructions can be such that, when executed by one or more processors, cause the one or more processors to interrupt, responsive to the determination, the first mode according to which the first image capture device is obtaining images. The instructions can be such that, when executed by one or more processors, cause the one or more processors to cause the first image capture device to obtain an image corresponding to the first angle.

The instructions can be such that, when executed by one or more processors, cause the one or more processors to receive the request from a client device to obtain an image of an object identified within the first set of images. The instructions can be such that, when executed by one or more processors, cause the one or more processors to determine a zoom setting according to which to obtain the image of the object. The instructions can be such that, when executed by one or more processors, cause the one or more processors to transmit to the client device the image of the object captured according to the zoom setting.

An aspect of the technical solutions is directed to a system. The system can include one or more processors coupled with memory. The one or more processors can identify a plurality of image capture systems capturing images over a range of angles about an axis. The plurality of image capture systems can include a first image capture device configured to capture images over a first part of the range of angles and a second image capture device configured to capture images over a second part of the range of angles. The one or more processors can receive a request to capture an image of an object at a first angle of the range of angles. The one or more processors can determine that the first angle corresponds to the first part of the range of angles of the first image capture system. The one or more processors can initiate, responsive to the request and the determination, control of the first image capture device to direct the first image capture device toward the object according to the first angle. The one or more processors can configure, responsive to the initiation, the second image capture device to capture images over the first part of the range of angles and the second part of the range of angles.

The one or more processors can adjust, responsive to the initiation, a zoom of the first image capture device according to an object in an image captured at the first angle. The one or more processors can identify, from the request, a distance between the object and the first image capture system. The one or more processors can adjust a zoom of the first camera according to the first angle and the distance. The one or more processors can determine that the first angle corresponds to the first range of angles of the first image capture system. The one or more processors can initiate the control of the first camera responsive to the determination.

At least one aspect of the technical solutions is directed to a method. The method can include identifying, by the one or more processors, a plurality of image capture systems capturing images over a range of angles about an axis. The plurality of image capture systems can include a first image capture device configured to capture images over a first part of the range of angles and a second image capture device configured to capture images over a second part of the range of angles. The method can include receiving, by the one or more processors, a request to capture an image of an object at a first angle of the range of angles. The method can include determining, by the one or more processors, that the first angle corresponds to the first part of the range of angles of the first image capture system. The method can include initiating, by the one or more processors, responsive to the request and the determination, control of the first image capture device to direct the first image capture device toward the object according to the first angle. The method can include configuring, by the one or more processors, responsive to the initiation, the second image capture device to capture images over the first part of the range of angles and the second part of the range of angles.

The method can include adjusting, by the one or more processors, responsive to the initiation, a zoom of the first image capture device according to an object in an image captured at the first angle. The method can include identifying, by the one or more processors, from the request, a distance between the object and the first image capture system. The method can include adjusting, by the one or more processors, a zoom of the first camera according to the first angle and the distance. The method can include determining, by the one or more processors, that the first angle corresponds to the first range of angles of the first image capture system. The method can include initiating, by the one or more processors, the control of the first camera responsive to the determination.

An aspect of the technical solutions is directed to a non-transitory computer readable medium storing instructions. The instructions can be such that, when executed by one or more processors, cause the one or more processors to identify a plurality of image capture systems capturing images over a range of angles about an axis. The plurality of image capture systems can include a first image capture device configured to capture images over a first part of the range of angles and a second image capture device configured to capture images over a second part of the range of angles. The instructions can be such that, when executed by one or more processors, cause the one or more processors to receive a request to capture an image of an object at a first angle of the range of angles. The instructions can be such that, when executed by one or more processors, cause the one or more processors to determine that the first angle corresponds to the first part of the range of angles of the first image capture system. The instructions can be such that, when executed by one or more processors, cause the one or more processors to initiate, responsive to the request and the determination, control of the first image capture device to direct the first image capture device toward the object according to the first angle. The instructions can be such that, when executed by one or more processors, cause the one or more processors to configure, responsive to the initiation, the second image capture device to capture images over the first part of the range of angles and the second part of the range of angles.

The instructions can be such that, when executed by one or more processors, cause the one or more processors to adjust, responsive to the initiation, a zoom of the first image capture device according to an object in an image captured at the first angle. The instructions can be such that, when executed by one or more processors, cause the one or more processors to identify, from the request, a distance between the object and the first image capture system. The instructions can be such that, when executed by one or more processors, cause the one or more processors to adjust a zoom of the first camera according to the first angle and the distance. The instructions can be such that, when executed by one or more processors, cause the one or more processors to determine that the first angle corresponds to the first range of angles of the first image capture system. The instructions can be such that, when executed by one or more processors, cause the one or more processors to initiate the control of the first camera responsive to the determination.

DETAILED DESCRIPTION

Figure 1A:
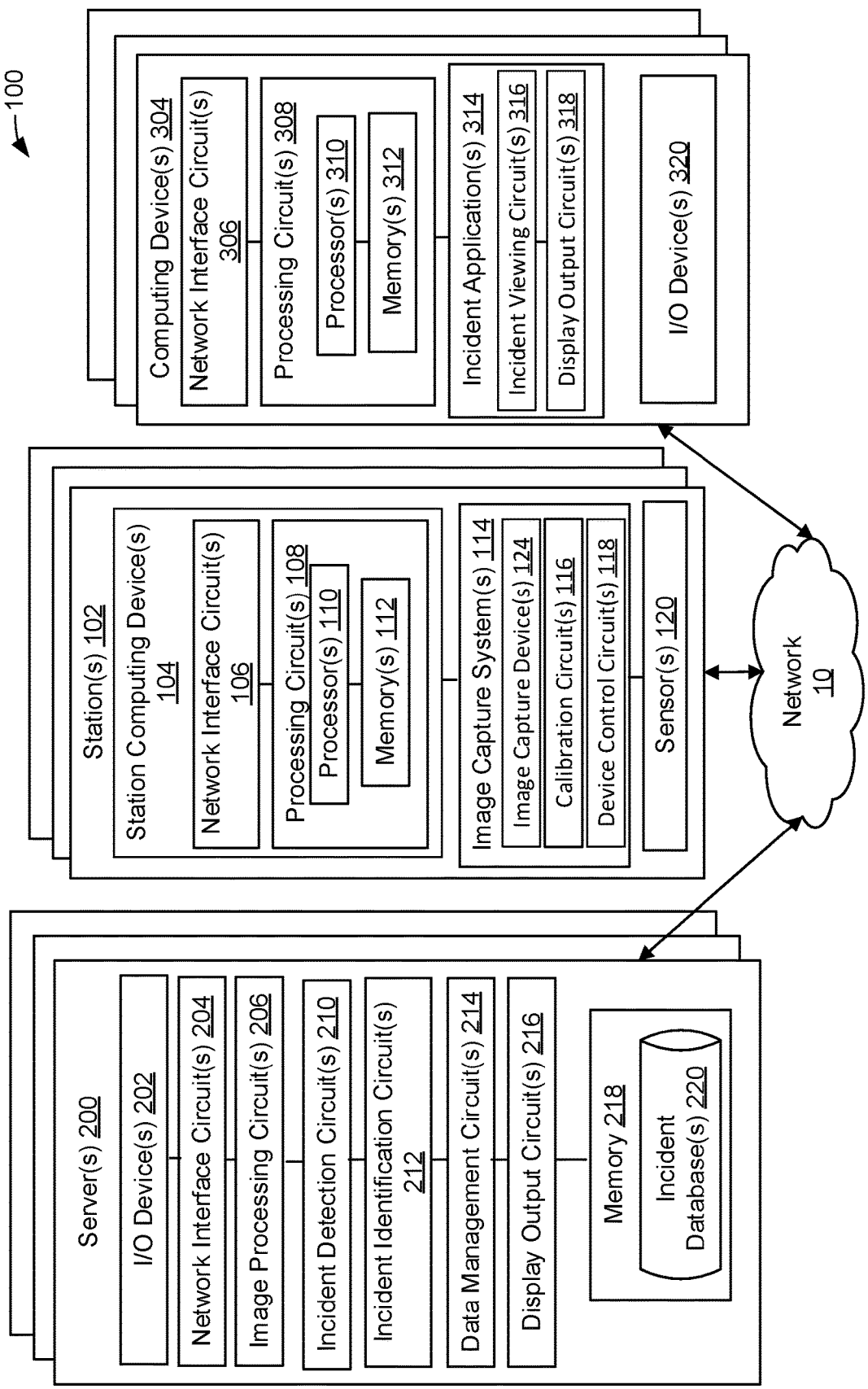
FIG. 1A is a schematic illustration of an incident detection system, according to an exemplary embodiment.

For purposes of reading the description of the various embodiments below, the following descriptions of the sections of the specification and their respective contents may be helpful:

Section A describes an overview of an incident detection system;

Section B describes calibration to reference direction of image capture systems of the incident detection system described in Section A;

Section C describes embodiments of image capture and time lapse panorama generation;

Section D describes embodiments of multi-mode image capture device operation; and Section E describes embodiments of a network environment and computing environment which may be useful for practicing embodiments described herein.

Referring to the figures generally, one or more systems and methods of controlling modes of one or more image capture systems are described herein. The system can include, manage, control, or communicate with a plurality of stations positioned at various geolocations positioned across a geographical area. Each station can include an image capture system configured to capture an image and one or more station computing devices configured to receive the image captured by the image capture system. Each image capture system includes one or more image capture devices configured to rotate about an axis. In some embodiments, each image capture device of the image capture system can be configured to capture images of the area surrounding the corresponding station. In some embodiments, each image capture device can be configured to capture images of a respective portion of the area. When the image capture system is operating in a first mode, each image capture device of the image capture system can be configured to capture images corresponding to the image capture device's respective portion of the area. However, the image capture system can be configured to operate in a second mode in which at least one of the image capture devices is configured to such that the image capture device may capture an image while one or more image capture devices are oriented in a desired direction. For example, the image capture system may be elevated above the ground such that the image capture system is configured to capture a portion of the horizon and the respective foreground. For example, according to various embodiments, the image capture system may capture a group of images that may be stitched together to create a composite image that shows a 360-degree view of the foreground surrounding the image capture system. According to various embodiments, the stations are configured to routinely (e.g., every one minute, every 10 minutes, etc.) capture the surrounding area such that the surrounding area can be monitored for incidents (e.g., smoke incidents, wildfires, landslides, car accidents, severe weather, theft, property damage, etc.), as discussed further herein.

Stations can monitor incidents of wildfires and facilitate timely identification and detection of the wildfires and corresponding smoke that includes greenhouse gases (GHGs) emitted into the atmosphere. The technical solutions can facilitate timely, prompt or streamlined detection of emission of GHGs so as to decrease the response time to the wildfires and limit emission of the GHG into the atmosphere. As smoke can release GHGs based on the size of the wildfire, the technical solutions can be directed to automated identification of wildfire incidents using the image-based scanning detection and recognition of smoke and fire objects from the generated images. Alerts or messages can be generated to notify various systems, such as emergency call centers, police and fire departments or user accounts of the identified fire locations to facilitate a prompt response and stopping of the wildfire spread.

As will be discussed further herein, the station computing device located at each station may associate one or more pieces of data (e.g., image attributes, metadata, etc.) with a given image or a group of images. For example, the station computing device may determine a relative angular orientation of the one or more image capture devices used to capture a given image. As is discussed further herein, each station may be calibrated such that the angular orientation of the one or more image capture devices is relative to a reference direction (e.g., north, south, east, west, etc.). For example, the station computing device may store a first angular orientation of a first image capture device, wherein the first angular orientation corresponds with north. In this example, when an image is captured by the first image capture device while the device is orientated in the first angular orientation, the station computing device may determine that a horizontal center of the image corresponds with the north direction. Thus, when an image is captured, the station computing device may associate data with the image that is indicative of the angular orientation of the image capture device relative to a reference direction such that a bearing of an object or a region of interest captured in the image relative to the image capture system may be subsequently determined, as is discussed further herein.

According to various embodiments, calibrating multiple image capture devices using the same reference direction, or a variant thereof (e.g., a first reference direction of north and a second reference direction of south), may facilitate identifying a location of an incident captured by multiple image capture devices, as is discussed further herein. For example, an incident detection system may determine a bearing of each image capture device relative to the same reference direction such that the geolocation of the incident captured by two different image capture systems may be estimated or determined. According to various embodiments, two different image capture devices may be orientated using different reference directions so long as those references directions have a direct relationship to one another (e.g., each of the cardinal directions are directly related to one another). It should be appreciated that orientating a first image capture device using a first reference direction and a second image capture device using a second reference direction may provide similar benefits so long as the first reference direction and the second reference direction are related to one another. For example, the first reference direction may be north and the second reference direction may be south. In this example embodiment, a first image capture device may be orientated using north as a reference direction while a second image capture device may be orientated using south as a reference directions. Since south is offset from north by 180 degrees, the second reference direction (e.g., south) may be used to determine the first reference direction (e.g., north).

According to various embodiments, images captured by the various stations, and data associated with the images, may be provided to a server for image processing. For example, the server may be configured to receive the images, maintain a database of the images, and provide one or more images and data associated with the image to a machine learning model trained to detect incidents within images. The machine learning model may be configured to identify a region of interest in an image that displays an incident. Once the region of interest is identified, the server may leverage the determined position of the region of interest within the image along with the angular orientation of the image capture device relative to the determined reference direction to determine a bearing (e.g., a direction of interest) of the incident relative to the respective image capture system. According to various example embodiments, the machine learning model may include a neural network, such as a deep convolution network used for object detection (e.g. a Faster Region Convolution Network (R-CNN)).

According to various embodiments, the incident detection system includes two or more stations configured to capture the same incident. For example, a plurality of stations may be distributed across a geographical area and the stations may be distributed such that most or all of the geographical area may be captured by two or more stations. For example, two or more stations may have a field of view overlap that covers a geographical area. When two or more image capture systems capture an incident in an image, which may be determined by the machine learning model, the server may leverage the location of the incident within each image and a geolocation of each of the stations to determine the bearing of the incident relative to the each of the respective image capture station to determine a geolocation of the incident, as will be discussed further herein. Thus, by leveraging a plurality of image capture stations distributed across a geographical area, the geographical area can be automatically monitored for incidents on a routine basis, thereby increasing the likelihood of early detection of a wildfire. Further, by automatically determining a geolocation of the incident, resources may be deployed to the geolocation immediately, thereby reducing the likelihood that the wildfire will continue to spread uncontrollably.

According to various embodiments, the server utilizes two or more machine learning models to identify incidents. For example, the server may receive a series of individual images taken over a time period. In this example, the series of images may be provided to a first machine learning model trained to detect incidents within images using a plurality of training images and each of the individual images may be provided to a second machine learning model trained to detect incidents within at least one of the sequence of images. As is discussed further below, discrepancies between the first model and the second model may be leveraged to train each model. Further, the first model and the second model may be leveraged to reduce the amount of data sent and/or received while monitoring geographical areas for incidents. For example, if the incident is only detectable in the series of images and not in an individual image, multiple images from the series may be provided to the computing device as a part of an alert. However, if a smoke event is detected by both the first model and the second model, just one individual image may be provided as a part of an alert to a computing device operated by a user of the system, thereby reducing the amount of data transmitted.

A. Overview of Incident Detection System

Referring now to FIG. 1, a schematic illustration of an incident detection system 100 is shown, according to an example embodiment. The incident detection system 100 (e.g., a smoke detection system, a fire detection system, landslide detection system, a car accident detection system, etc.) is configured to detect incidents via images captured from image capture systems in communication with the incident detection system. In some embodiments, the incident detection system 100 can be configured to detect smoke within one or more images and provide an alert in response to detecting the smoke according to embodiments of the present disclosure. By providing a timely alert for the smoke, the technical solutions can facilitate reduction of emission of greenhouse gases (GHGs) due to the wildfires.

As shown in FIG. 1, the incident detection system 100 includes one or more servers 200 communicably and operably coupled to one or more stations 102 and/or one or more computing devices 304 via a network 10. In some embodiments, the one or more servers 200, one or more stations 102 and/or one or more computing devices 304 are directly communicably coupled. In some embodiments, the components of the incident detection system 100 may be communicably and operatively coupled to each other over a network, such as network 10, that permits the direct or indirect exchange of data, values, instructions, messages, and the like (represented by the double-headed arrows in FIG. 1). The network 10 may include one or more of a Local Area Network ("LAN"), a wide area network ("WAN"), a wireless network, a satellite communication system, acellular network, the Internet, Wi-Fi, Wi-Max, a proprietary provider network, a proprietary retail or service provider network, and/or any other kind of wireless or wired network.

Each system or device in the incident detection system 100 may include one or more processors, memories, network interfaces and user interfaces. The memory may store programming logic that, when executed by the processor, controls the operation of the corresponding computing system or device. The memory may also store data in databases or data structures. For example, memory 218 may store programming logic that when executed by one or more processors within one of the processing circuits (e.g., image processing circuit(s) 206, incident detection circuit(s) 210, incident identification circuit(s) 212, data management circuit(s) 214, display output circuit(s) 216, etc.), causes incident database(s) 220 to update information with communications received from a station(s) 102 and/or computing device(s) 304. The network interfaces (e.g., network interface circuit 204) may allow the computing systems and devices to communicate wirelessly or otherwise. The various components of devices in the incident detection system 100 may be implemented via hardware (e.g., circuitry), software (e.g., executable code), or any combination thereof. Devices and components in FIG. 1A can be added, deleted, integrated, separated, and/or rearranged in various embodiments of the disclosure.

The stations 102 are positioned at various geolocations across a geographical area and are configured to capture images of the surrounding area, associate data (e.g., image attributes, metadata, etc.) with the images, and provide the images and data to the server 200 for further processing. As shown in FIG. 1, each station 102 includes a station computing device(s) 104 communicably and operatively coupled to an image capture system(s) 114 and one or more sensor(s) 120.

As shown, the station computing device 104 includes a network interface circuit 106 that may allow the station computing device 104 to communicate wirelessly or otherwise. The network interface circuit 106 includes program logic that facilitates connection of the station computing device 104 to the network 10. For example, the network interface circuit 106 may include any combination of a wireless network transceiver (e.g., a cellular modem, a Bluetooth transceiver, a Wi-Fi transceiver, etc.) and/or a wired network transceiver (e.g., an Ethernet transceiver). In some arrangements, the network interface circuit 106 includes the hardware and machine-readable media sufficient to support communication over multiple channels of data communication. Further, in some arrangements, the network interface circuit 106 includes cryptography capabilities to establish a secure or relatively secure communication session in which data communicated over the session is encrypted.

In some embodiments, the network interface circuit 106 can include a plurality of communication channels, ports, interfaces, or modules that enable the station computing device to communicate with the server 200 or other entities. The network interface circuit 106 can be configured to maintain two or more data or internet connections with the server 200 or other entities and can be configured to monitor each of the data or internet connections to determine which connection to use for data transmission. In some embodiments, the station computing device 104 can establish, maintain, or manage two or more cellular connections simultaneously via two or more subscriber identity module (SIM) cards that are coupled to the station computing device 104. In some embodiments, the network interface circuit 106 can be configured to monitor data transmission rates, error rates, or other metrics for each of the two or more cellular connections to select a cellular connection via which to transmit data. If the selected cellular connection fails to satisfy certain performance metrics, for instance, upload speed falling below a threshold limit, or data throughput falling below a threshold limit, the network interface circuit can select another cellular connection to be the cellular connection via which to transfer subsequent data. By maintaining multiple SIM card connections, the station computing device 104 can maintain network redundancy in the event that a first SIM card connection fails. In some embodiments, the SIM cards can belong to different network carriers such that if a first network carrier fails, the second SIM card belonging to a second network carrier can be used. In some embodiments, the one or more SIM cards are configured to communicate over a satellite communication system. It should be appreciated that the connection types can be cellular or non-cellular and the station computing device 104 can switch between a cellular connection and a non-cellular connection as well based on the network conditions of each type of connection.

As shown, the station computing device 104 includes a processing circuit 108 that includes one or more processors 110 coupled to one or more memories 112. The memory 112 may be one or more devices (e.g., RAM, ROM, Flash memory, hard disk storage) for storing data and/or computer code for completing and/or facilitating the various processes described herein. The memory 112 may be or include non-transient volatile memory, non-volatile memory, and non-transitory computer storage media. Memory 112 may include database components, object code components, script components, or any other type of information structure for supporting the various activities and information structures described herein. Memory 112 may be communicably coupled to the processor 110 and include computer code or instructions for executing one or more processes described herein. The processor 110 may be implemented as one or more application specific integrated circuits (ASICs), field programmable gate arrays (FPGAs), a group of processing components, or other suitable electronic processing components. As such, the station computing device 104 is configured to run a variety of application programs and store associated data in a database of the memory 112.

According to various embodiments, the memory 112 may store data associated with the station 102 and/or one or more station computing devices 104. For example, the memory 112 may store data such that the processor 110 may associate one or more pieces of data with subsequently captured images. For example, the memory 112 may store one or more indicators. According to various embodiments, the one or more indicators are added to the image as metadata. According to various embodiments, the one or more indicators may include a station identification indicator that is unique to the image capture system 114 and/or an image capture device identification indicator that is unique to the image capture device 124 used to capture the image. The one or more indicators may include a sequence indicator that is unique to a plurality of images (e.g., a sequence of images, a set of images, etc.). For example, some or all of the images captured in a sequence may include the same sequence indicator. The one or more indicators may include a time stamp indicator that indicates the time at which an individual image was captured or the times at which a plurality (e.g., sequence) of images were captured. The one or more indicators may include an image indictor that is unique to that image. The one or more indicators may include a device indicator that identifies the type of image capture device (e.g., make, model, image resolution, number of pixels in the horizontal direction, number of pixels in the vertical direction, the field of view of the device (e.g., epoch minutes and seconds), and/or any other attributes of the device) used to capture the image. The one or more indicators may include a geolocation indicator that indicates a geolocation (e.g., a latitude and/or a longitude) of the image capture device used to capture the image. The one or more indicators may include a structure indicator that indicates the type of structure the image capture device 124 is mounted to. The one or more indicators may include an elevation indicator that indicates the altitude of the image capture device 124 at the time the image was captured.

It should be appreciated that each indicator may also, or alternatively, be stored on one or more devices in the incident detection system 100. For example, a remote memory storage, such as cloud storage, the server 200, and/or the computing device 304 may store indicators associated with a specific station 102, image capture system 114, and/or a specific image capture device 124. In this example embodiment, the memory 112 of the station 102 may store a station identification indicator and/or one or more image capture device identification indicators and provide the station identification indicator and/or one or more image capture device identification indicators to another device along with an image or a plurality of images. The other device (e.g., the server 200, the computing device 304, etc.) may then retrieve other indicators (e.g., from local storage, from cloud storage, etc.) based on the station identification indicator and/or one or more image capture device identification indicators.

According to various embodiments, the processor 110 may generate metadata in response to an image being captured by the image capture system 114. For example, the station computing device 104 may be configured to determine a device angle of image capture device relative to an axis of rotation, a time at which the image was taken, etc. As is discussed further herein, this information may be stored as metadata within the image and utilized during various processes described herein.

As shown, the stations 102 each include an image capture system 114 configured to capture an image of an area near the image capture system 114. As shown, the image capture system 114 includes one or more image capture devices configured to capture an image of an area near the image capture system 114. The one or more image capture devices may include any type of camera, video camera, and/or any other optoelectronic component (e.g., a UV sensor/camera, an IR sensor/camera, etc.).

The image capture system 114 further includes a calibration circuit 116. The calibration circuit 116 may be used to determine a reference direction for use by the processing circuit 108, as is discussed further herein. The image capture system 114 further includes a device control circuit 118 that is configured to control the one or more image capture devices 124. For example, the device control circuit 118 may cause each of the image capture devices 124 to capture an image or a video and/or cause each of the image capture devices 124 to rotate about an axis, as is discussed further herein.

It should be appreciated that, according to some embodiments, the station computing devices 104 may be located apart from the image capture system 114. For example, the image capture system 114 may be elevated above the ground while the station computing device 104 may be located proximate the ground such that the station computing device 104 may be accessed by an operator while the operator is on the ground.

As shown, the station 102 includes one or more sensors 120. The one or more sensors 120 may be configured to detect local conditions proximate the station 102. For example, the one or more sensors 120 may include light sensors, noise sensors, weather sensors, wind sensors, pressure sensors, etc. According to various embodiments, one or more conditions detected by the one or more sensors 120 may be associated with an image captured by the image capture system 114 such that the data from the one or more sensors 120 may be provided to the server 200 along with one or more images captured by the image capture system 114.

According to various embodiments, the image capture device 124 can include or can be coupled to a mounting device configured to mount the image capture device to a structure, as is discussed further below. According to various embodiments, each image capture device 124 includes a housing. For example, the housing may reduce the risk of damage to the image capture device 124 (e.g., as a result of wind, rain, fire, falling debris, animal damage, etc.). According to various embodiments, each image capture device 124 may include a wiper configured to wipe (e.g., clear obstructions off) a lens and/or a housing of the image capture device 124.

As shown, the server 200 includes one or more input/output (I/O) device(s) 202, network interface circuit(s) 204, an image processing circuit(s) 206, incident identification circuit(s) 212, data management circuit(s) 214, and display output circuit(s) 216. Each of the one or more input/output (I/O) device(s) 202, network interface circuit(s) 204, an image processing circuit(s) 206, incident identification circuit(s) 212, data management circuit(s) 214, and/or display output circuit(s) 216 may include one or more processors coupled to one or more memories. The memory may be one or more devices (e.g., RAM, ROM, Flash memory, hard disk storage) for storing data and/or computer code for completing and/or facilitating the various processes described herein. The memory may be or include non-transient volatile memory, non-volatile memory, and non-transitory computer storage media. Memory may include database components, object code components, script components, or any other type of information structure for supporting the various activities and information structures described herein. Memory may be communicably coupled to the processor and include computer code or instructions for executing one or more processes described herein. The processor may be implemented as one or more application specific integrated circuits (ASICs), field programmable gate arrays (FPGAs), a group of processing components, or other suitable electronic processing components. As such, each of the circuits included as a part of the server 200 are configured to run a variety of application programs and store associated data in a database of the memory.

In some embodiments, the input/output device 202 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 202 may provide an interface for the user to interact with various applications stored on the server 200. For example, the input/output device 202 includes a keyboard, a keypad, a mouse, joystick, a touch screen, a microphone, a camera device, a biometric device, a virtual reality headset, smart glasses, and the like. As another example, input/output device 202, may include, but is not limited to, a television monitor, a computer monitor, a printer, a facsimile, a speaker, and so on.

As shown, the server 200 includes a network interface circuit 204 that may allow the server 200 to communicate wirelessly or via wired communication. The network interface circuit 204 includes program logic that facilitates connection of the server 200 to the network 10. For example, the network interface circuit 204 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface circuit 204 includes the hardware and machine-readable media sufficient to support communication over multiple channels of data communication. Further, in some arrangements, the network interface circuit 204 includes cryptography capabilities to establish a secure or relatively secure communication session in which data communicated over the session is encrypted.

According to various embodiments, the server may receive data or other information from third parties. For example, the network interface circuit 106 may facilitate receive information from third party sources. For example, as is discussed further herein, the sever 200 may interact with one or more third party websites, extract data or other information from the third party websites, and associate the data or other information with one or more images received from the station 102. For example, the server 200 may access a website that publishes locations (e.g., GPS coordinates) and/or times (e.g., date, local time, etc.) of controlled burns and associate that information with one or more images that capture the controlled burn.

As shown, the server 200 includes an image processing circuit 206. The image processing circuit 206 is configured to manipulate one or more images. For example, the image processing circuit 206 may receive a plurality of images from a first station 102 and combine the plurality of images into a single image (e.g., a composite image). For example, according to various embodiments, the first station 102 captures a plurality of images representing a panoramic view (e.g., a 360 degree field of view, a 270 degree field of view, a 180 degree field of view, etc.) surrounding the station 102 and provides the plurality of images to the image processing circuit 206 such that the image processing circuit 206 may stitch together the plurality of images to create a single composite image (e.g., a 360 degree field of view, a 270 degree field of view, a 180 degree field of view, etc.).

As shown, the server 200 includes an incident detection circuit 210. As discussed further herein, the incident detection circuit 210 is configured to detect an incident (e.g., smoke, fire, etc.) within an image and/or a plurality of images. For example, the incident detection circuit 210 may include one or more machine learning models trained to detect an incident (e.g., smoke) within an image. For example, the incident detection circuit may include a first machine learning model trained to detect incidents within images using a plurality of training images and a second machine learning model trained to detect incidents within at least one of the sequence of images. As is discussed further below, discrepancies between the first model and the second model may be leveraged to train each model. It should be appreciated that the computing device 304 may include a similar incident detection circuit 210 such that the first machine learning model and/or the second machine learning model may be trained and/or executed on the computing device 304.

According to various embodiments, the incident detection circuit 210 is configured to receive one or more inputs that indicate the location of an incident in an image. For example, a user of the server 200 may review images from an image capture system 114. The user may provide an indication of the incident in one or more images that captured an incident. Additionally or alternatively, a user of the computing device 304 (e.g., via the incident application 314) may provide indications of incidents in images provided to the computing device 304. The image and/or corresponding indication of the incident may then be provided to the server 200.

As shown, the server 200 includes an incident identification circuit 212. The incident identification circuit 212 is configured to receive images from two or more stations, wherein the images capture an incident, and determine a geolocation or an approximate geolocation of the incident based on the images received and data associated with the images, as is discussed further herein.

As shown, the server 200 includes a data management circuit 214. The data management circuit 214 is configured to reduce the amount of data transmitted from the server 200 to other components of the incident detection system 100. For example, as discussed herein, the server may leverage two different machine learning models to detect an incident. The data management circuit 214 may leverage the predictions output by the models to reduce the amount of data from the server 200 to other components of the incident detection system 100.

Further, the data management circuit 214 is configured to write, store, organize, and/or control access to data stored on the server. For example, the data management circuit 214 may be configured to organize data within various folders. Further, the data management circuit may be configured to store and delete data from the server 200. For example, after a predetermined period of time has passed, an image may be deleted by the data management circuit 214. Further, the data management circuit 214 may be configured to control access to the data. For example, a first type of user account may access individual (e.g., constituent) images while a second type of user account may access composite images.

As shown, the server 200 includes a display output circuit 216. The display output circuit 216 is configured to generate a graphical user interface (GUI) that includes an image and/or a plurality of images and various information related to that image or the plurality of images. For example, as is discussed further herein, the display output circuit 216 may generate a GUI that includes an image, a bearing corresponding with the image, a compass, and/or a map overly that shows the location of an incident on a map. According to various embodiment, the display generated by the display output circuit 216 may be provided to and/or retrieved by an incident application 314 on one or more computing devices 304, as is discussed further herein. According to various embodiments, the display output circuit 216 can communicate with a remote device (e.g., the computing device 304) and cause the graphical user interface to be displayed on a display of the remote device.

As shown, the server 200 includes a memory 218 including one or more incident databases 220. The memory 218 may be one or more devices (e.g., RAM, ROM, Flash memory, hard disk storage) for storing data and/or computer code for completing and/or facilitating the various processes described herein. The memory 218 may be or include non-transient volatile memory, non-volatile memory, and non-transitory computer storage media. Memory 218 may include database components, object code components, script components, or any other type of information structure for supporting the various activities and information structures described herein. Memory 218 may be communicably coupled to the processor and include computer code or instructions for executing one or more processes described herein. The one or more incident databases 220 may store images received from the stations 102 and/or any other data associated with the images received from the stations 102. Further, the one or more incident databases 220 may store displays and/or graphical user interfaces (GUI) output by the display output circuit 216 as is discussed further herein. Furthermore, the one or more incident databases 220 may store training data for the one or more models.

The input/output device 202 is configured to receive communications from and provide communications to a user associated with the server 200. The input/output device 202 is configured to exchange data, communications, instructions, etc. with an input/output component of the server 200. In one embodiment, the input/output device 202 includes communication circuitry for facilitating the exchange of data, values, messages, and the like between the input/output device 202 and the components of the incident detection system 100. In yet another embodiment, the input/output device 202 includes machine-readable media for facilitating the exchange of information between the input/output device and the components of the incident detection system 100. In yet another embodiment, the input/output device 202 includes any combination of hardware components, communication circuitry, and machine-readable media.

As shown, the computing device(s) 304 includes a network interface circuit 306 may allow the station computing device 104 to communicate wirelessly or otherwise. The network interface circuit 306 includes program logic that facilitates connection of the computing device 304 to the network 10. For example, the network interface circuit 306 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface circuit 306 includes the hardware and machine-readable media sufficient to support communication over multiple channels of data communication. Further, in some arrangements, the network interface 306 includes cryptography capabilities to establish a secure or relatively secure communication session in which data communicated over the session is encrypted.

As shown, the computing device(s) 304 includes a processing circuit 308 that includes one or more processors 310 coupled to one or more memories 312. The memory 312 may be one or more devices (e.g., RAM, ROM, Flash memory, hard disk storage) for storing data and/or computer code for completing and/or facilitating the various processes described herein. The memory 312 may be or include non-transitory volatile memory, non-volatile memory, and non-transitory computer storage media. Memory 312 may include database components, object code components, script components, or any other type of information structure for supporting the various activities and information structures described herein. Memory 312 may be communicably coupled to the processor 310 and include computer code or instructions for executing one or more processes described herein. The processor 310 may be implemented as one or more application specific integrated circuits (ASICs), field programmable gate arrays (FPGAs), a group of processing components, or other suitable electronic processing components. As such, the station computing device 304 is configured to run a variety of application programs and store associated data in a database of the memory 312.

As shown, the computing device 304 includes an incident application 314. The incident application 314 is configured to enable a user of the computing device 304 to communicate with one or more components of the incident detection system 100. For example, the incident application 314 is shown to include an incident viewing circuit 316 configured to retrieve and/or receive displays (e.g., GUIs) generated by the display output circuit 216 for viewing and interaction on the computing device 304. For example, upon detection of an incident (e.g., smoke), the server 200 may generate an interactive time-lapse display. A user of the computing device 304 may retrieve this display from the incident database 220 and interact with the display, as is discussed further herein. Further, the incident application 314 may include a display output circuit 318, which may generate displays using images and/or data stored in the incident database 220 in a similar manner as the display output circuit 216. According to various embodiments, the incident application 314 is configured to run as a native application, a web application, a mobile application, a web application, hybrid applications, etc. According to various embodiments, the display output circuit 216 is configured to run a player configured to display images and/or videos. As is discussed further herein, the player may receive partial images and/or constituent images and create a display. According to various embodiments, the incident application 314 is configured to cause the display to be presented as a responsive web (e.g., creates dynamic changes to the appearance of a website, depending on the screen size and orientation of the device being used to view it).

According to various embodiments, the incident application 314 is configured to receive one or more inputs that indicate the location of an incident in an image. For example, a user of the incident application 314 may review images from an image capture system 114. The user may provide an indication of the incident in one or more images that captured an incident. Additionally or alternatively, a user of the incident application (e.g., via the incident application 314) may provide multiple indications of multiple incidents in an image provided to the computing device 304. The image and/or corresponding indication of the incident may then be provided to the server 200.

The input/output device 320 is configured to receive communications from and provide communications to a user associated with the computing device 304. The input/output device 320 is configured to exchange data, communications, instructions, etc. with an input/output component of the computing device 304. In one embodiment, the input/output device 320 includes communication circuitry for facilitating the exchange of data, values, messages, and the like between the input/output device 320 and the components of the incident detection system 100. In yet another embodiment, the input/output device 320 includes machine-readable media for facilitating the exchange of information between the input/output device and the components of the incident detection system 100. In yet another embodiment, the input/output device 320 includes any combination of hardware components, communication circuitry, and machine-readable media.

In some embodiments, the input/output device 320 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 320 may provide an interface for the user to interact with various applications stored on the computing device 304. For example, the input/output device 320 includes a keyboard, a keypad, a mouse, joystick, a touch screen, a microphone, a camera device, a biometric device, a virtual reality headset, smart glasses, and the like. As another example, input/output device 320, may include, but is not limited to, a television monitor, a computer monitor, a printer, a facsimile, a speaker, and so on.

Figure 1B:
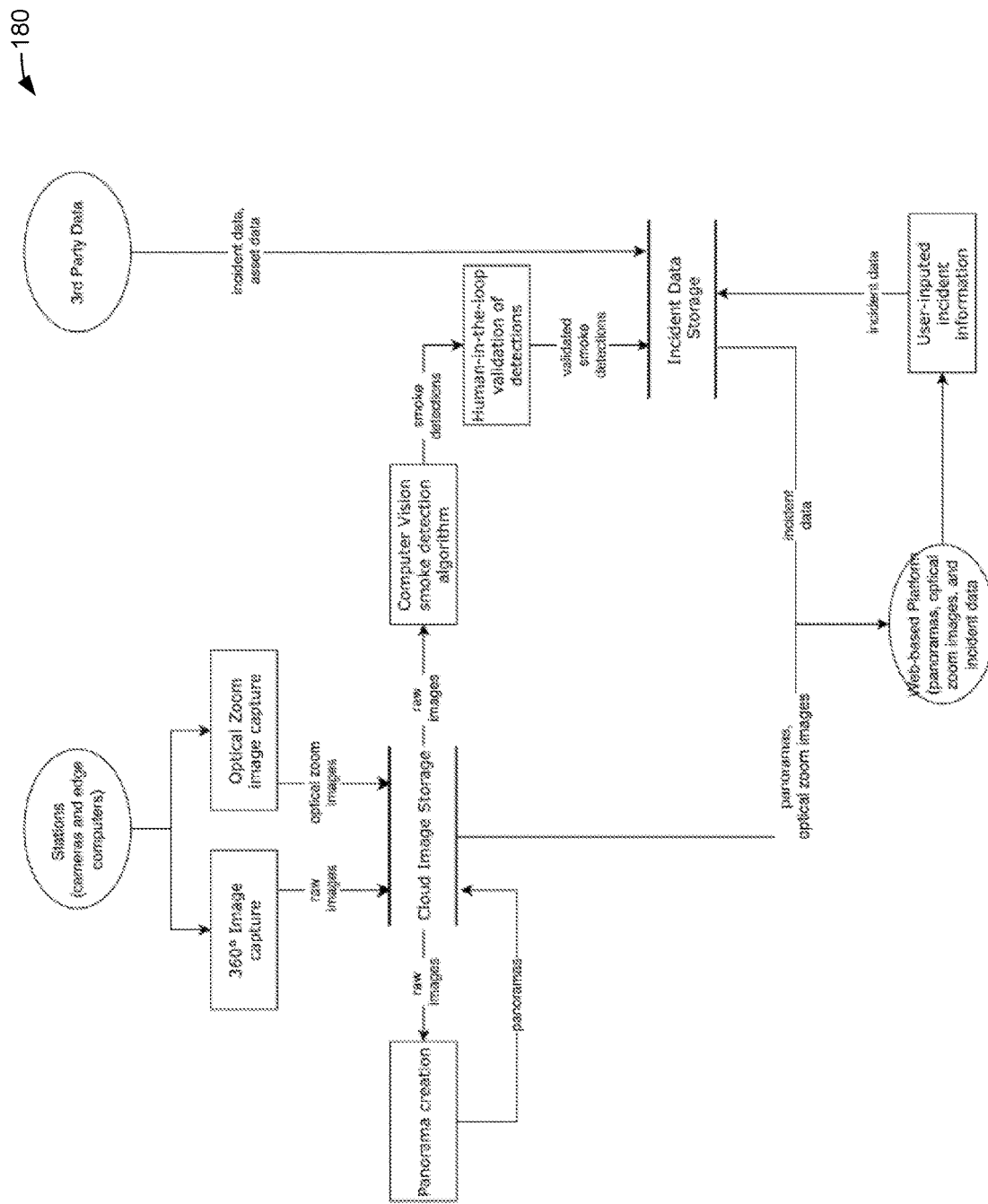
FIG. 1B is a flow chart for a method of maintaining an incident data storage database, according to an exemplary embodiment.

Referring now to FIG. 1B, a flow chart for a method of maintaining an incident data storage database 180 is shown, according to an example embodiment. The method 180 may be performed using one or more systems described herein (e.g., the incident detection system 100). Additionally, various processes described herein may involve some or all of the method 180. It should be appreciated that the method 180 need not be performed in the order shown. Further, one or more of the shown steps/processes may be omitted. Furthermore, one or more steps/processes may be added to the method 180.

The method 180 includes capturing one or more images at a station (e.g., the station 120). For example, an image capture device may capture an image of some or all of the area surrounding the station. According to various embodiments, the image capture device may rotate about an axis to capture a plurality of images which may later be stitched together to create a composite panoramic image (e.g., having a 360 degree field of view, a 180 degree field of view, etc.). Further, the image capture device may include an zoom, for example, optical zoom, feature. In this example embodiment, the image capture device may take a plurality of images at different zoom levels. For example, if an incident is able to be captured by the image capture device, zooming in and capturing the incident may result in more accurate incident detection via a model trained to detect incidents.

Images captured by the image capture devices at each station are then provided to a storage device. For example, the storage device may be included as a part the server 200. Additionally or alternatively, the storage device may include cloud storage. According to various embodiments, the cloud storage is operated by a third party.

As discussed further herein, the images stored in the storage device may be accessed by one or more devices. For example, the raw images may accessed by the server 200 and/or the computing device 304. According to various embodiments, the images are stitched together to create composite (e.g., panoramic) images. The composite images may then be provided to the image storage device such that the composite images may be accessed by one or more devices. According to various embodiments, the raw images, the optical zoom images, and/or the composite images may be accessed by the one or more devices via a web based platform. According to various embodiments, the images may be tagged with incident data by a user of the computing device. For example, a user of the computing device may indicate that an incident is shown in one or more images. The user of the computing device may further indicate the location of the incident within the image. According to various embodiments, this incident data may be provided to and stored within an incident data storage database.

As is discussed further herein, the images may be provided to one or more models trained to detect incidents in an image and/or in a plurality of images. According to various embodiments, the raw images and/or the composite images may be provided to the one or more models. The model(s) may then detect an incident (e.g., smoke, landslide, car accident, tornado, etc.) and an alert may be provided to one or more computing devices. According to various embodiments, the alert may include one or more of the image(s) that an incident was detected within. The incident may then be confirmed by a user of the computer device that received the alert. For example, the user of the computing device (e.g., the computing device 304) may manually review one or more images that an incident was detected in and confirm that there is an incident in the image or indicate that no incident is shown in the image. According to various embodiments, the user's indication of an incident being present or not being present may be converted to incident data and stored with the one or more images and stored in an incident data storage database.

According to various embodiments, the images may be provided to one or more computing devices 304 at a remote location. For example, one or more user accounts associated with a computing device 304 may be able to access constituent images from one or more image capture systems 114. A user of the computing device 304 may interact with the image and indicate a location of an incident or multiple locations or incidents within the image. The computing device 304 may then provide the image and/or the indication of the incident within the image to the server 200.

According to various embodiments, third party data may be stored in the incident data storage database. The third party data may further be associated with one or more images. The third party data may be provided to the model(s) trained to detect incidents to further train the model(s).

Figure 2:
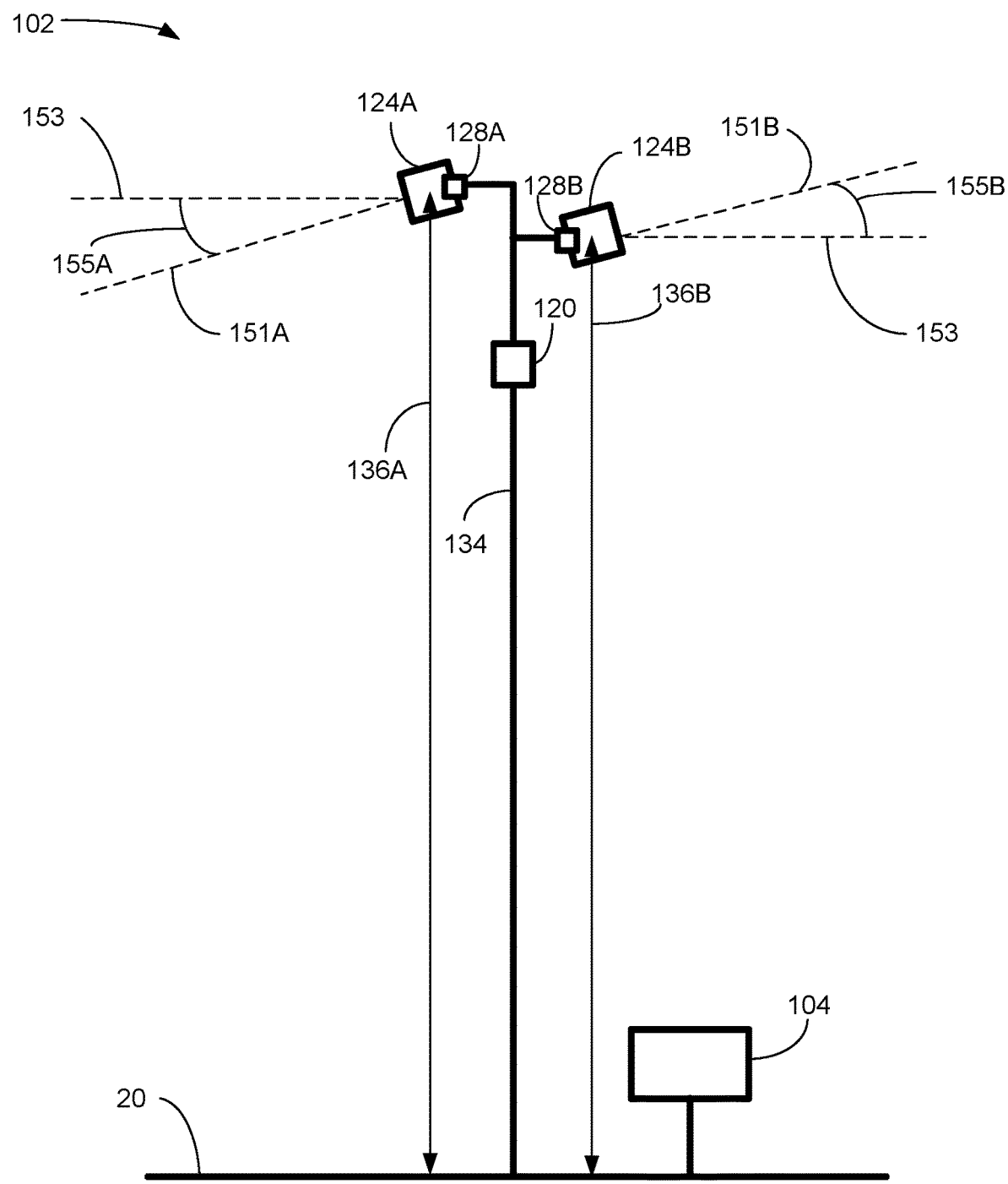
FIG. 2 is a side schematic view of a station, according to an exemplary embodiment.

B. Calibration to Reference Direction of Image Capture Systems of Incident Detection System Referring now to FIG. 2, a side schematic view of the station 102 is shown, according to an example embodiment. As shown, the station 102 includes the one or more image capture devices 124A, 124B coupled to a support 134, the station computing device 104, the one or more sensors 120, and a device adjustment mechanism 128A, 128B (e.g., a leveling adjustment mechanism) coupled to each image capture device 124A, 124B.

As shown, the station 102 includes a first image capture device 124A and a second image capture device 124B coupled to a support 134. As shown, the first image capture device 124A is a first height 136A off a ground 20 and the second image capture device 124B is a second height 136B off the ground 20. As shown, the first height 136A and the second height 136B need not necessarily be the same. Further, according to various embodiments, the first height 136A and/or the second height 136B may be individually adjustable. For example, the height of each image capture device 124 may be adjusted to increase the total field of view of the image capture device 124 (e.g., by avoiding obstructions in the field of view).

According to various embodiments, the support 134 may include an existing structure such that a new support 134 does not need to be built. For example, the support 134 may include a cell tower, a telephone pole, a tree, a lookout tower, a weather station, etc.). In this sense, the image capture devices 124 may include a mounting device (e.g., included in the adjustment mechanism 128) that allows the image capture device 124 to be coupled to a number of different types of supports 134.

As shown, the first image capture device 124A includes a first line of sight 151A. The line of sight 151A corresponds with the vertical angle the image capture device 124A is orientated (e.g., relative to a horizontal sight line 153 that is parallel to the ground 20). For example, according to various embodiments, the first line of sight 151A corresponds with a horizontal midline (e.g., the horizontal center 410 shown in FIG. 3) of an image captured by the image capture device 124A, as is discussed further herein. As shown, the first line of sight 151A defines a first vertical device angle 155A with respect to the horizontal sight line 153. Similarly, the second line of sight 151B defines a second vertical device angle 155B with respect to the horizontal sight line 153.

As shown, the station 102 includes a first device adjustment mechanism 128A coupled to the first image capture device 124A. The first device adjustment mechanism 128A is configured to adjust the first vertical device angle 155A. For example, the first device adjustment mechanism 128A may include an actuator (e.g., a servo motor) configured to adjust the first vertical device angle 155A. Alternatively or additionally, the first image capture device 124A may be configured to receive a level device such that the first device adjustment mechanism 128A may be utilized to adjust first vertical device angle 155A until the first image capture device 124A is level or approximately level (e.g., +/−0.1 degrees). For example, the device adjustment mechanism 128A may include one or more bolts or screws configured to alter the first vertical device angle 155A. Similarly, the second image capture device 124B is coupled to a second device adjustment mechanism 128B configured to adjust the second vertical device angle 155B.

The appropriate vertical camera angle 155 may vary by station 102. For example, depending on the surroundings, each image capture device 124 may have a desirable vertical device angle 155 that increases the amount of viewable foreground surrounding the station 102. For example, according to various embodiments, the vertical device angle 155 may be adjusted using the device adjustment mechanism 128A until approximately 0 degrees (e.g., +/−0.1 degrees). Similarly, the second image capture device 124B includes a second device adjustment mechanism 128B configured to adjust the second vertical device angle 155B.

According to various embodiments, each device adjustment mechanism 128 may include a horizontal angle adjustment mechanism that enables rotation of the image capture device 124 about an axis, as is discussed further herein. For example, the device control circuit 118 may cause the image capture device 124 to rotate about the axis. For example, each image capture device 124 may rotate 180 degrees or more about the axis such that the image capture system 114 is able to capture a plurality of images that represent a panoramic view (e.g., a 360 degree field of view, a 270 degree field of view, a 180 degree field of view, etc.) surrounding the station 102.

Figure 3:
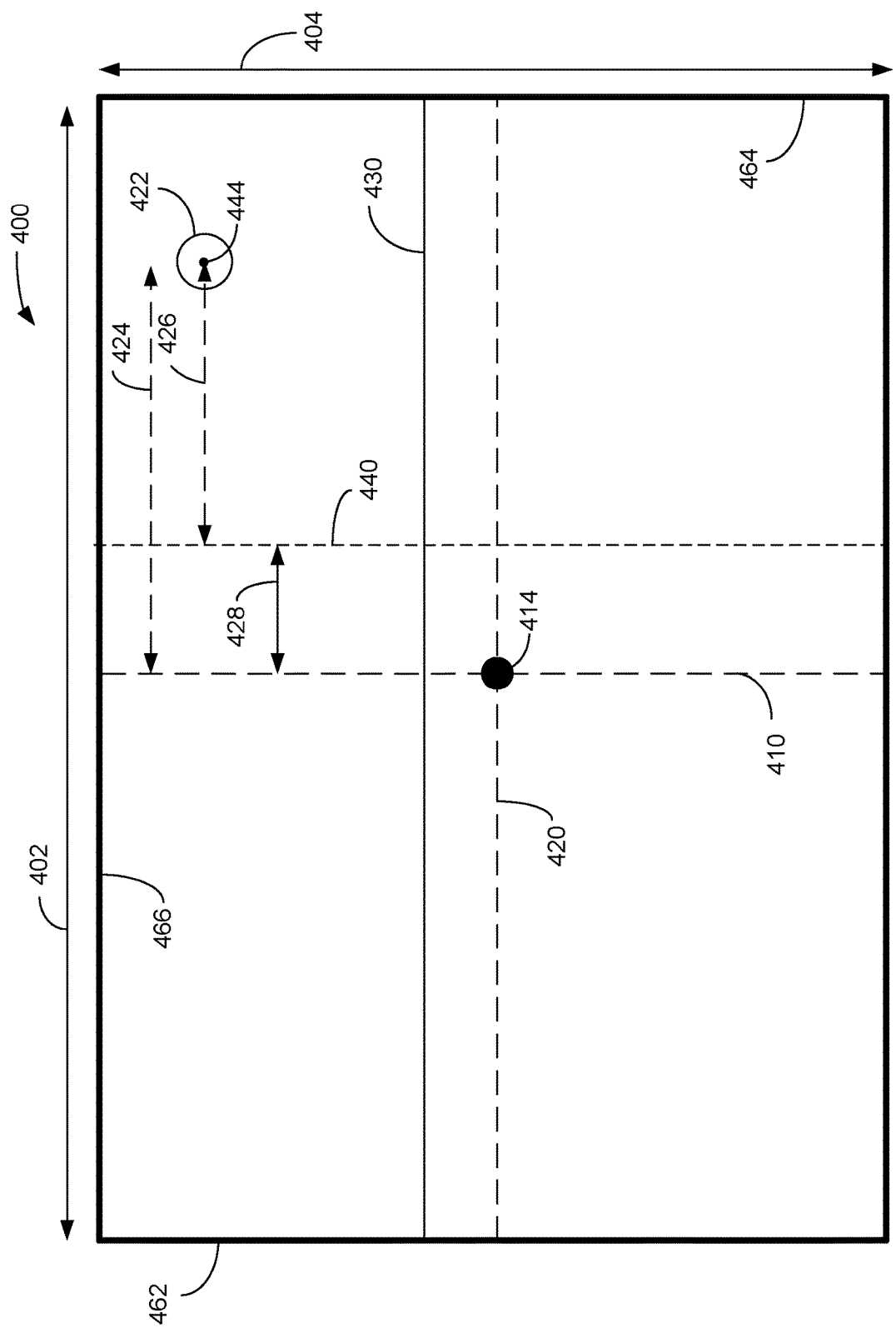
FIG. 3 is a schematic view of an image, according to an exemplary embodiment.

Referring now to FIG. 3, a schematic view of an image 400 is shown, according to an example embodiment. The image 400 may have been captured by an image capture system 114. The image 400 may be utilized for determining a reference direction 440 (e.g., via the calibration circuit 116). For example, the image 400 may be utilized during the method of determining a reference direction 500 described below with respect to FIG. 4.

As shown, the image 400 is defined by a width 402 and height 404. Collectively, the width 402 and the height 404 define the field of view of the image capture device 124 while the image capture device 124 is in a fixed orientation (e.g., the device angle is fixed). As shown, the width 402 extends from a first edge 462 to a second edge 464. According to various embodiments, the first edge 462 may be correspond with a first angle and the second edge 464 may correspond with a second angle, such that the horizontal field of view spans from the first angle to the second angle.

According to various embodiments, the image 400 is a digital image including a plurality of pixels. In this example embodiment, the width 402 and the height 404 may be represented using a number of pixels (e.g., the number of pixels spanning the image 400 in the horizontal direction and the vertical direction, respectively). Thus, a horizontal center 410 and a vertical center 420 may be determined (e.g., via the station computing device 104) based on the number of pixel spanning the image 400 horizontally and vertically. The horizontal center 410 and the vertical center 420 intersect at a center 414 of the image 400. According to various embodiments, the location of the vertical center 420 relative to the foreground may be adjusted (e.g., leveled) by adjusting the vertical device angle 155 (see FIG. 2) via the device adjust mechanism 128. According to various embodiments, the vertical center 420 may be adjusted to be below a horizon 430 to increase the amount of foreground visible within the image 400.

As is discussed further herein, the reference direction 440 may be determined (e.g., via the station computing device 104, the server 200, etc.) in part by identifying an object of interest 422 (e.g., a celestial object, a landmark, etc.). For example, an image capture device 124 may be coupled to a support 134 such that the reference direction 440 is within the field of view (e.g., between the first edge 462 and the second edge 464). For example, the reference direction 440 may be north. In this example, as the image capture device 124 is installed, the image capture device 124 may generally be aimed north when installed. For example, a compass may be referenced while installing the image capture device 124 to aim the image capture device 124 in the north direction. Further, in embodiments wherein the image capture device 124 may rotate about an axis between about a range of angles, the horizontal center 410 of the image capture device 124 is generally orientated towards the reference direction (e.g., north) while the device angle is generally centered within the range of angles.

After the image capture device 124 is installed, the image 400 may be taken while the image capture device 124 is set at a first device angle. An object of interest 422 may be identified in the image 400. For example, the object of interest 422 may be manually selected within image 400 via the station computing device 104. Alternatively, object detection software (e.g., a machine learning model trained to identify the object of interest 422) may be utilized by the station computing device 104 to identify the object of interest 422 within the image 400. As is discussed further below, a pixel coordinate 444 is assigned to the object of interest (e.g., via the station computing system 104). The pixel coordinate 444 generally includes a horizontal coordinate and a vertical coordinate that corresponds with a number of pixels between the horizontal edges 462, 464, a vertical edge 466, and the object of interest 422 (e.g., the center pixel of the object of interest 422).

As is discussed further herein, an expected bearing 426 of the object of interest 422 (e.g., with respect to the reference direction 440) may be determined based on the object of interest 422, the geolocation of the image capture device 124, and/or the time the image 400 was captured. For example, if the object of interest 422 is a celestial object (e.g., the sun, the moon, a star, etc.), the expected bearing 426 of the object of interest 422 (e.g., with respect to the reference direction 440) may be determined based on the object of interest 422, the geolocation of the image capture device 124, and the time (e.g., date, local time, etc.) the image 400 was captured. In another example embodiment, if the object of interest 422 is a landmark, the expected bearing 426 of the object of interest 422 (e.g., with respect to the reference direction 440) may be determined based on the object of interest 422 and the geolocation of the image capture device 124 without the time the image was captured. It should be appreciated that, according to various embodiments, identifying the reference direction 440) using a celestial object (e.g., the sun, the moon, a star, a consolation, etc.) or a landmark (e.g., a mountain peak, a building, a body of water, etc.) may be more accurate than determine a reference direction based on a compass.

As shown, the expected bearing 426 corresponds with the number of pixels (e.g., in the horizontal direction) between the pixel coordinate 444 and the reference direction 440. Thus, the reference direction 440 may be determined by converting (e.g., via the station computing device 104) the expected bearing 426 to a number of pixels and determining the reference direction using the number of pixels and the pixel coordinate 444.

The image capture system 114 may be calibrated such that the bearing of any object or incident identified in an image may be determined with reference to the reference direction 440. For example, a first angle 424 may be determined by counting the number of pixels between the horizontal center 410 and the pixel coordinate 444 and converting the number of pixels to the first angle. A second angle 428 (e.g., an offset angle) may be determined based on the difference between the first angle 424 and the expected bearing 426. The second angle 428 may then be used as an angular offset from the horizontal center 410 in images subsequently taken to ensure that bearings are determined with respect to the same reference direction 440. According to various embodiments, two or more image capture systems 114 located at various geolocations may all be calibrated to use the same reference direction 440 when determining the bearing of an object or incident in an image.

According to various embodiments, the first angle 424, the expected bearing 426, and/or the second bearing 428 may be determined by estimating a number of pixels rather than determining an exact number of pixels between various points in the image 400. For example, the number of pixels extending in a direction (e.g., the number of pixels corresponding with the width 402) may be determined or estimated based on the type of hardware being used to capture the image 400. For example, the image resolution may be determined or inferred from the data specification sheet associated with the image capture device 124. According to various embodiments, estimating a number of pixels, rather than determining the exact number of pixels, may accelerate one or more processes described herein and/or increase the efficiency by reducing the amount of data transferred/processed. For example, rather than downloading the entire image 400 to determine a number of pixels in the horizontal 402 direction, the total number of pixels may be estimated or determined based on the specification data sheet associated with the image capture device 124. This number may then be used to estimate the first angle 424, the expected bearing 426, and/or the second bearing 428. For example, a partial image may be downloaded to determine the number of pixels between the horizontal center 410 and the object of interest 444 to determine the first angle 424.

Figure 4:
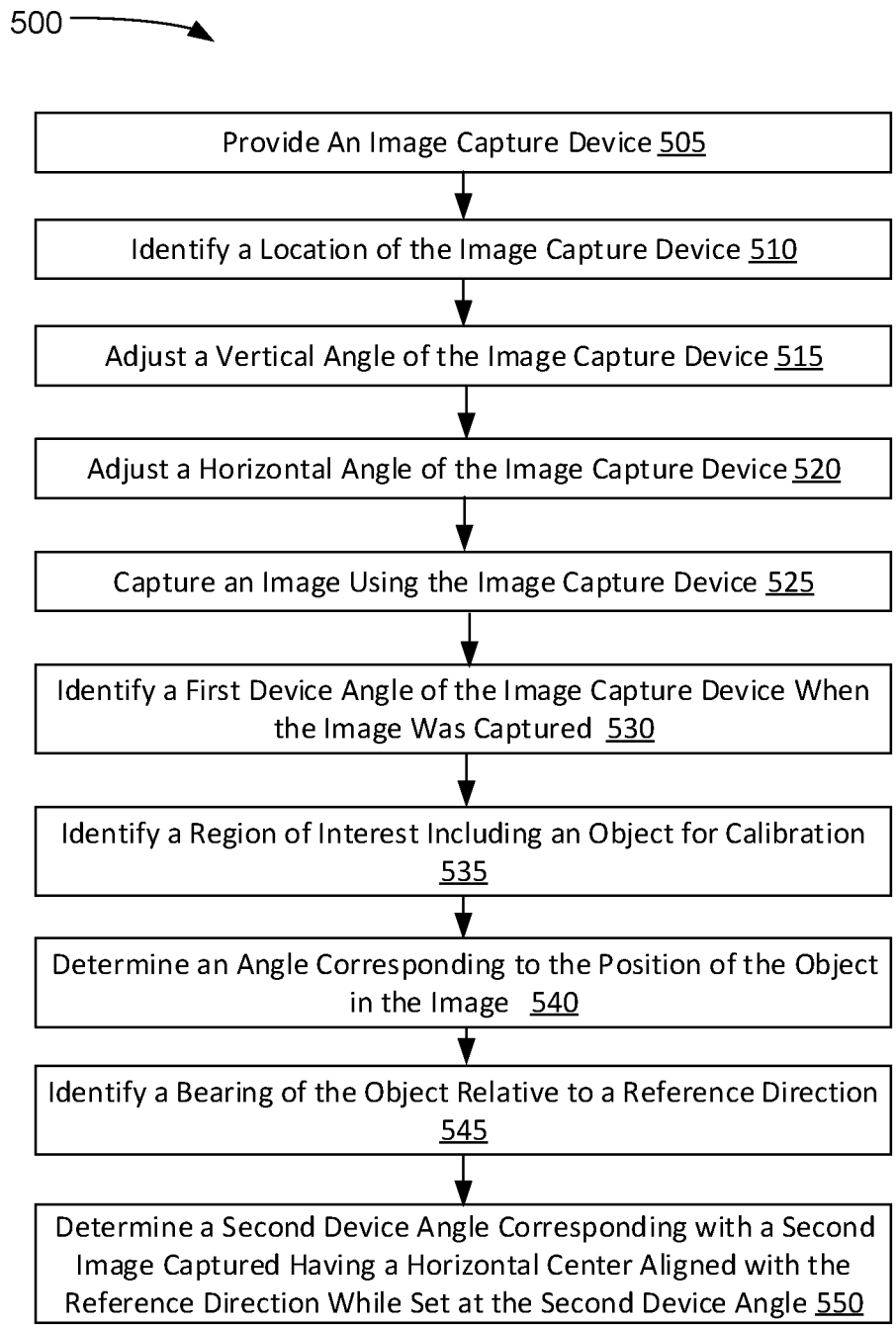
FIG. 4 is a flow chart of a method of determining a reference direction, according to an exemplary embodiment.

Referring now to FIG. 4, a flow chart of a method of determining a reference direction 500 is shown, according to an example embodiment. The method 500 may utilized to calibrate an image capture system 114. For example, the method 500 may be performed during the setup of a station 102. The method 500 may be performed by one or more components of the incident detection system 100. For example, the method 500 may be performed by one or more stations 102. For example, the method 500 may be performed by a plurality of stations 102 such that each station 102 is calibrated to determine a bearing corresponding with an object or incident captured within an image based on a reference direction. It should be appreciated that the method 500 does not need to be performed in the order shown in FIG. 4. Further, various processes shown in FIG. 4 may be omitted during the method 500. Furthermore, the method 500 may include additional processes not shown in FIG. 4.

At process 505, an image capture device is provided. For example, the process 505 may involve coupling one or more image capture devices 505 to a support (e.g., the image capture devices 124A, 124B may be coupled to support 134 shown in FIG. 2). The process 505 may involve setting an initial device angle for the image capture device. For example, process 505 may involve estimating a reference direction (e.g., using a compass to determine north) and orientating the image capture device such that the device angle is in the same general direction as a reference direction. According to various embodiments, the image capture device is configured to rotate about an axis. For example, the image capture device may be a Danhua™ outdoor turret camera.

At process 510, a location of the image capture device is identified. For example, a geolocation of the image capture device may be identified by one or more components of the incident detection system 100. The location of the image capture device may correspond with coordinates (e.g., Global Positioning System (GPS) coordinates) of the image capture device. According to various embodiments, the location of the image capture device may be identified by a station computing system. For example, the station that the image capture device is a part of may include a GPS system configured to determine coordinates of the image capture device. Alternatively or additionally, the location of the image capture device may be determined based on a satellite image that includes the image capture device. The location of the image capture device may be stored within a memory of the station computing device for later reference.

As discussed above, according to various embodiments, the memory 112 may store data associated with the station 102 and/or one or more station computing devices 104. For example, the memory 112 may store data such that the processor 110 may associate one or more pieces of data with subsequently captured images. For example, the memory 112 may store one or more indicators. According to various embodiments, the one or more indicators are added to the image as metadata. According to various embodiments, the one or more indicators may include a station identification (ID) indicator that is unique to the image capture system 114 and/or an image capture device identification (ID) indicator that is unique to the image capture device 124 used to capture the image. The one or more indicators may include a sequence indicator that is unique to a plurality of images (e.g., a sequence of images, a set of images, etc.). For example, some or all of the images captured in a sequence may include the same sequence indicator. The one or more indicators may include a time stamp indicator that indicates the time at which an individual image was captured or the times at which a plurality (e.g., sequence) of images were captured. The one or more indicators may include an image indictor that is unique to that image. The one or more indicators may include a device indicator that identifies the type of image capture device (e.g., make, model, image resolution, number of pixels in the horizontal direction, number of pixels in the vertical direction, the field of view of the device, and/or any other attributes of the device) used to capture the image. The one or more indicators may include a geolocation indicator that indicates a geolocation (e.g., a latitude and/or a longitude) of the image capture device used to capture the image. The one or more indicators may include a structure indicator that indicates the type of structure the image capture device 124 is mounted to. The one or more indicators may include an elevation indicator that indicates the altitude of the image capture device 124 at the time the image was captured.

According to various embodiments, the processor 110 may generate metadata in response to an image being captured by the image capture system 114. For example, the station computing device 104 may be configured to determine a device angle of image capture device relative to an axis of rotation, a time at which the image was taken, etc. As is discussed further herein, this information may be stored as metadata within the image and utilized during various processes described herein.

According to various embodiments, the indicators and/or metadata may be stored on the memory 112 of the station 102, the memory 218 of the server 200, the memory 312 of the computing device 304, and/or a cloud memory that is accessible via the network 10. According to various embodiments, this information, along with any other information, may be stored in a lookup table or other data structure. A sample data structure, which may be stored on the memory 112 of the station 102, is shown below:

| Number | Data | Value |
| --- | --- | --- |
| 1 | Station ID | S19 |
| 2 | First Image Capture Device ID | S19A |
| 3 | Second Image Capture Device ID | S19B |
| 4 | Sequence ID | I24315 |
| 5 | First Device Angle | A42 |
| 6 | Second Device Angle | B48 |
| 7 | Geolocation of First Image Capture Device | 15426, 26475 |
| 8 | Geolocation of Second Image Capture Device | 26325, 32678 |
| 9 | Elevation of First Image Capture Device | 6531 |
| 10 | Elevation of Second Image Capture Device | 3163 |
| 11 | Reference Direction of First Image Capture Device | R1 |
| 12 | Reference Direction of Second Image Capture Device | R2 |
| 13 | Second Angle Associated with First Image Capture Device | A242642 |
| 14 | Second Angle Associated with Second Image Capture Device | A23625 |
| 15 | Mounting Structure Identifier | M3 |
| 16 | Make of First Image Capture Device | C462 |
| 17 | Make of Second Image Capture Device | C462 |
| 18 | Model of First Image Capture Device | CM6427 |
| 19 | Model of Second Image Capture Device | CM6427 |
| 20 | First Time Stamp | 12, 52 |
| 21 | Second Time Stamp | 12, 57 |

At process 515, a vertical angle of the image capture device is adjusted. For example, a device adjustment mechanism (e.g., a leveling adjustment mechanism) may be coupled to the image capture device. For example, the device adjustment mechanism may include an actuator (e.g., a servo motor) configured to adjust the first vertical device angle. Alternatively or additionally, the image capture device may be configured to receive a level device such that the first device adjustment mechanism may be utilized to manually adjust first vertical device angle until the leveling device indicates that the first image capture device is level or approximately level (e.g., +/−0.1 degrees). For example, the device adjustment mechanism may include one or more bolts or screws configured to alter the first vertical device angle.

At process 520, a horizontal angle of the image capture device is adjusted. For example, when coupling the image capture device to the support, the horizontal device angle may be adjusted by a user installing the image capture device. For example, an image capture device may be coupled to a support such that a desired reference direction is within the field of view (e.g., between a first horizontal edge of an image captured by the image capture device and a second horizontal edge). For example, the reference direction may be north. In this example, as the image capture device is installed, the image capture device may generally be aimed north when installed. For example, a compass may be referenced while installing the image capture device to aim the image capture device in the north direction. Further, in embodiments wherein the image capture device may rotate about an axis between about a range of angles, the horizontal center of the image capture device is generally orientated towards the reference direction (e.g., north) while the device angle is generally centered within the range of angles.

At process 525, an image is captured by the image capture device. The image may be utilized for determining a reference direction (e.g., via the calibration circuit 116). For example, the image may be the image 400 show in FIG. 3. According to various embodiments, one or more pieces of data are associated with the image. For example, the station computing system may associate a time the image was captured, a location of the image capture device, a device angle associated with the image capture device at the time the image was captured, weather attributes present at the time the image was captured, and/or any other piece of information discussed herein.

At process 530, a first device angle of the image capture device at the time the image was captured is identified. The device angle may correspond with the direction of the horizontal middle of the image. For example, the image capture device and/or image capture system may provide a relative device angle to the station computing device at the time the image is captured. The station computing device may then identify the device angle by identifying the data associated with the image as a part of process 520.

At process 535, a region of interest including an object for calibration is identified within the region for calibration of the image capture device. For example, a region of interest that includes an object of interest may be identified in the image. For example, the region of interest may be manually selected within image via the station computing device. Alternatively, object detection software (e.g., a machine learning model trained to identify the object of interest) may be utilized by the station computing device to identify a region of interest within the image. As a part of process 535, pixel coordinates within the region of interest may be identified for the object of interest. The pixel coordinate includes a vertical pixel coordinate and/or a horizontal pixel coordinate. The vertical pixel coordinate may be determined based on the number of pixels between the region of interest and a vertical edge of the image. The horizontal pixel coordinate may be determined based on the number of pixels between the region of interest and a horizontal edge of the image.

At process 540, an angle corresponding to the position of the object in the image is determined. For example, the angle may be determined with reference to the device angle identified as a part of process 520. According to various embodiments, the horizontal device angle corresponds with the vertical middle of the image (e.g., the vertical center 420 shown in the image 400 of FIG. 3). Using the pixel coordinates of the region of interest, the station computing system may determine a number of pixels between the vertical middle and the region of interest. The number of pixels may then be converted to a corresponding angle (e.g., angle 424 shown in FIG. 3), which corresponds with the position of the region of interest, including the object of interest, within the image.

At process 545, a bearing of the object relative to a reference direction is identified. For example, an expected bearing (e.g., the expected bearing 426 shown in FIG. 3) of the object relative to the reference direction may be determined. The expected bearing of the region of interest, and object of interest, (e.g., with respect to the reference direction) may be determined based on the image coordinates of the region of interest, the geolocation of the image capture device, and/or the time the image was captured. For example, if the object of interest is a celestial object, the expected bearing of the object of interest (e.g., with respect to the reference direction) may be determined based on the object of interest, the geolocation of the image capture device, and the time (e.g., date, local time, etc.) the image was captured. According to various embodiments, the location of a celestial object in the sky may be predicted based on a geolocation of the observer and the time the celestial object is observed. For example, on Apr. 26, 2022, at 7:00 AM PST, an observer in San Francisco, California may expect to see the sun at a bearing (e.g., corresponding with an azimuth of the sun) of 78.05 degrees relative to the north direction. Thus, in this example embodiment, the expected bearing would be 78.05 degrees.

In another example embodiment, the object of interest is a landmark. The expected bearing of the object of interest (e.g., with respect to the reference direction) may be determined based on the object of interest and the geolocation of the image capture device without relying on the time the image was captured. For example, by identifying the geolocation of the object of interest and the geolocation of the image capture device, an expected bearing (e.g., with respect to a reference direction) may be determined based on the geolocations.

At process 550, a second angle device angle is determined. For example, the second device angle (e.g., the angle 428 shown in FIG. 3) may correspond with a second image captured having a horizontal center aligned with the reference direction while set at the second device angle. In other words, when the image capture device is set to the second angle, the image capture device is orientated in the reference direction.

The second angle (e.g., an offset angle, the second angle 428 shown in FIG. 3, etc.) may be determined based on the difference between the first device angle (e.g., the horizontal center 410 shown in FIG. 3) identified at process 520 and the reference direction (e.g., the reference direction 440) determined using the expected bearing (e.g., the expected bearing 426) identified at process 545. The second angle may be used as an angular offset from the horizontal center in images subsequently taken to ensure that any bearing determined is determined with respect to the reference direction. For example, the station commuting system may associate the second angle with some or all images captured by the respective image capture device. According to various embodiments, two or more image capture systems located at various geolocations may all be calibrated to use the same reference direction when determining the bearing of an object or incident in an image.

According to various embodiments, the method 500 may be performed two or more times by a given image capture device and/or image capture system. For example, the reference direction and second angle may be determined using the same object of interest at different times. The reference directions determined during each iteration of the method 500 may then be used (e.g., by averaging, taking a weighted average, taking a median value, etc.) to determine a second angle to be associated with the image capture system. Additionally or alternatively, the reference direction and the second angle may be determined using a variety of objects of interest. The reference directions determined during each iteration of the method 500 may then be used (e.g., by averaging, taking a weighted average, taking a median value, etc.) to determine a second angle to be associated with the image capture system.

Figure 5:
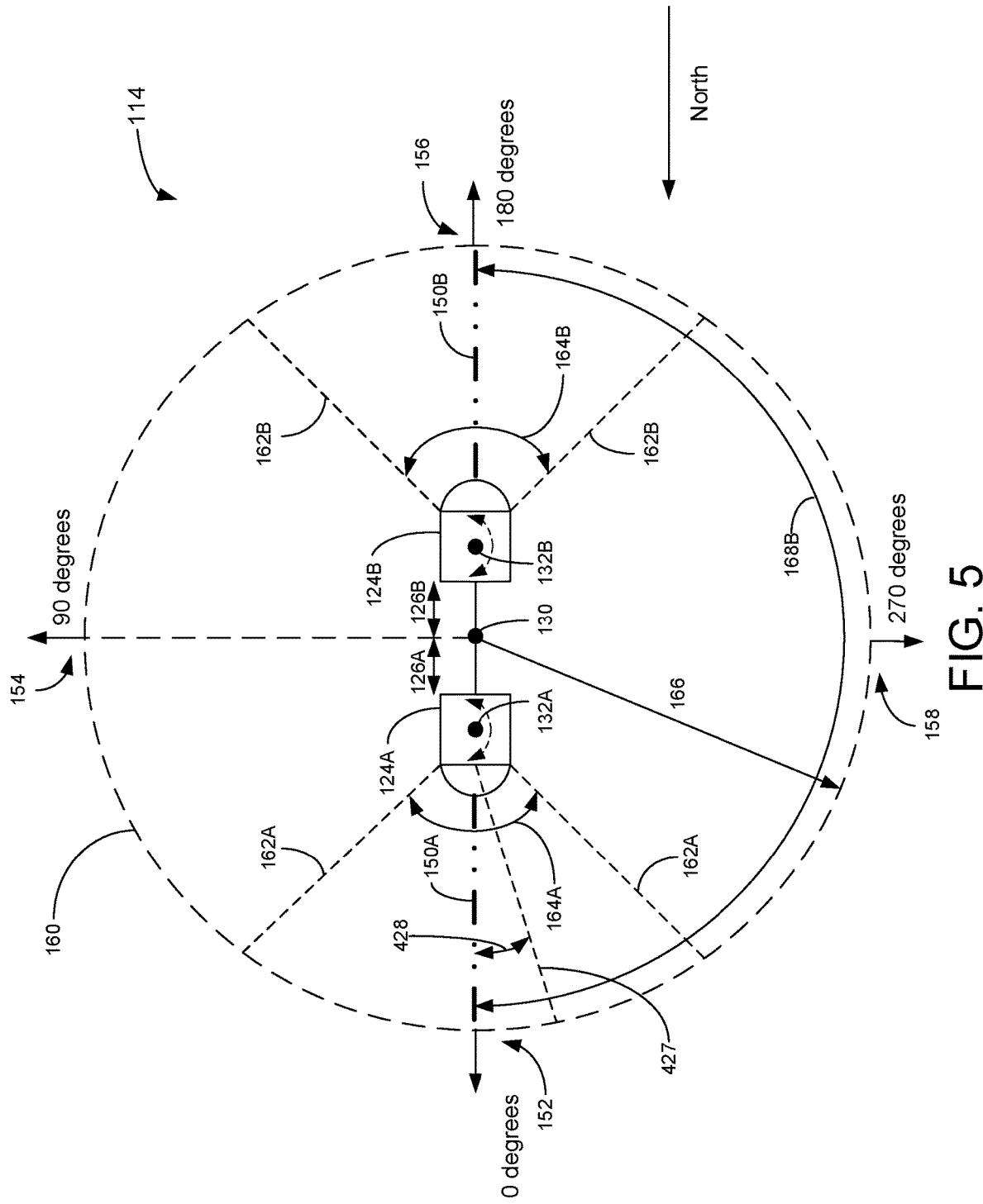
FIG. 5 is top view of a schematic illustration of an image capture system included in an incident detection system, according to an exemplary embodiment.
Figure 6:
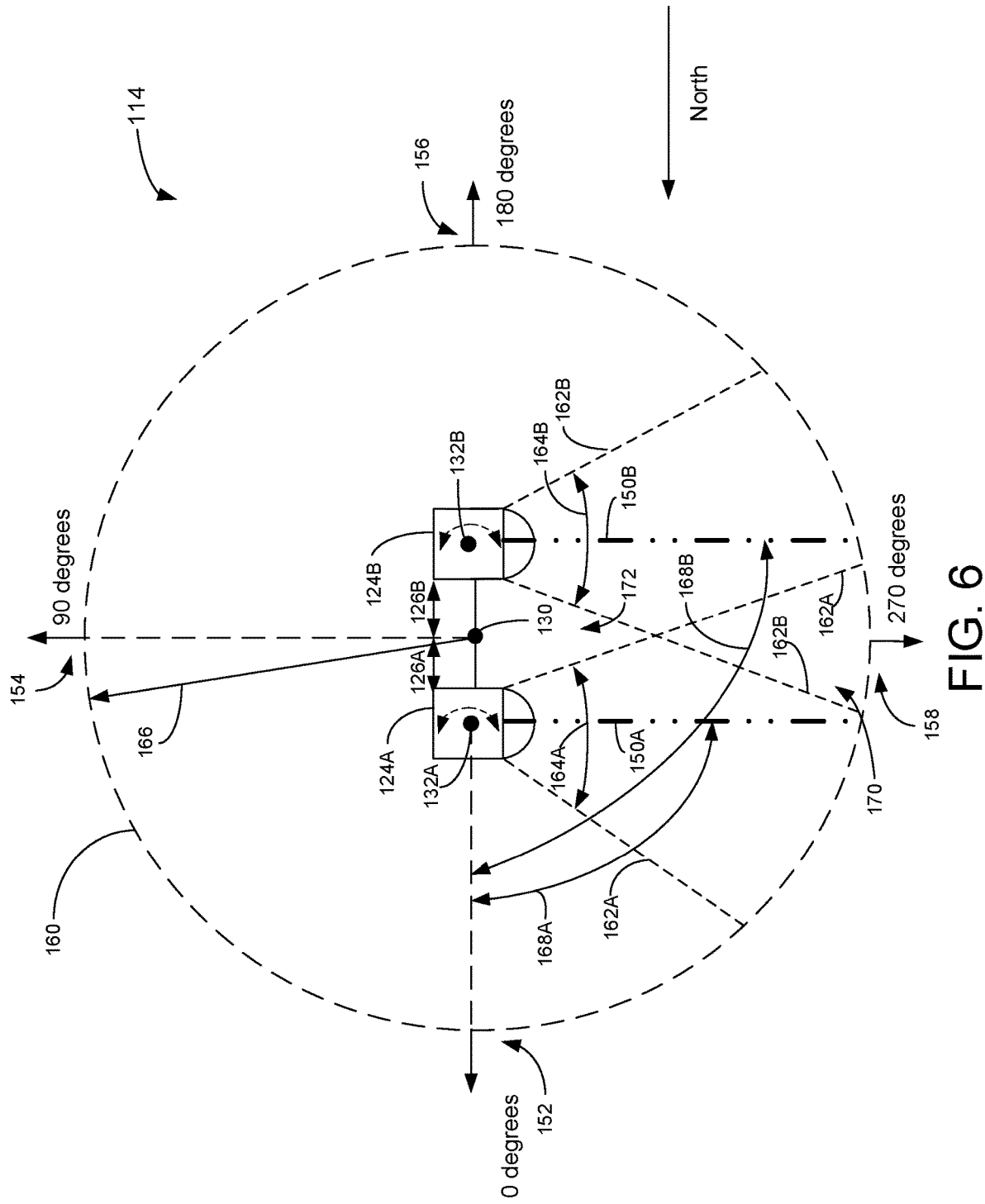
FIG. 6 is another top view of the image capture system schematic illustration of FIG. 5.

Referring now to FIGS. 5 and 6, schematic illustrations of a top view of an image capture system 114 included in an incident detection system 100 are shown, according to an example embodiment. As shown, the image capture system 114 defines a center 130 between the first image capture device 124A and the second image capture device 124B. As shown, the first image capture device 124A is located a first distance 126A from the center 130 and the second image capture device 124B is located a second distance 126B from the center. Further, as shown, the first image capture device 124A may rotate about a first axis of rotation 132A and the second image capture device 124B may rotate about a second axis of rotation. According to various embodiments, the image capture devices 124 are configured rotate (e.g., 90 degrees, 180 degrees, 270 degrees, 360 degrees, etc.) about the respective axis 132. According to other embodiments, the image capture devices 124 are configured rotate less than 360 degrees (e.g., 190 degrees, 180 degrees, etc.) about the respective axis 132.

As shown, each image capture device 124 has a field of view 162 associated with the image capture device 124. The field of view 164 corresponds to the horizontal limits (e.g., the first horizontal edge 462 and the second horizontal edge 464 shown in FIG. 3) of an image captured by the image capture device 124 while set at a given device angle (e.g., the device angle 150). According to various embodiments, the field of view 164 for each image capture device 124 may be between 25 degrees and 75 degrees. For example, the field of view 164 may be 30 degrees, 45 degrees, 60 degrees, etc.

According to various embodiments, the image capture system 114 enables a panoramic view of the area 160 surrounding the image capture system 114. According to example embodiments, each image capture device 124 may be configured to capture objects and incidents in images up to a maximum distance 166 away from the center 130 of the image capture system.

According to example embodiments, each image capture device 124 may be calibrated (e.g., via the method 500). For example, when the first image capture device 124A is being calibrated, the device angle may align with a first angle 427 such that when an image is captured, the horizontal center (e.g., the horizontal center 410 shown in FIG. 3) aligns with the first angle 427. The method 500 may be utilized to determine a reference direction (e.g., a first reference direction 152, a second reference direction 154, a third reference direction 156, a fourth reference direction 158, etc.) and the second angle 428. As shown in FIG. 5, the first device angle 150A is aligned with the first reference direction 152 (e.g., north) and the second device angle 150B is aligned a second reference direction 156 (e.g., south). According to various embodiments, the device angle 150 of each image capture device 124 may be represented by an angular offset from a reference direction. For example, as shown in FIG. 6, the first device angle 150A defines a first angular offset angle 168A with respect to the first reference direction 152 and the second device angle 150B defines a second angular offset angle 168B with respect to the first reference direction. According to various embodiments, some or all images captured by the image capture devices 124 may be associated with an angular offset angle 168 such that the device angle 150 of the image capture device 124 at the time the image was captured may be identified.

As shown in FIG. 6, the first image capture device 124A and the second image capture device 124B may be orientated such that the first field of view 162A and the second field of view 162B define an overlap region 170 such that both the first image capture device 124A and the second image capture device 124B may capture an image that shows the overlap region 170. As is discussed further herein, the overlap region 170 may be utilized while generating a composite image.

As shown in FIG. 6, the first image capture device 124A and the second image capture device 124B are orientated such that an omitted area 172 exists between the first field of view 162A and the second field of view 162B. As shown, the omitted area 172 is largest proximate the center 130 and decreases in size as the distance from the center 130 increases. According to various embodiments, the omitted area 172 may be reduced by reducing the distance 126 between each image capture device 124 and the center 130. Further, as is discussed further herein, the image capture devices 124 may capture some or all of the omitted area 172 when orientated at a different device angle. These other images that do capture some or all of the omitted area 172 may be used to fill in the omitted area 172 when creating a composite image.

Figure 7:
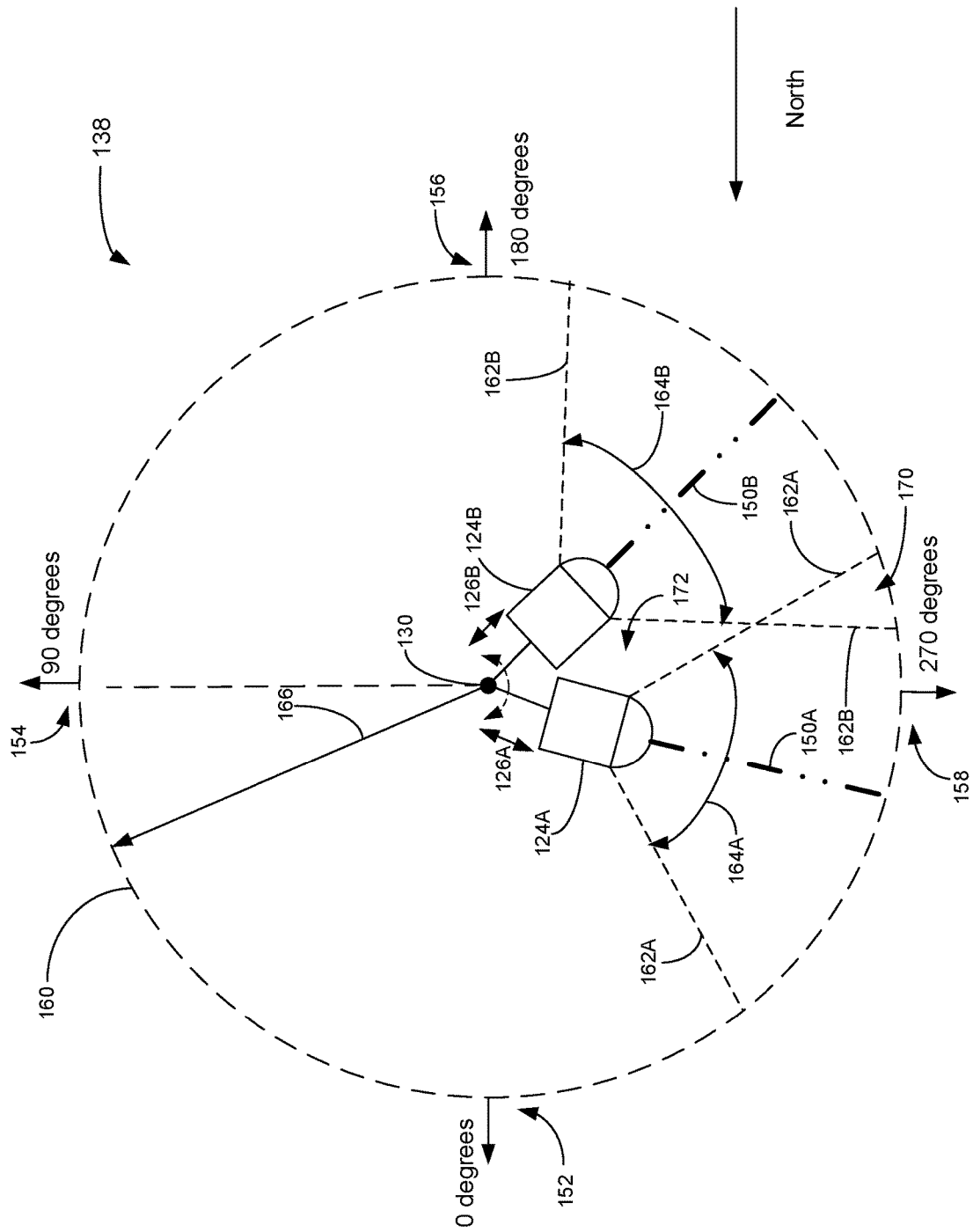
FIG. 7 is a schematic illustration of another station included in an incident detection system, according to an exemplary embodiment.

Referring now to FIG. 7, an alternate image capture system 138 is shown, according to an example embodiment. The image capture system 138 may share one or more features with the image capture system 114 discussed herein. However, as shown, the first image capture device 124A and the second image capture device 124B rotate about the center 130 (e.g., about an axis at the center 130) rather than about the first axis of rotation 132A and the second axis of rotation 132B.

C. Image Capture and Time Lapse Panorama Generation

As high-resolution, panoramic composite images can be useful to identify and track wild fires, creating such large composite images from multiple smaller constituent images can be compute intensive and more suitable for processing on a set of servers or a cloud service with many resources. Once generated, the large composite images can be transmitted from the remote servers, or the cloud, over the network and to the client devices on which the users can display the images on their local displays. However, transmitting large images across a network can be challenging. For example, when a large high-resolution, panoramic composite image encounters an error in transmission resulting in the corrupted image file being received at the receiving device, the entire image may have to be retransmitted over the network once again. Thereby, the error and the subsequent retransmission of the file can delays, which as smaller in the event of smaller images and larger in the event of larger images. In the instances in which an application utilizing large image files relies on many transmissions of such large images, as can be the case with the panoramic, composite images herein, network transmission errors can accumulate delays that can adversely affect the user experience. These delays can be exacerbated in the situations in which the network connection is spotty, such as in the mountains or remote areas in which the network communication is provided by remote cellphone towers.

The present solution can address these and other obstacles by transmitting over the network only either individual constituent images to be combined into larger composite images at the server or the cloud, or partitioned parts of the generated composite image to be transmitted over the network to the user device for display. Using this approach, the present solution in both instances sends smaller images instead of the larger one, thereby minimizing the duration of delays associated with any transmission errors, improving the user experience.

Figure 8:
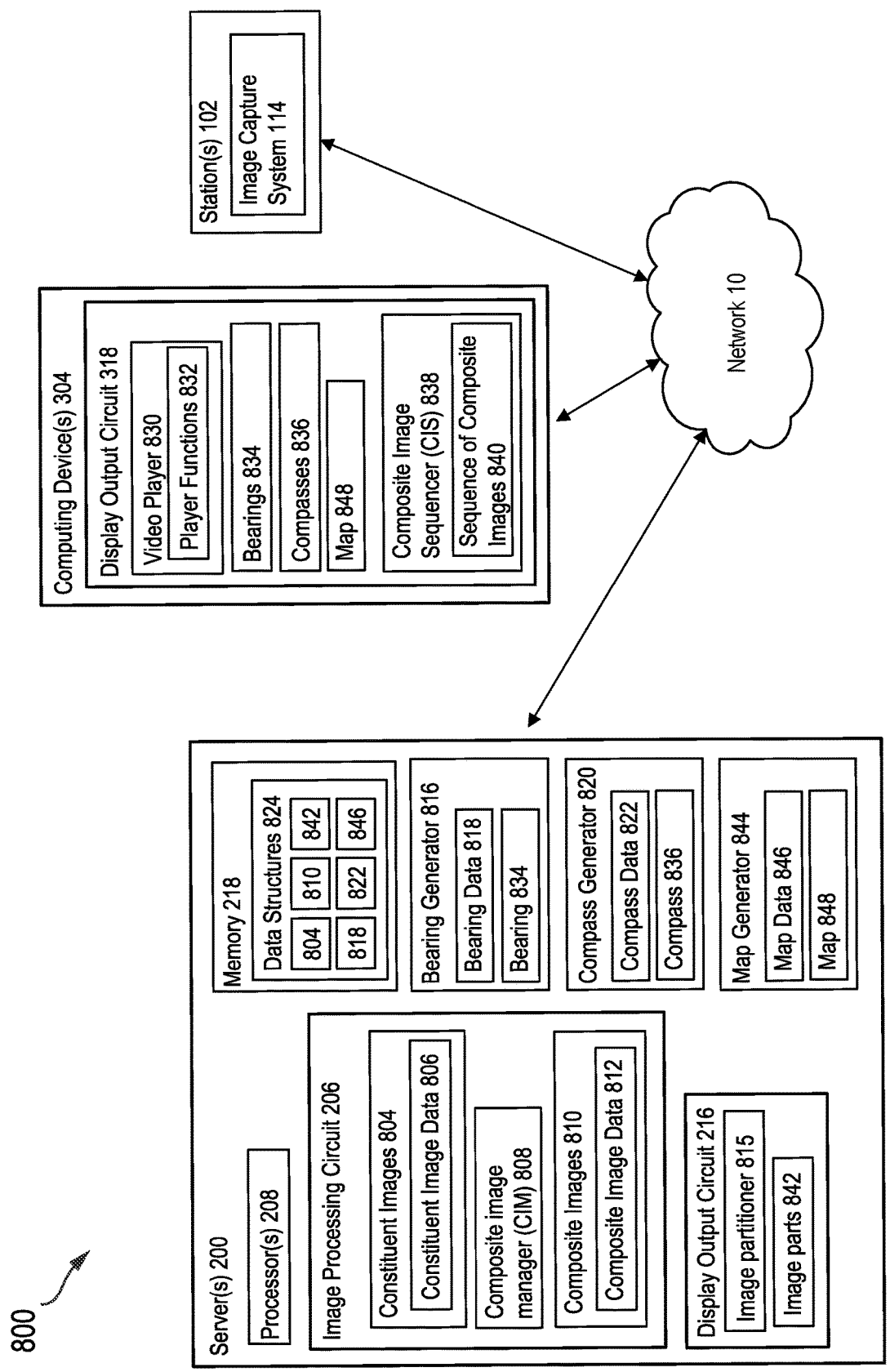
FIG. 8 illustrates an example of a system for implementing image capture and time lapse panorama composite image generation.

FIG. 8 illustrates an example system 800 in which one or more servers 200 communicate with one or more stations 102 and computing devices 304 via a network 10. One or more stations 102 can include one or more image capture systems 114. One or more computing devices 304 can include one or more display circuits 318 that can include one or more bearings 834, one or more compasses 836, one or more maps 848, one or more composite video sequencers (CIS) 838 having one or more sequences of composite images 840 and one or more video players 830 having one or more player functions 832. Along with processors 208, one or more servers 200 can include an image processing circuit 206 that can include one or more constituent images 804 that can include one or more constituent image data 806, one or more composite image managers (CIM) 808 and one or more composite images 810 that can include composite image data 812. One or more servers 200 can include one or more display output circuits 216, that can include one or more image partitioners 814 having one or more image parts 842 and one or more bearing generators 816 that can include one or more bearing data 818 and one or more bearings 834. One or more servers 200 can also include one or more compass generators 820 that can include one or more compass data 822 and one or more compasses 836 as well as one or more map generators 844 that can include one or more map data 846 and maps 848. Memory 218 can include one or more data structures 824 that can store one or more constituent images 804, one or more composite images 810, one or more bearing data 818, one or more maps data 846 and one or more compass data 822.

Constituent images 804 can include any images captured by an image capture system 114, including any raw images that can be captured by any image capture device 124. Constituent image 804 can include image 2100 along with any of features of image 2100, such as width 2102, height 2104 and a horizontal center 2110. Constituent images 804 can be digital images and have any resolution in terms of megapixels, such as for example 10, 20, 30, 40, 50, 60, 70, 80, 90, 100, 200, 300, 400, 500 or more than 500 megapixels. Constituent images 804 can include any formats, including JPEG or JPG, PNG, TIFF, PSD, PDF, EPS or any other image formats. Constituent images 804 can include any aspect ratio of width to height, such as for example width to height ratios of 1:1, 4:3, 3:2 or 16:9. The aspect ratios can be defined by the field of view associated with an image capture device 124. Constituent images 804 can include width and height that can be defined by pixels. For example, constituent images 804 can be wide 2048 pixels and wide 1536 pixels, or any other pixel size, such as 4096 pixels by 3072, or 8192 pixels by 6144, or any other pixel size.

Constituent images 804 can include images along any range of electromagnetic spectrum or wavelength range. Constituent images 804 can include human visible range images, such as images whose captured light generally corresponds to wavelengths of about 400 nm to about 800 nm. Constituent images 804 can include infrared images, such as images whose captured light generally corresponds to wavelengths greater than 800 nm, such as for example any range between 800 nm and 50 micrometers. For example, constituent images 804 can include images whose captured light generally corresponds to wavelengths in the near-infrared images of about 0.8 to 5 micrometers in wavelength, mid-infrared wavelengths of about 5-25 micrometers or far-infrared wavelengths of about 25-40 micrometers. Constituent images 804 can include images whose captured light generally corresponds to any combination of visible and any infrared wavelength range.

Constituent images 804 can cover a specific angular range within the field of view 162 associated with an image capture device 124. Therefore, multiple constituent images 804 can be used to piece together a composite image 810 of 180° or more degrees about the axis. For the purposes of producing a composite image 810, constituent images 804 can include portions, such as a central portion 840 and the overlap portion 842, such as for example, illustrated in FIG. 10. The central portion of the constituent image 804 can include the portion of the constituent image 804 that can be used for creating the composite image 810, while the overlap portions 842 can include portions of a constituent image 804 that overlaps with another neighboring constituent image 804 that can be used for creating the composite image 810.

Constituent image data 806 can include any data for a constituent image 804. Constituent image data 806 can any data or information about an image, including any angle, direction or location discussed herein in connection with FIGS. 2-3 and 5-7. Constituent image data 806 can include information identifying an angle of a constituent image 804, such as a device viewing angle 164, or a device angle 168 that is relative to a reference direction, such as a reference direction 440, or any other angle, direction or other information corresponding to the constituent image 804 or a status of the image capture system 114 that captured the constituent image 804. Constituent image data 806 can include a time stamp indicating the time when the constituent image 804 was taken. Constituent image data 806 can include information on location where the constituent image 804 was taken. Constituent image data 806 can include information about neighboring constituent images 804 to be combined to either side of the constituent image 804 in order to create a composite image 810. Constituent image data 806 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Composite images 810 can include any images generated by combining two or more constituent images 804. Composite images 810 can include a panoramic image spanning any range of angles. The range of angles can include any range of angles between 1 and 360, such as more than 20 degrees, 30 degrees 45 degrees, 60 degrees, 75 degrees, 90 degrees, 120 degrees, 140 degrees, 160 degrees, 180 degrees, 200 degrees, 220 degrees, 240 degrees, 270 degrees, 300 degrees, 330 degrees or up to full 360 degrees around a location, such as an axis. The axis can be an axis 132 of an image capture device 124, depending on the design.

The axis about which degree angles about the composite image 810 are defined can include the center 130 of the image capture system 114. For instance, a composite image 810 can cover a range of angles defined about axis corresponding to the center 130 of the image capture system 114. The center 130 can serve as the axis of the image capture system 114 when the image capture system 114 includes one or more image capture devices 124. In the instances in which an image capture system 114 utilizes two or more image capture devices 124 centered away from the center 130 by some distance, the distance between the center 130 and the axes 132 of image capture devices 124 can be very small in comparison to the distance between the image capture system 114 (including devices 124) and the areas or features being images in the far field. For example, the distance between the center 130 and axes 132 can be hundreds or thousands of times smaller than the distance between the image capture system 114 (e.g., devices 124) and the locations or terrains at the distance that are being imaged by the constituent images 804. In such instances, given the large difference between these two distances, the center 130 can be used as an axis about which composite image 810 is formed despite the fact that it may not correspond exactly to the mathematical axis for each of the plurality of image capture devices 124 from which constituent images 804 may be gathered for the composite image 810.

Composite images 810 can be generated such that each portion of a composite image 810 corresponds to an angle, or a range of angles, defined about an axis of the image capture system 114. In some implementations, a composite image 810 can be generated from multiple constituent images 804 so that each portion of a composite image 810 corresponds to an angle, or a range of angles, defined about an axis of the image capture device 124. Composite images 810 can be generated by combining, merging or stitching constituent images 804 along vertical axes of the constituent images 804 (e.g., along the height). Composite images 810 can be generated by combining, merging or stitching multiple constituent images 804 end to end along their respective vertical heights. Composite images 810 can be generated by combining, merging or stitching multiple constituent images 804 end to end along their respective vertical heights.

Composite images 810 can be generated such that when constituent images 804 are combined, merged or stitched long their respective widths, they are combined, merged or stitched so that their respective ends overlap. The overlap can be defined based on device field of view overlap 170 as it applies to each constituent image. For example, the overlap between two concatenated neighboring constituent images 804 in a composite image 810 can correspond to about 59, 109, 159 or 209 of the two neighboring constituent images 804. The two overlapping parts of each neighboring constituent image 804 can correspond to the same one or more items, features or locations imaged and can be identical to each other.

Composite image data 812 can include any data of a composite image 810. Composite image data 812 can include any constituent image data 806 for each portion of the composite image 810 corresponding to each constituent image 804 included in the composite image 810. Composite image data 812 can include a timestamp or a time data for the composite image 810. The timestamp or time data can correspond to a time period of time to which the composite image 810 corresponds. For example, the timestamp or time data can correspond to a time range spanning the time period when each of the constituent images 804 were taken. Timestamp or time data can correspond to series of timestamps, each timestamp corresponding to the time of capture of each individual constituent image 804 of the composite image 810.

Composite image data 812 can include data corresponding to the resolution of the composite image 810. The resolution can be defined based on pixels, such as discussed earlier with respect to constituent images 804. Composite image data 812 can include or identify the width and height of the composite image 810 such as discussed earlier with respect to constituent images 804. Composite image data 812 can identify the locations along the width of the composite image 810 where constituent images 804 are combined, stitched or merged. Composite image data 812 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Composite image manager 808 can include hardware, software or any combination of hardware and software for creating composite images 810. Composite image manager 808 can include computer code, instructions or functions stored in memory (e.g., 218) to implement its functionality via processors 208. Composite image manager 808 can include the functionality to generate composite images 810 by combining constituent images 804. Composite image manager 808 can include the functionality to utilize constituent images 804 and their corresponding constituent image data 806 to form composite image 810. Composite image manager 808 can include the functionality to generate composite image data 812, including by utilizing constituent image data 806. Composite image manager 808 can include the functionality to determine overlap between constituent images 804.

Image partitioner 814 can include hardware, software or any combination of hardware and software for partitioning composite images 810 into various parts or portions. Image partitioner 814 can include computer code, instructions or functions stored in memory (e.g., 218) to implement its functionality via processors 208. Image partitioner 814 can include the functionality to separate a composite image 810 into any number of parts, such as for example into up to 2, 3, 4, 5, 6, 7, 8, 9, 10, 11, 12, 14, 16, 18, 20, 22, 24, 26, 28, 30 or more parts. The parts partitioned can be equal in size or different in size, can be equal in shape or be differently shaped. Image partitioner 814 can include the functionality to separate a composite image 810 into parts, such that each part corresponds to an individual constituent image 804. Each part can also include the constituent image data 806 for each corresponding part corresponding to a constituent image 804. Image partitioner 814 can include the functionality to separate images along the height, along the width, or along any combination of height and width.

Image parts 842 can include any one or more parts of a composite image 810 partitioned by an image partitioner 814. Image parts 842 can include composite image 810 split into any number of parts, such as up to 4, 6, 8, 10, 12, 16, 18, 20, 24, 30 or more parts. Image parts 842 can correspond to the constituent images 804 used to generate the composite image 810. Image parts 842 can for example include 10 parts for a composite image 810 that is generated based on ten constituent images 804 stitched together. Image parts 842 can include likewise any other number of parts. Image parts 842 can include information included in the composite image data 812 which can be sent to the computing devices 304 in order to recombine the image parts 842 into the composite image 810.

Bearing 834, which can also be referred to as the bearing indicator 834, can include an indication of one or more angles corresponding to an image, such as a constituent image 804 or a composite image 810. The angles corresponding to an image can include a series of angles about an axis of an image capture system 114 or an image capture device 124. Bearing 834 can include a strip that can be combined with or displayed with a composite image 810 or a constituent image 804. The strip can be rectangular and include a series of angles identifying angles respective to a constituent image 804 or a composite image 810. The series of angles can include anywhere between 0 and 360 degrees around the reference axis about which, or with respect to which, the composite image 810 was created. Between any two degrees, bearing 834 can identify minutes of angle, such as anywhere between 0 and 60 minutes. Between any two minutes of angle, bearing 834 can identify seconds of angle, such as anywhere between 0 and 60 seconds.

Bearing data 818 can correspond to any data or information concerning angles or directions of a constituent image 804 or a composite image 810. Bearing data 818 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein. Bearing data 818 can include the information about the range of angles corresponding to each portion of an image (e.g., 804 or 810). Bearing data 818 can include the information about the location within each image to which each individual angle, minute or angle or second or angle applies.

Bearing generator 816, which can also be referred to as the bearing circuit 816, can include hardware, software or any combination of hardware and software for creating a bearing 834, sometimes also referred to as the bearing indicator 834. Bearing generator 816 can include computer code, instructions or functions stored in memory (e.g., 218) to implement its functionality via processors 208. Bearing circuit 816 can include the functionality to generate a bearing 834 (e.g., a bearing indicator) for display within or with a composite image 810. Bearing generator 816 can include the functionality to determine an angle or a range of angles for each portion of a composite image 810, or each portion of a constituent image 804. Bearing circuit 816 can include the functionality to assign or associate an angle or a range of angles for each portion of a composite image 810, or each portion of a constituent image 804. Bearing circuit 816 can include the functionality to utilize constituent image data 806 or composite image data 812 to generate bearing 834.

Compass generator 820, which can also be referred to as the compass circuit 820, can include hardware, software or any combination of hardware and software for partitioning composite images 810 into various parts or portions. Compass generator 820 can include computer code, instructions or functions stored in memory (e.g., 218) to implement its functionality via processors 208. Compass generator 820 can include the functionality to generate a compass 836. Compass circuit 820 can include the functionality to generate a marker or an indicator denoting the range of angles or directions corresponding to the portion of the image (e.g., 804 of 810) being displayed on a display. Compass circuit 820 can include the functionality to generate markers or indicators for denoting or identifying cardinal directions with respect to the portion of the image being displayed.

Compass 836 can include any digital representation of an instrument showing direction, or a range of directions, or an angle, or a range of angles, of a displayed portion of composite image 810 or a constituent image 804. Compass 836 can provide a range of directions or a range of angles corresponding to a portion of the image displayed by a player, such as a video player 830. Compass 836 can include an image or an illustration of a physical magnetic compass instrument to be displayed within or together with a composite image 810 or a constituent image 804. Compass 836 can identify four cardinal directions: east, west, north and south. Compass 836 can identify the direction, range of directions, an angle, or a range of angles to which the image displayed corresponds with respect to an axis about which the displayed image is captured. Compass 836 can display angles defined based on the axis, which can include a center 130 of an image capture system 114 or axes 132 of image capture devices 124. Compass 836 can highlight, display or identify the range of directions corresponding to the width of the displayed portion of the image with respect to the cardinal directions. The range of directions highlighted, displayed or identified by the compass 836 can include the range of angles corresponding to a reference direction 2140.

Compass data 822 can include any data corresponding to a direction of a portion of a composite image 810 or a constituent image 804 being displayed. Compass data 822 can include any bearing data 834, constituent image data 806 and composite image data 812. Compass data 822 can include any on the range of angles or directions corresponding to a portion of an image being displayed by a video player 830. Compass data 822 can include information about a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Maps 848, which can also be referred to as map indicators, can include an indication of regions towards which an image, such as a displayed image 804 or 810, is turned or focused. Maps 848 can include indicators identifying areas covered by an image 804 or 810, or by a portion of the image 804 or 810 displayed in the image. The angles of the indicators on the map 848 can correspond to a series of angles about an axis of an image capture system 114 or an image capture device 124. Maps 848 can identify locations, geographical areas, mountains, rivers, roads and towns, which can be displayed along with an indicator showing a portion of the map 848 to which the image being displayed corresponds.

Map data 846 can correspond to any data or information concerning a geographical representation of an area, along with the angles or directions of a constituent image 804 or a composite image 810. Map data 846 can include data on the geographical area being imaged. Map data 846 can include, be based on, or correspond to the bearing data 818 or compass data 836. Map data 846 can include geographic locations, towns, roads, mountains, rivers and other landmarks, that can be associated with angles about an axis (e.g., 130, 132) defined in terms of a reference direction 2140, width 2102, height 2104, device angles 150, device viewing angle 164, device angle relative to a reference direction 168, bearing to incident relative to reference direction 2170, reference direction 2140 or any other data, including directional and angular data or information discussed herein.

Map generator 844 can include hardware, software or any combination of hardware and software for creating a map 848, sometimes also referred to as the map indicator 848. Map generator 844 can include computer code, instructions or functions stored in memory (e.g., 218) to implement its functionality via processors 208. Map generator 844 can include the functionality to generate a map 848 for display within or with a composite image 810. Map generator 844 can include the functionality to determine an angle or a range of angles for each portion of a composite image 810, or each portion of a constituent image 804 and display geographic data in the map in relation to such angle or range of angles.

Data structures 824 can include any type and form of a data organization, management and storage format allowing for data access and modification. Data structures 824 can include a collection of data, including values or entries, such as images 804 and 810, including their corresponding data 806 and 812. Data structure 824 can include image parts 842. Data structures 824 can include relationships or associations between different data. Data structures 824 can include functions or operations that can be applied to various data, such as for example algebraic structures. Data structures 824 can be stored in memory 218 and can organize stored data using arrays, linked structures or lists, unions, tagged unions, objects, hashes, graphs and binary trees. Data structures 824 can be stored in the memory of servers 200 or other devices, such as computing devices 304.

Video player 830 can include hardware, software or any combination of hardware and software for displaying composite images 810 and constituent images 804. Video player 830 can include computer code, instructions or functions stored in memory (e.g., 218) to implement its functionality via processors 208. Video player 830 can include the functionality to play or display any media content, such as for example, images, including constituent images 804 and composite images 810, videos, illustrations, maps and presentations. Video player 830 can include the functionality to reconstruct the composite images 810 received using received image parts 842. Video player 830 can utilize composite image data 812, which can be transmitted together with image parts 842 to the computing devices 304, to reconstruct the composite image 810 from the image parts 842. Video player 830 can include the functionality to manipulate via player functions 832 the displayed media content and display sequenced images. Video player 830 can include the functionality to zoom into, or out of media content displayed, as well as to pan the content left or right or scroll the content up or down. Video player 830 can include the functionality to display bearing 834 and compass 836. Video player 830 can include the functionality to display any maps, such as maps of locations of stations at which constituent images 804 are captured.

Player functions 832 can include hardware, software or any combination of hardware and software for partitioning composite images 810 into various parts or portions. Player functions 832 can include computer code, instructions or functions stored in memory (e.g., 218) to implement its functionality via processors 208. Player functions 832 can include the functionality to manipulate an image, whether 804 or 810, including to zoom into, or out of the image being displayed by video player 830, pan sideways across the image being displayed by video player 830 and scroll up or down the image being displayed by video player 830. Player functions 832 can include the functionality to play sequence of composite images 840. Player functions 832 can include buttons for running a sequence of composite images 840 as a video, including a play button, a pause button, a scroll bar to scroll across the sequence of composite images 840, a fast forward button, a rewind button and a replay button.

Sequence of composite images 840 can include any sequence or chain of composite images 810. Sequence of composite images 840 can include two or more composite images 810 arranged chronologically. The two or more composite images 810 of the sequence of composite images 840 can be ordered based on their bearing 834. For example, a first composite image 810 of the sequence can be oriented and displayed based on the angles on the bearing 834 in accordance with a reference direction 440, and a second composite image 810 of the sequence to be displayed after the first image can also be oriented and displayed based on the same angles of the bearing 834 in accordance with the same reference direction 440. Therefore, as multiple images of the sequence of composite images 840 are being displayed on a display, they can be oriented so that they point to the same angle range, and therefore the same features being imaged, as the sequence of composite images 840 is being displayed.

Composite image sequencer (CIS) 838 can include hardware, software or any combination of hardware and software for creating a sequence of composite images 810. Composite image sequencer 838 can include computer code, instructions or functions stored in memory (e.g., 218) to implement its functionality via processors 208. Composite image sequencer 838 can include the functionality to generate a sequence of composite images 840. CIS 838 can include the functionality to arrange the composite images 810 in the sequence and assign them their order. CIS 838 can include the functionality for synchronizing composite images 810 in the sequence of composite images 840 according to their bearing 834 or angle data assigned according to a specified reference direction 440.

Image processing circuit 206 can include functionality implemented in computer code or instructions stored in memory 218 and implemented via processors 208 to process constituent images 804 and composite images 810. Image processing circuit 206 can receive, store, process and transmit images, utilizing any functionality of constituent images 804, constituent image data 806, composite image manager 808, composite images 810 and composite image data 812. Image processing circuit 206 can utilize display output circuit 216, along with the image partitioner 815 to separate composite images 810 into parts to be transmitted over network 10.

It is understood that while FIG. 8 illustrates the system components in the illustrated stated arrangement, computing devices 304 can include any system components or functionality of one or more servers 200, and vice versa, any one or more servers 200 can include any system components or functionality of one or more computing devices 304. For example, computing devices 8304 can include bearing generator 816 and compass generator 820 and server 200 can include the display output circuit 318. Display output circuits 216 and 318 can each include the functionality and system components of the other and can process images for display, such as a computer screen display. Display output circuits 215 and 318 can display constituent images 804 and composite images 810, as well as sequences of composite images 840 along with any bearings 834 and compasses 836.

Figure 9:
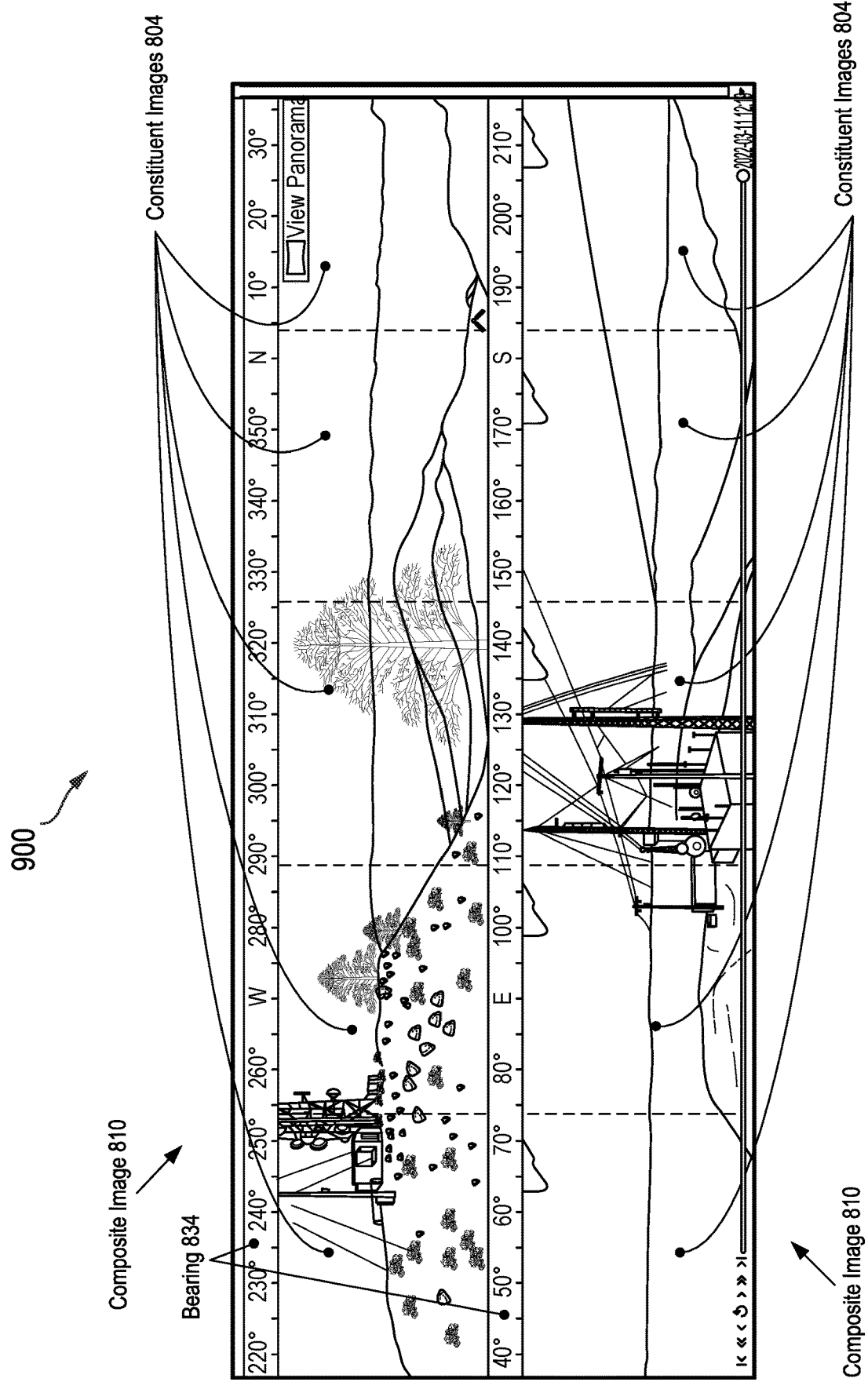
FIG. 9 is an example of a display view of an example composite image displayed with a bearing indicator.

FIG. 9 illustrates an example of a display view 900 that could be displayed on a client device's display. Display view 800 illustrates two example composite images 810, one above the other, and each one comprising its own bearing of about 180 degrees across the top portion of the respective image. The upper composite image 810 includes five constituent images 804 stitched together to form the upper composite image 810. The upper composite image 810 also includes a bearing indicator 834 across the top of the image, marking an angle range of about 180 degrees, more specifically spanning the range of below 220 degrees to about more than 35 degrees.

The lower composite image 810 of the example display view 800 also includes five constituent images 804 and a bearing 834 across the top of the image, also covering the range of about 180 degrees, from about less than 40 degrees to about more than 215 degrees. It is evident by observing both the bearings 834 for the upper composite image 810 and the lower composite image 810 that the sum of the two bearings 834 amounts to a full 360 degrees around the axis of the image capture system 114. The illustrated example therefore covers a full 360 degree circle around the axis, utilizing two composite images 810 composed of five individual constituent images 804, where each of the two composite images 810 cover about a half of the circle around the axis.

At the bottom side of the lower constituent image 810 there are player functions 832 for running through the sequence of composite images 840, including a replay button, forward and backward buttons, fast forward and fast rewind buttons and buttons for going back to the beginning or the end of the sequence. Using these player functions 832, a user can run through a sequence of composite images 840 several different ways, seeing all of 360 degrees around the axis of the image capture system 114 at the same time.

Figure 10:
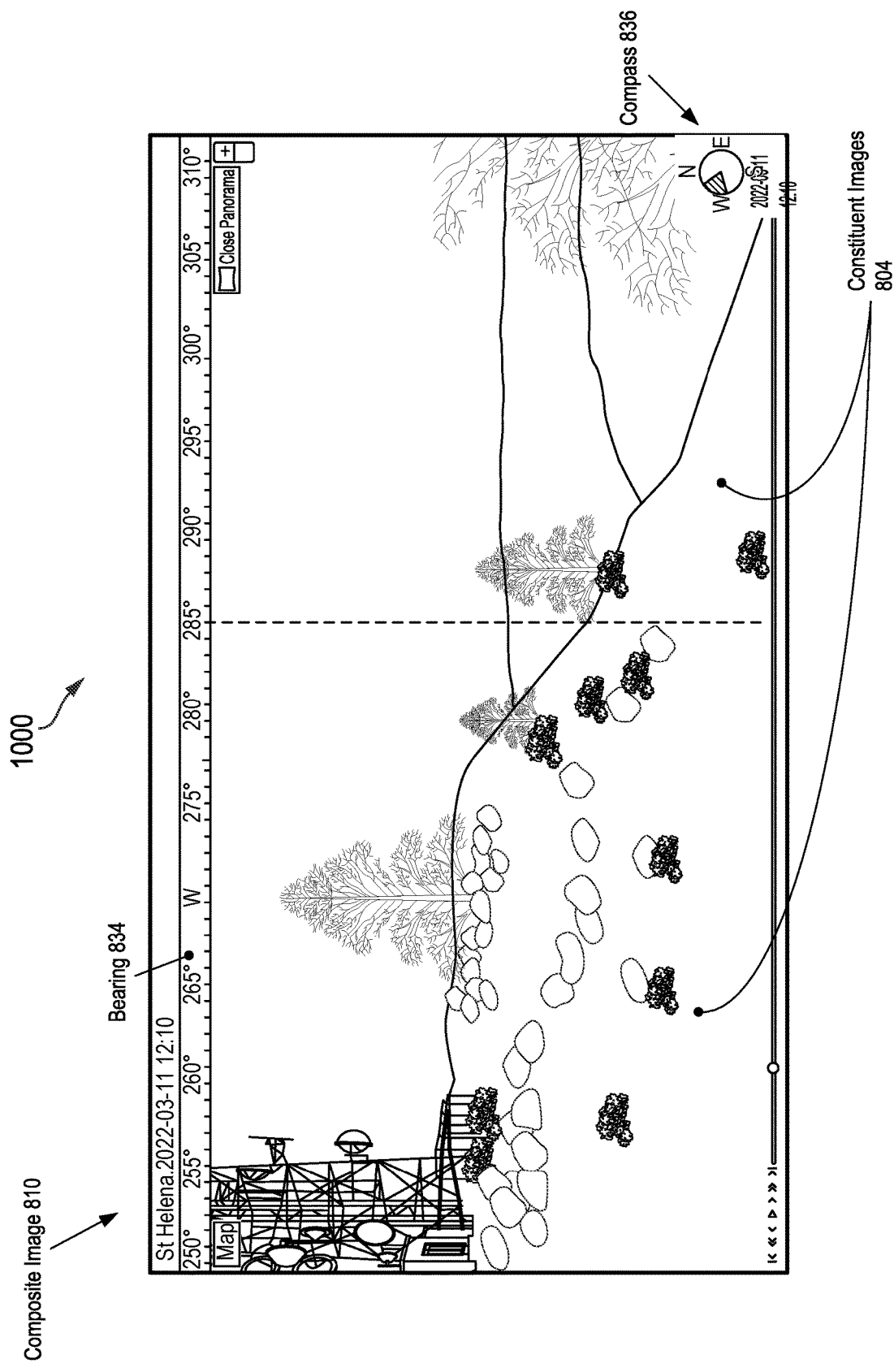
FIG. 10 is another example of a display view of an example composite image displayed with a bearing indicator and a compass.

FIG. 10 illustrates an example of a display view 1000 that could be displayed on a client device's display. In display view 1000, a composite image 810 is displayed. The displayed composite image 810 includes two constituent images 804 and a bearing across the top of the composite image 810 covering a range of angles of about 250 degrees to more than 310 degrees, thereby spanning more than about 60 degrees around the axis of an image capture system 114. At the bottom of the composite image 810 player functions 832 are displayed, including a play button, a forward and backward buttons, a fast forward and a fast rewind buttons and buttons for going back to the beginning or the end of the sequence of composite images 840 being displayed.

The present solution can relate to system in which one or more processors (e.g., 208) of one or more servers (e.g., 200) coupled to memory (e.g., 218) are configured to implement a plurality of tasks. For example, the one or more processors (e.g., 208) can identify a first plurality of constituent images (e.g., 804) captured by an image capture system (e.g., 114) rotating about an axis (e.g., 130, 132) over a first time period. Each constituent image (e.g., 804) of the first plurality of constituent images can correspond to a respective angle about the axis, such as angles of constituent image data 806 and a respective time within the first time period, such as time of the image of the constituent image data 806. The one or more processors can generate a first composite image (e.g., 810) based on the first plurality of constituent images (e.g., 804) arranged according to the respective angles of each of the first plurality of constituent images. The one or more processors can partition the first composite image (e.g., 810) into a first plurality of partial images (e.g., 842), where each partial image of the first plurality of partial images can be associated with a respective angle relative to a reference direction. For example, each partial image 842 of the first composite image can be split into any number of partial images 842, each of which corresponds to an angle about the axis, or a range of angles about the axis of the image capture system 114. The one or more processors (e.g., 208) can be configured to identify a second plurality of constituent images (e.g., 804) captured by the image capture system (e.g., 114) rotating about the axis over a second time period. Each image of the second plurality of constituent images can correspond to a respective angle about the axis and a respective time within the second time period. The one or more processors (e.g., 208) can generate a second composite image (e.g., 810) based on the second plurality of constituent images (e.g., 804) arranged according to the respective angles of the second plurality of constituent images. The respective angles can correspond, for example, to angles about the axis included in the constituent image data 806. The one or more processors can partition the second composite image (e.g., 810) into a second plurality of partial images (e.g., 842). Each partial image of the second plurality of partial images can be associated with a respective angle relative to the reference direction (e.g., 440). The one or more processors can transmit, to a client device, for presentation via a player (e.g., 830), each of the first plurality of partial images and the second plurality of partial images and the corresponding respective angle relative to the reference direction. The player can be configured to reconstruct the first composite image from the first plurality of partial images and the second composite image from the second plurality of partial images. The player can be configured to sequentially present the first composite image and the second composite image in accordance with the first time period and the second time period.

The one or more processors can select, from the first plurality of constituent images (e.g., 804), a first group of constituent images, each constituent image of the first group can be selected based on the respective angle about the axis (e.g., 130, 132) corresponding to the constituent image. The one or more processors can select, from the second plurality of constituent images (e.g., 804), a second group of constituent images, each image of the second group selected based on the respective angle about the axis (e.g., 130, 132) corresponding to the constituent image. The first group of constituent images can include a subset of the first plurality of constituent images. Each respective constituent image of the subset of the first plurality can include a first portion overlapping with a second portion of at least one of a preceding or a subsequent respective constituent image of the subset of the first plurality. The second group of constituent images can include a subset of the second plurality of constituent images. Each respective constituent image of the subset of the second plurality can include a third portion overlapping with a fourth portion of at least one of a preceding or a subsequent respective constituent image of the subset of the second plurality.

The image capture system (e.g., 114) can include a first image capture device (e.g., 124) capturing a first group of the first plurality of constituent images over at least a first 180 degrees about the axis and a first group of the second plurality of constituent images over at least the first 180 degrees about the axis. The image capture system (e.g., 114) can include a second image capture device capturing a second group of the first plurality of constituent images over at least a second 180 degrees about the axis and a second group of the second plurality of constituent images over at least the second 180 degrees about the axis.

The player (e.g., 830) can be configured to include a zoom function, and wherein a zoom level of the player adjusted during the presentation of the first composite image remains unchanged during the presentation of the second composite image. Each of the first plurality of constituent images can be captured by the image capture system at a different point in time within the first time period and each of the second plurality of constituent images is captured by the image capture system at a different point in time within the second time period. For example, the first plurality of constituent images can be captured within a first minute time period and a second plurality of constituent images can be captured within a second minute time period following the first minute time period. The time difference between the first minute time period can be any period, such as zero seconds, at least 1 minute, at least 5 minutes, at least 10 minutes, at least 12 minutes, at least 15 minutes, at least 30 minutes, at least an hour, at least 2 hours, at least 3 hours, at least 4 hours, at least 6 hours, at least 12 hours or at least 24 hours.

The one or more processors can be configured to identify each constituent image of the first plurality of constituent images based on the respective angle of the constituent image, wherein the respective angle is determined based on a reference direction (e.g., 440). The angle can include a degree angle about the axis with respect to the reference direction 440. The one or more processors can be configured to generate the first composite image (e.g., 810) by connecting a second end of a central portion of a first constituent image of the first plurality of constituent images with a first end of a central portion of a second constituent image of the second plurality of constituent images. A part of the first constituent image (e.g., 804) can overlap with a part of the second constituent image (e.g., 804).

The one or more processors can be configured to store for each partial image of the first composite image, in one or more data structures, (e.g., 824) a respective first association between the partial image (e.g., 824) and a respective first bearing indicator (e.g., 834) indicating at least one respective angle relative to the reference direction. The one or more processors can be configured to store for each partial image (e.g., 824) of the second composite image (e.g., 810), in the one or more data structures (e.g., 824), a respective second association between the partial image (e.g., 842) and a respective second bearing indicator (e.g., 834) indicating at least one respective angle relative to the reference direction. The one or more processors can be configured to transmit, to the client device, each partial image of the first composite image (e.g., 810) and the respective first bearing indicator (e.g., 834) and each partial image of the second composite image (e.g., 810) and the respective second bearing indicator (e.g., 834).

The player (e.g., 830) can include an actionable object (e.g., 832), which when interacted with, causes the player to navigate between the first composite image (e.g., 810) derived from the first plurality of constituent images captured over the first time period and the second composite image (e.g., 810) derived from the second plurality of constituent images captured over the second time period. The player can be configured to include a zoom function (e.g., 832), and wherein adjusting the zoom of the first composite image causes the player to adjust a resolution of the first composite image. The player (e.g., 830) can be configured to include a pan function (e.g., 832), and wherein panning the first composite image of the player to display a first portion of the first composite image (e.g., 810) corresponding to a first set of angles causes the player to display a portion of the second composite image (e.g., 810) corresponding to the first set of angles.

The present solution can include a system that can include a video player 830, that can include a panoramic canvas player having a file player.js to display images from cameras deployed on mountains and hills to identify and monitor wildfires. Each monitoring spot can be referred to as a station and each station could include one or more cameras (e.g., image capture devices 124). The cameras take images periodically and continuously and the station can send the images (e.g., constituent images 804) to a cloud service, which can be referred to as a Pano cloud. The cloud service, which can be provided by one or more servers, such as servers 200, can include one or more services or processes that process, compress, store and serve the images, including composite panoramic images, for the front-end users.

When a front end user or device calls an end point end station camera, such as "/ec" or "/ecs" to acquire the station meta data for images as well as the image, the front end user or device can send API calls to fetch panorama images (e.g., composite images 810). Meanwhile, every time period, such as for example every minute, backend servers (e.g., 200) can receive a group of constituent images 804 from the station, such as 8 or 10 images, to form a composite image 810. Therefore, a new composite image 810 can be generated periodically, such as every minute, and include constituent images 804 generated during that minute.

Backend servers 200 can provide, the composite image 810 as well as the constituent images 804 via one or more web interfaces, such as a website. For example, backend servers 200 can provide individual constituent images 804 using an internet address, such as: https://companyweb-site.ai/station_number/scale_number/sequence_number.
The group of constituent images 804 can comprise the parts of the full composite image, by being concatenated horizontally in incremental order in order to produce the full panorama composite image 810.

Front-end device, such as the client or user device, can fetch and receive parts (e.g., 842) of the panoramic composite image 810 and concatenate them or put them together to regenerate or reform a whole seamless composite image 810. This can be implemented by the player 830, whose other features or functions (e.g., 832) can include buffering, playback controls, panning, zoom in/out, play the images like a video, mark a fire, etc.

The player 830 can utilize HTML5 canvas to plot the images dynamically. The size of the canvas can vary in sizes. In some implementations, the canvas may be not large enough to hold all the concatenated constituent images 804 forming the composite image 810, and so scroll, panning and zoom player functions 832 can be used. The player 830 can include a float number option, such as "this.state.zoom" which can be set to a number, such as 0.5. In some instances, panoramic composite images 810 with dimension 975*879 can be plotted as 487.5*439.5 images. The player 830 can include a built-in canvas API, such as "drawImage" API which can draw an image enlarged or shrunken. The API can be used via an instruction or a command, such as: ctx.drawImage (image, sx, sy, sWidth, sHeight, dx, dy, dWidth, dHeight)

The player 830 can include multiple variables, inputs or instructions. For example, a variable or input "dois" can identify the number of parts 842 which the panorama composite image 810 has been cut or partitioned into. Therefore "dois—10" can refer to the composite image 810 cut into 10 image parts 842. For example, a variable or input "panoWidth/panoHeight" can be used to identify unzoomed, unscaled, full size of the original panoramic composite image. For example "panoWidth/panoHeight—19500/1758" can identify an image as having 19500 pixels width and 1758 pixels in height.—9 Full Panorama Image" above.

Variables or inputs for a canvas can include for example "ctx:" to identify the canvas context in two dimension. They can include "canvasOffsetX:" to identify the distance between canvas left-boundary and the window left-boundary. They can also include "canvasOffsetY:" to identify the distance between canvas top-boundary and the window top-boundary. Variables or inputs for a meta data can include, for example, "scale" such as "scale—1:" which can identify or define camera images, such as constituent images 804, to be images with size be up to 1 MB/file. The size can also be set to any other size in terms of megabytes. In some instances, to save bandwidth, the backend servers can keep or store, in the data structures 824, three different sizes of every image, such as the full size, half size and a quarter size, and can serve each one of them upon request. For example, an original composite image 804 with dimension 1950*1758 can have a version that is scaled to a half size (e.g., scale/2) having a dimension 975*879. For example, the scale size for service to client mobile devices can be set to a half of the value to be served on a client laptop or a desktop computer. Variables or inputs can include "canvasWidth/canvasHeight—1200/219" can define the width and height of the canvas, where the images displayed can be plotted. Variables or inputs can include "width/height—975/879:" that can define or identify the width and height of every received image, scaled.

Variables or inputs can include values for a station 102. For example, "zoom" can be set to a scale or zoom level of the player 830. A "scaledWidth/scaledHeight" can be set to equal "meta.width*state.zoom" and can include or correspond to zoomedWidth/zoomedHeight, which can indicate the actual plotted image dimension considering zoom level. For example, "panoWidth" can be set to "state.scaledWidth*camera.dois", which can correspond to the expected panorama full width of concatenated images, considering zoom level. For example, "xm/ym: x/y" can be used to coordinate of the mouse, which can be updated based on any one or more of "onmousewheel", "onmouseenter", "onmousemove", "onmousedown", "onmouseout", "onmouseup." For example, "xd/yd: x/y" can coordinate the mouse when mousedown. It can be used to calculate how far the mouse moves when dragging. For example, "xmd:" can be used to state.xm value when mouse down. For example, "xi/yi:" can treat top-left point of the canvas as (0, 0). The point of image top-left can be (xi, yi). For example, "xo/yo:" can be used to offset the mouse down position relative to the top-left point of the panorama image.

A sequence of the images (e.g., 804) from each camera (e.g., 124) rotation can be used to generate a single panorama composite image 810. The sequence of images can be numbered sequentially. One sequence can be produced every period. A period within which constituent images 804 can be 15 seconds, 30 seconds, 1 minute, 2 minutes, 3 minutes, 4 minutes, 5 minutes, 6 minutes, 10 minutes, 15 minutes, 20 minutes, 30 minutes, 40 minutes, 50 minutes, 60 minutes or any other period above 60 minutes.

A sequence can be used instead of an epoch minute so that cameras (e.g., 124) of edge computers (e.g., 104) can rotate at different periods and still be a part of the same sequence. This can allow the cameras (e.g., 104) to rotate at different speeds, within the period for forming a single composite image 810, and still allow the images from different cameras to be used for the composite image 810.

Constituent images 804 can be stored with metadata (e.g., 806) that include angles defined in terms of epoch. For example, a constituent image 804 can be stored in terms of an angle to which the image is termed, defined in terms of epoch minutes and/or epoch seconds. The images can include an epoch start and epoch end, which can correspond to the beginning of the image on the start of the image 804, such as a start of the width of the image on one end and the end of the width of the image on the other, thus defining a range of angles which the constituent image 804 covers. The angles can be defined in terms of epoch minutes/seconds or angles about the axis, or can be converted between the two, as needed. The angles for each image 804 can be defined in terms of the reference direction 2140.

Image capture devices 124 can rotate around the axis in a stop and go fashion. For example, an image capture device 124 can start from an initial position and take a first constituent image 804. Then, the image capture device 124 can rotate a set number of degrees, such as 36 degrees, and stop to stabilize, zoom and adjust and take a second constituent image 804. Then, the image capture device 124 can rotate another set number of degrees, such as 36 degrees, stop to stabilize, zoom and adjust and take a third constituent image 804. The image capture device 124 can continue in such a stop and go fashion for about one minute to take about 5 images, thus averaging about 10-12 seconds per image. The image capture device 124 can, after taking the last (e.g., fifth) image, continue rotating in the same direction back to the initial position to take the first constituent image 804 for the next composite image 810.

Figure 11:
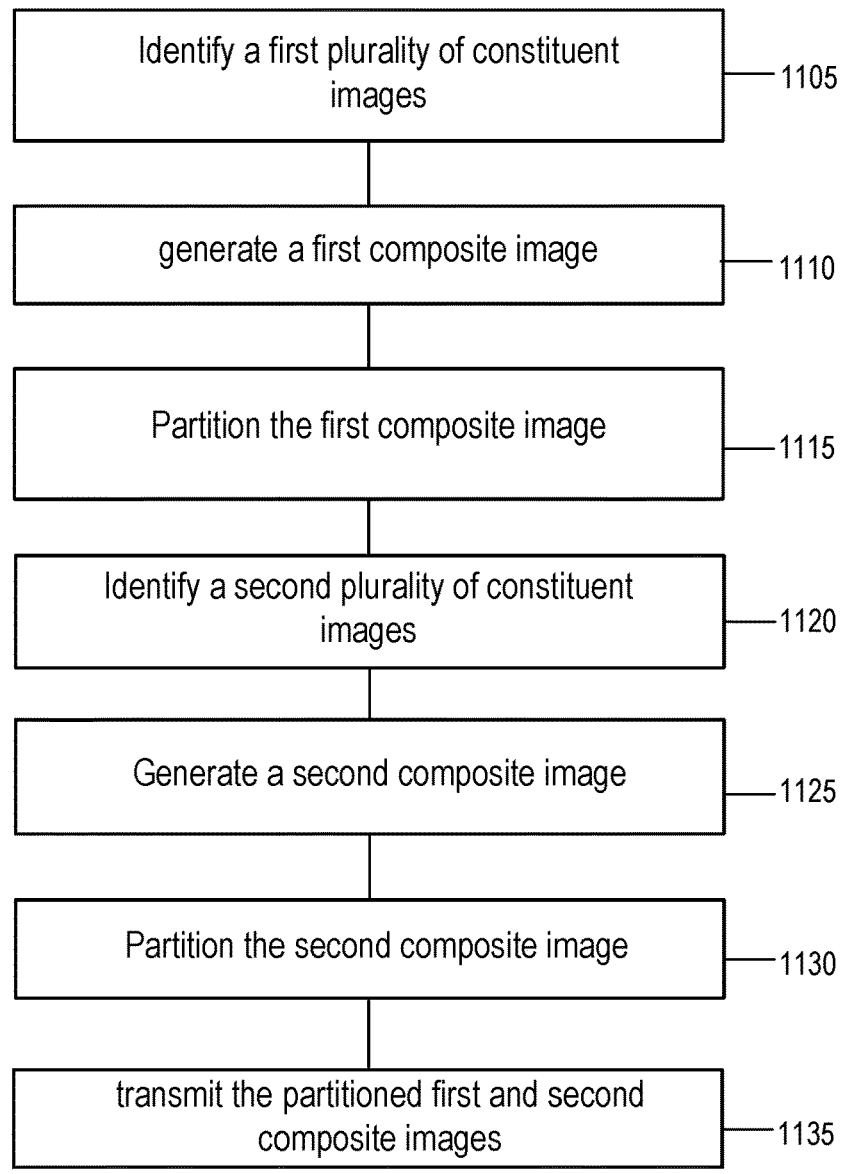
FIG. 11 is an example of a flow diagram illustrating an example method for generating and displaying composite images in accordance with the system features of the present disclosure.

FIG. 11 illustrates a method 1100 for utilizing a system 800 to generate and display composite images generated by constituent images generated about an image capture system. Method 1100 can include acts 1105 to 1135. At act 1105, a first plurality of constituent images is identified. At act 1110, a first composite image is generated. At act 1115, the first composite image is partitioned. At act 1120 a second plurality of constituent images is identified. At act 1125, a second composite image is generated. At act 1130, the second composite image is partitioned. At act 1135 the partitioned first and second composite images are transmitted.

At act 1105, a first plurality of constituent images is identified. One or more processors can identify a first plurality of constituent images captured by an image capture system rotating about an axis over a first time period. Each constituent image of the first plurality of constituent images can correspond to a respective angle about the axis and a respective time within the first time period. In an implementation, an image processing system can identify the plurality of constituent images to use to form a composite image based on their constituent image data. For example, each of the first plurality of constituent images can be captured by the image capture system at a different point in time within the first time period. Each of the second plurality of constituent images can be captured by the image capture system at a different point in time within the second time period. Image processing system can identify the first plurality of constituent images for the first composite image based on the time data of the first plurality of constituent images. For example, image processing system can identify all constituent images from a first time period as constituent images to use to generate a first composite image and images of a second time period as constituent images to use to generate a second composite image.

At act 1110, a first composite image is generated. One or more processors can generate a first composite image based on the first plurality of constituent images arranged according to the respective angles of each of the first plurality of constituent images. A device, such as a server or a computing device, can store, in one or more data structures, a first association between the first composite image and a first bearing indicator indicating a first range of angles about the axis and along a width of the first composite image. The first range of angles can comprise the respective angles of each of the first group of constituent images.

Generating the first composite image can include connecting a second end of a central portion of a first constituent image of the first plurality of constituent images with a first end of a central portion of a second constituent image of the second plurality of constituent images. A part of the first constituent image can overlap with a part of the second constituent image.

At act 1115, the first composite image is partitioned. The one or more processors can partition first composite image into a first plurality of partial images. Each partial image of the first plurality of partial images can be associated with a respective angle relative to a reference direction. For each partial image of the first composite image, the one or more processors can store in one or more data structures, a respective first association between the partial image and a respective first bearing indicator indicating at least one respective angle relative to the reference direction.

At act 1120 a second plurality of constituent images is identified. The one or more processors can identify a second plurality of constituent images captured by the image capture system rotating about the axis over a second time period. Each image of the second plurality of constituent images can correspond to a respective angle about the axis and a respective time within the second time period.

At act 1125, a second composite image is generated. The one or more processors can generate a second composite image based on the second plurality of constituent images arranged according to the respective angles of the second plurality of constituent images. A device, such as a server or a computing device can store in the one or more data structures, a second association between the second composite image and a second bearing indicator indicating a second range of angles about the axis and along a width of the second composite image. The second range of angles can comprise the respective angles of each of the second group of constituent images.

At act 1130, the second composite image is partitioned. The one or more processors can partition the second composite image into a second plurality of partial images. Each partial image of the second plurality of partial images can be associated with a respective angle relative to the reference direction. For each partial image of the second composite image the one or more processors can store, in the one or more data structures, a respective second association between the partial image and a respective second bearing indicator indicating at least one respective angle relative to the reference direction.

At act 1135 the partitioned first and second composite images are transmitted. The one or more processors can transmit to a client device, for presentation via a player, each of the first plurality of partial images and the second plurality of partial images and the corresponding respective angle relative to the reference direction. The player can be configured to reconstruct the first composite image from the first plurality of partial images and the second composite image from the second plurality of partial images and sequentially present the first composite image and the second composite image in accordance with the first time period and the second time period. The device can combine for presentation via the player the first composite image with the first bearing indicator and the second composite image with the second bearing indicator.

Figure 12:
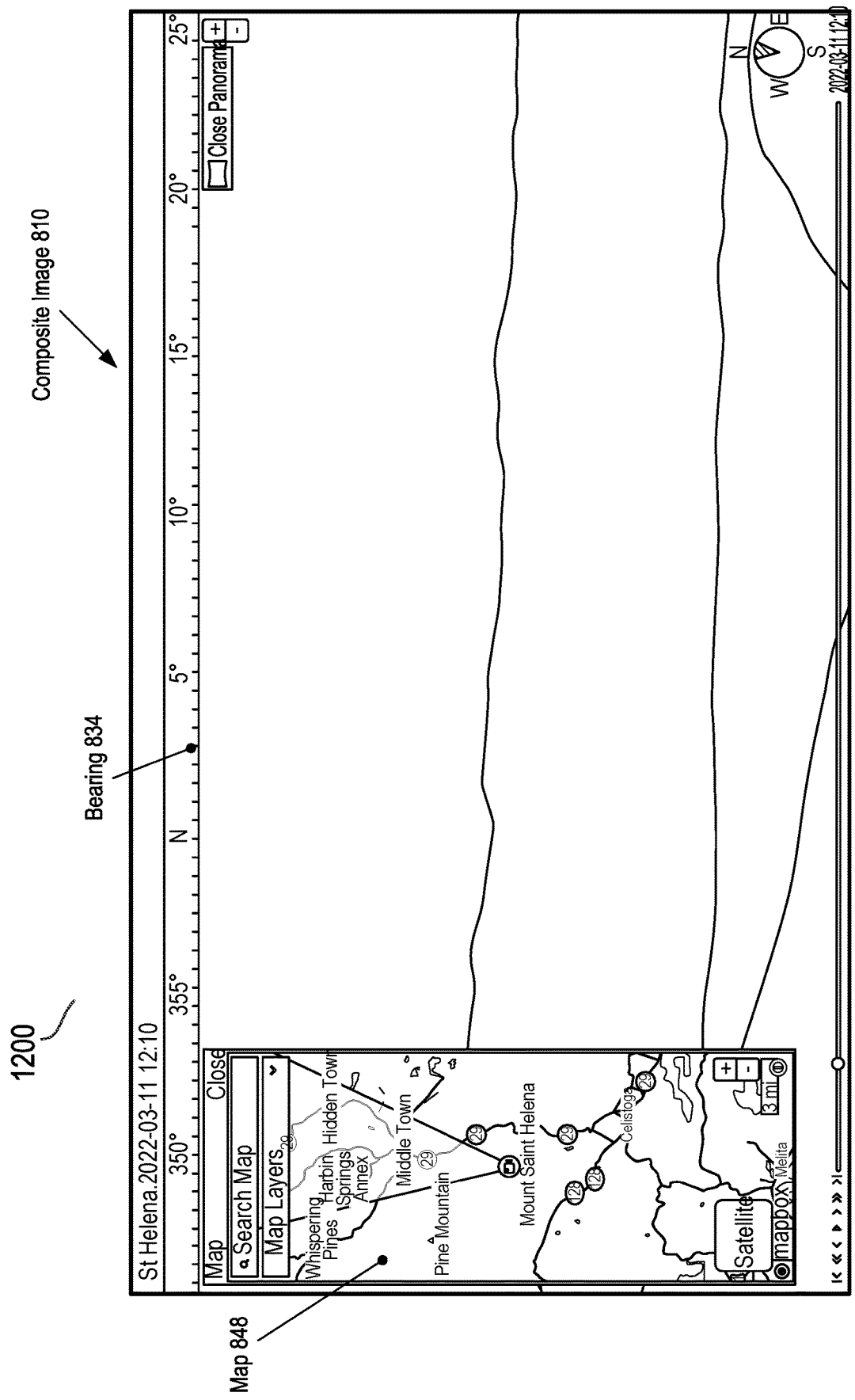
FIG. 12 is another example of a display view of an example composite image displayed with a map indicator.

FIG. 12 illustrates an example of a display view 1200 that could be displayed on a client device's display. In display view 1200, a composite image 810 is displayed. The displayed composite image 810 can include multiple constituent images 804 that span angles from about 345 degrees to about 25 degrees, along with a bearing 834 across the top of the composite image 810 covering the same range of angles. The display view 1200 includes features in the image, but also a map 848 identifying various geographic locations and features, such as towns, roads, rivers and so on. Map 848 also provides an indicator, in the shape of a triangle, illustrating the angular range corresponding to the display view 1200. The triangle shaped indicator can include a starting point of the triangle can be at the location of the image capture system 114 on the map 848 and can widen as the distance from the image capture system 114 increases. The widening of the angle can be in accordance with the angular range corresponding to the displayed view 1200. At the bottom of the composite image 810 player functions 832 are displayed, including a play button, a forward and backward buttons, a fast forward and a fast rewind buttons and buttons for going back to the beginning or the end of the sequence of composite images 804 being displayed.

The present disclosure can also relate to a system that can include a server comprising one or more processors, coupled to memory. The server can identify a composite image corresponding to a range of angles about an axis of rotation of an image capture system. The server can store, in one or more data structures, an association between the composite image and a bearing indicator indicating the range of angles along a width of the composite image. Each respective angle of the range of angles can correspond to a respective portion of the width of the composite image. The server can present, on a display, a first portion of the composite image corresponding to a first set of angles of the range of angles and a first portion of the bearing indicator including the first set of angles. The server can also display at least one of a first compass indicator indicating, on a compass, with the first set of angles relative to the range of angles, or a first map indicator indicating a first geographic region on a map, where the first geographic region corresponds to the first set of angles and a location of the image capture system. The server can determine, responsive to a user action that causes a second portion of the composite image to be displayed, a second set of angles of the range of angles corresponding to the second portion of the composite image. The server can present, on the display, responsive to determining the second range of angles, a second portion of the composite image corresponding to the second range of angles and a second portion of the bearing indicator including the second set of angles. The server can present, on the display, at least one of a second compass indicator, on the compass, indicating the second set of angles relative to the range of angles, where the second compass indicator can be generated based on the second set of angles, or a second map indicator indicating a second geographic region on the map, where the second geographic region can correspond to the second set of angles and the location of the image capture system.

The system can include the composite image that can correspond to the range of angles relative to a reference direction about the axis of rotation, the reference direction corresponding to a reference angle of the range of angles. The bearing indicator can indicate at least one of four cardinal directions, including: north, east, south or west. The composite image can be generated from a sequence of constituent images. Each constituent image of the sequence can correspond to a respective subset of the range of angles.

The range of angles of the composite image can extend from zero to at least 180 degrees around the axis of rotation. The range of angles of the composite image can extend from zero to 360 degrees about the axis of rotation and wherein the server stores an association between the composite image and the bearing indicator indicating the range of angles spanning 360 degrees.

The system can include the server to present, on the display, both of the first map indicator and the first compass indicator. The server can present, on the display both of the second map indicator and the compass indicator. The system can be configured such that the user action causes the first portion of the composite image to pan or scroll to the second portion of the composite image and the first map indicator and the second map indicator each can have a first shape and a first size, or the first compass indicator and the second compass indicator each can have a second shape and a second size.

The system can be configured such that the user action causes a zoom setting for displaying the first portion of the composite image to be changed and the first map indicator has a first shape and a first size and the second map indicator has a second shape and a second size, or the first compass indicator has a third shape and a third size and the second compass indicator has a fourth shape and a fourth size.

The system can include the composite image being a first composite image captured at a first time and the server can be configured to identify a plurality of second composite images captured by the image capture system corresponding to the first set of angles subsequent to the first composite image being captured by the image capture system. The plurality of second composite images can be arranged in chronological order. The server can sequentially present in the chronological order respective first portions of the plurality of second composite images subsequent to presenting the first portion of the first composite image.

The server can present the composite image corresponding to the range of angles from zero to 360 degrees about the axis of rotation of the image capture system and captured by the image capture system during a first time period. The server can present a second composite image corresponding to the range of angles from zero to 360 degrees about the axis of rotation of the image capture system and captured by the image capture system during a second time period, the second time period following the first time period.

The server can identify a first sequence of composite images. Each composite image of the first sequence captured by the image capture system can be based on a first time interval. The server can receive a selection of a viewing setting that can correspond to a time duration and determine a subset of the first sequence of composite images. Each composite image of the subset can be selected based on a second time interval. The second time interval greater than the first time interval and computed based on the time duration. The server can sequentially present for display, each composite image of the subset in chronological order.

The server can receive a request to mark an incident at a first position within the composite image and provide an indicator identifying the first position. The server can determine, based on the first position and a stored association between the composite image and the range of angles, an angle of interest of the range of angles corresponding to the first position. The server can present, for display, a map showing the map indicator identifying a geographical region based on the angle of interest corresponding to the first position.

The server can identify, on a first composite image captured by the first image capture system, a first position within the first composite image corresponding to an incident. The server can determine a first angle of interest based on the first position. The server can identify, on a second composite image captured by the second image capture system, a second position within the second composite image corresponding to the incident. The server can determine a second angle of interest based on the second position. The server can present, for display, on a map: (i) a first map indicator based on the first angle of interest and a geographic location of the first image capture system, (ii) a second map indicator based on the second angle of interest and a second geographic location of the second image capture system, and (iii) a third map indicator identifying a location of the incident at a region where the first map indicator intersects the second map indicator.

The server can receive a request to triangulate a location of the incident using one or more second composite images captured from a second image capture device at a second geographic location. The server can identify the location of the incident determined based on an angle of interest of the range of angles corresponding to the location of the incident. The server can display, on the map, the location of the fire and the map indicator indicating an intersection of the first map indicator and the second map indicator.

Figure 13:
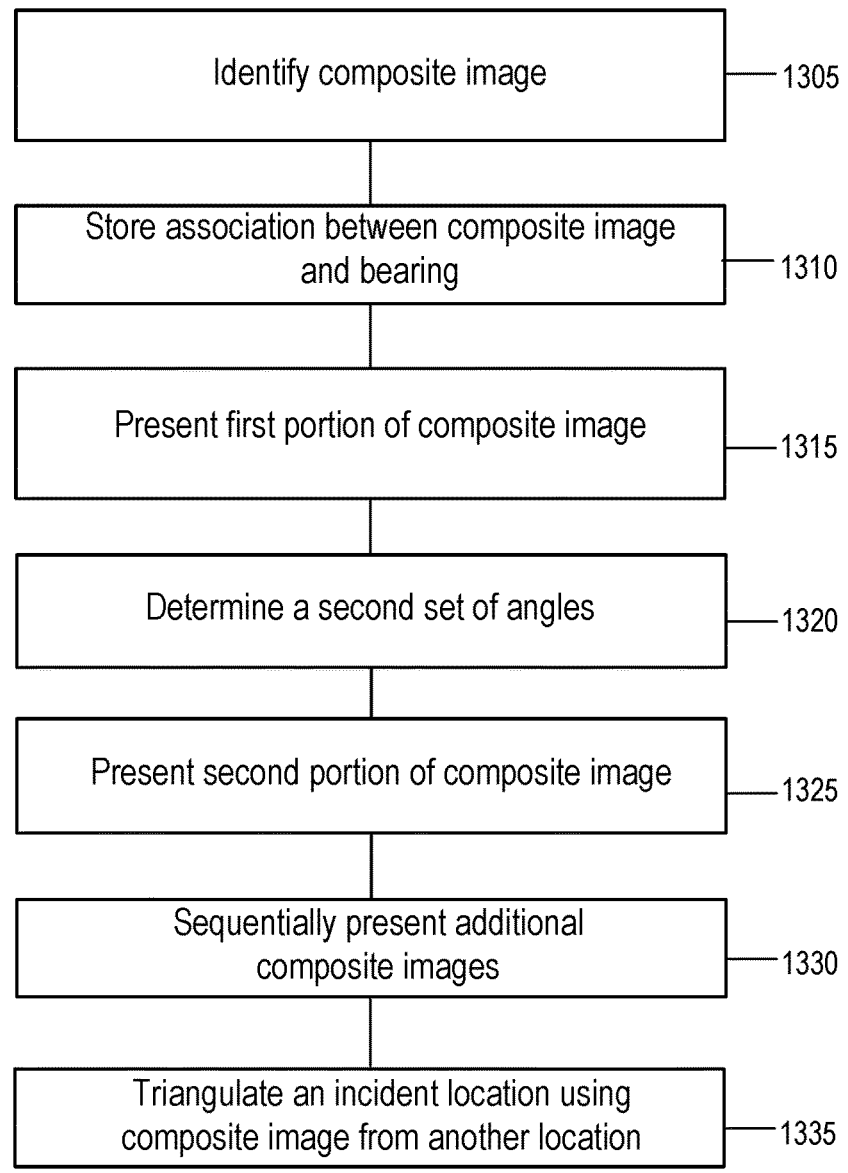
FIG. 13 is an example of a flow diagram illustrating an example method for providing angular an view indications based on displayed images in accordance with the system features of the present disclosure.

FIG. 13 illustrates a method 1300 for utilizing a system 800 to generate and display composite images generated by constituent images generated about an image capture system. Method 1300 can include acts 1305 to 1335. At act 1305, a composite image is identified. At act 1310, an association between composite image and bearing is stored. At act 1315, the first portion of composite image is presented. At act 1320 a second set of angles is determined. At act 1325, a second portion of composite image is presented. At act 1330, additional composite images are sequentially presented. At act 1335, an incident location is triangulated using composite image from another location.

At act 1305, a composite image is identified. A client device can identify a composite image corresponding to a range of angles about an axis of rotation of an image capture system. The composite image can include a panoramic image corresponding to a range of at least 180 degrees about an axis of an image capture system. The composite image can include a panoramic image corresponding to a range of 360 degrees about the axis of the image capture system.

At act 1310, an association between composite image and bearing is stored. The client device can store, in one or more data structures, an association between the composite image and a bearing indicator. The bearing indicator can indicate the range of angles along a width of the composite image. Each respective angle of the range of angles corresponding to a respective portion of the width of the composite image.

At act 1315, the first portion of composite image is presented. The client device can present, on a display, a first portion of the composite image. The first portion of the composite image can correspond to a first set of angles of the range of angles. The client device can present a first portion of the bearing indicator including the first set of angles. The client device can present at least one of a first compass indicator indicating, on a compass, the first set of angles relative to the range of angles, or a first map indicator indicating a first geographic region on a map, the first geographic region corresponding to the first set of angles and a location of the image capture system.

At act 1320 a second set of angles is determined. The client device can determine, responsive to a user action that causes a second portion of the composite image to be displayed, a second set of angles of the range of angles corresponding to the second portion of the composite image.

At act 1325, a second portion of composite image is presented. The client device can present, on the display, responsive to determining the second range of angles, a second portion of the composite image corresponding to the second range of angles. The client device can present a second portion of the bearing indicator including the second set of angles. The client device can present at least one of a second compass indicator, on the compass, indicating the second set of angles relative to the range of angles, the second compass indicator generated based on the second set of angles, or a second map indicator indicating a second geographic region on the map, the second geographic region corresponding to the second set of angles and the location of the image capture system.

At act 1330, additional composite images are sequentially presented. The client device can identify a first sequence of composite images. Each composite image of the first sequence can be captured by the image capture system based on a first time interval. The client device can receive a selection of a viewing setting corresponding to a time duration and determine a subset of the first sequence of composite images. Each composite image of the subset can be selected based on a second time interval. The second time interval can be greater than the first time interval and computed based on the time duration. The client device can sequentially present, for display, each composite image of the subset in chronological order.

At act 1335, an incident location is triangulated using composite image from another location. The client device can receive a request to mark an incident at a first position within the composite image and provide an indicator identifying the first position. The client device can determine, based on the first position and a stored association between the composite image and the range of angles, an angle of interest of the range of angles corresponding to the first position. The client device can present, for display, a map showing the map indicator identifying a geographical region based on the angle of interest corresponding to the first position. The client device can identify, on a first composite image captured by the first image capture system, a first position within the first composite image corresponding to an incident. The client device can determine a first angle of interest based on the first position. The client device can identify, on a second composite image captured by the second image capture system, a second position within the second composite image corresponding to the incident. The client device can determine a second angle of interest based on the second position. The client device can present, for display, on a map, a first map indicator based on the first angle of interest and a geographic location of the first image capture system, a second map indicator based on the second angle of interest and a second geographic location of the second image capture system, and a third map indicator identifying a location of the incident at a region where the first map indicator intersects the second map indicator.

The one or more processors can transmit to the client device, such as the computing system, each partial image of the first composite image and the respective first bearing indicator and each partial image of the second composite image and the respective second bearing indicator. The player can include an actionable object. When the actionable object is interacted with, it can cause the player to navigate between the first composite image derived from the first plurality of constituent images captured over the first time period and the second composite image derived from the second plurality of constituent images captured over the second time period. The player can be configured to include a pan function. Panning the first composite image of the player to display a first portion of the first composite image can correspond to a first set of angles and cause the player to display a portion of the second composite image corresponding to the first set of angles.

D. Multi-Mode Image Capture Device Operation

An image capture system, such as the ones described herein, can be deployed at a station to capture images of its surroundings and generate panoramic views by stitching together images captured from multiple image capture devices, such as cameras. In such configurations, it can be a challenge to service a request to utilize one of the cameras for other specific uses, such as to focus the camera onto a specific object for a more detailed look, service user requests to control the camera or change the camera's mode of operation. Addressing such requests can temporarily restrict the camera from capturing images for the ongoing periodic formation of the composite (e.g., panoramic) images, hindering the image capture system's ability to provide continuous panoramic surveillance of the area, leading to gaps in the captured panoramic view and potentially compromising the surveillance of the station area. The problem becomes more significant if requests to use an individual camera persist for prolonged periods of time.

The technical solutions described herein overcome these challenges by providing various operating modes of the system along with a functionality to dynamically manage the camera operating modes facilitating simultaneous accommodation of panoramic surveillance of the area alongside the user request for camera control. For instance, the system can use one or more cameras to capture respective sets of images of the surrounding area around a central system location (e.g., an axis) to generate 360-degree composite panoramic images of the region. Upon receiving a user request, a first image capture device (e.g., a first camera) can transition from its panoramic image capture mode of operation to a dedicated mode (e.g., zooming mode). In the zooming mode, the first image capture device captures a detailed image of the interested object or location. Simultaneously, the remaining cameras adjust their scanning patterns to cover the range of angles previously captured by the first camera that is now used to service user requests. In doing so, the technical solutions provide an uninterrupted acquisition of images for the ongoing 360-degree panoramic image generation, while facilitating user's requests to zoom in on specific points of interest.

Figure 14:
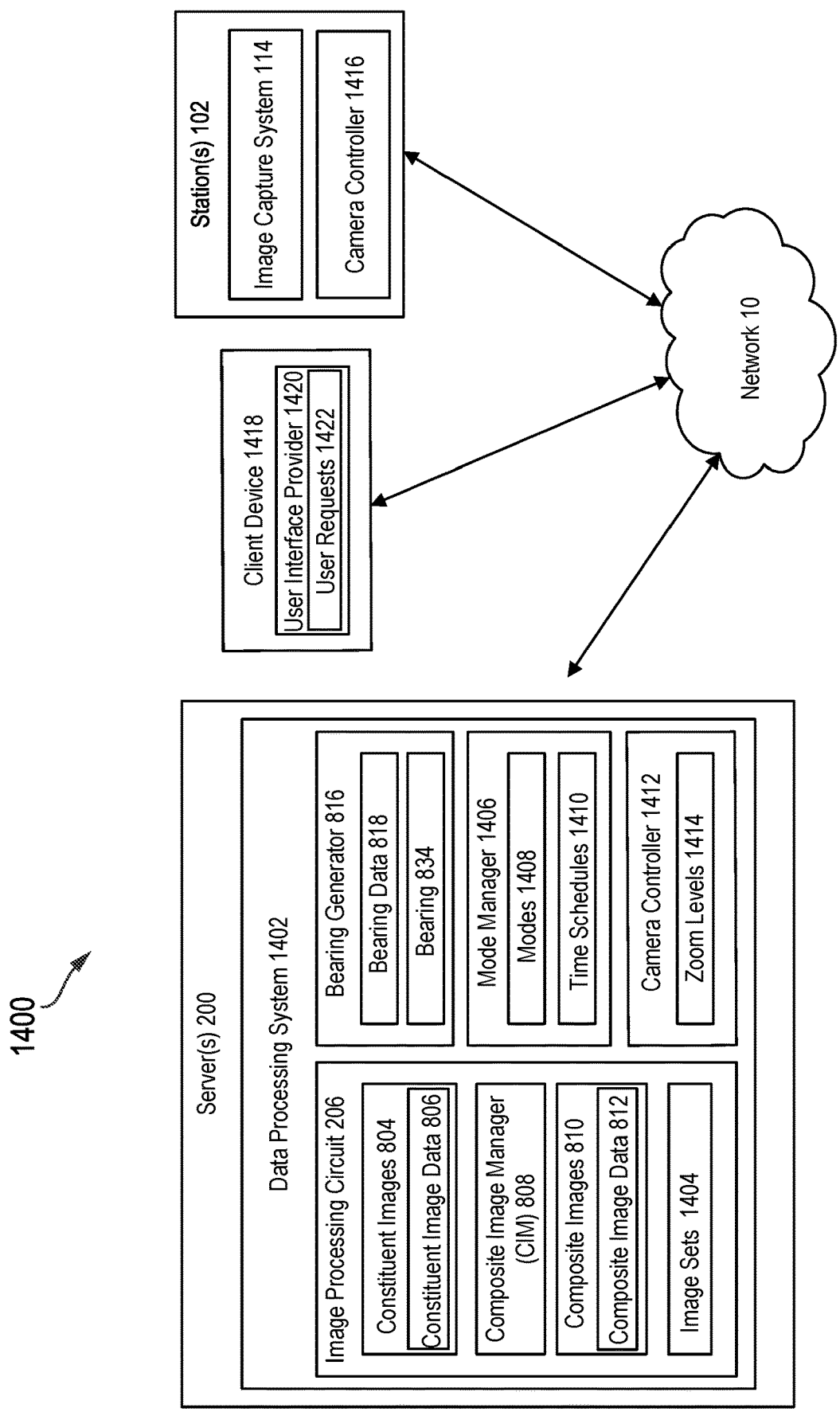
FIG. 14 illustrates an example of a system for implementing multi-mode image capture device operation, according to an example embodiment.

FIG. 14 illustrates an example system 1400 for multi-mode image capture device operation by an image capture system. Example system 1400 can include one or more servers 200 communicatively coupled with one or more client devices 1418 and one or more stations 102 over one or more networks 10. Server 200 can include one or more data processing systems (DPSs) 1402. The data processing system 1402 can include one or more image processing circuits (IPCs) 206, bearing generators 816, mode managers 1406 and camera controllers 1412. IPC 206 can include one or more image sets 1404, constituent images 804 having one or more constituent image data 806, composite image managers (CIMs) 808 and composite images 810 having one or more composite image data 812. Bearing generator 816 can include, manage, select, or configure one or more bearing data 818 and bearings 834. Mode manager 1406 can include, manage, select, or configure one or more modes 1408 and time schedules 1410. Camera controller 1412 can include or provide one or more camera control functionalities, such as image direction control, image capture controls or controls of zoom levels 1414. Client device 1418 can include one or more user interface providers 1420 including or providing one or more user interfaces and one or more requests 1422, such as requests from a user of the client device 1418. Station 102 can include one or more image capture systems 114 and camera controllers 1416.

Server 200 can transmit and/or receive data via the display output circuit 318 of a client device 1418, maintaining a communication channel. A user can utilize a client device 1418 (e.g., including one or more display output circuits 318) having user interface providers 1420 providing user interface with views of various constituent images 804, composite images 810 and image sets 1404 and facilitating user requests 1422 for zoom control of image capture systems 114 at a station 102. The client device 1418 can serve as an intermediary device or a generating device for user-initiated requests 1422. A request 1422 (such as a user request 1422) can include an instruction or an action. For example, the request 1422 can be initiated by a user or another system that seeks the performance of a specific operation. Requests 1422 can be communicated via a computer instruction, a voice-initiated command, an API, or via electronic transmission. Requests 1422 can range from simple instructions such as taking a picture or zooming in on an object to more complex commands such as showing the latest sensor data or initiating a security scan, among others.

Requests 1422, such as user requests 1422, can include any message, instruction, command or a request to utilize an image capture device 124. Request 1422 can include a request or an instruction to take control of an image capture device 124 of a plurality of image capture devices 124 or to change a mode 1408 of operation of the image capture device 124. Request 1422 can include a request of a user from a client device 1418 or an application programming interface (API) call or instruction generated by a computing system, such as a server 200 or a data processing system 1402. Request 1422 can include a request by a user of a client device 1418 to take over a functionality of an image capture device 124 to turn or zoom the image capture device 124 onto an object or toward a particular direction (e.g., bearing 834 angle). Request 1422 can include an API call or instruction generated in response to a machine learning (ML) detecting a potential incident, such as smoke or a fire, at a particular location or direction (e.g., at a particular bearing 834) of a particular image capture device 124.

User interface provider 1420 can include any combination of hardware and software to provide one or more user interfaces to facilitate user interaction with the image or video data. User interface provider 1420 can integrate with browser applications to facilitate user interaction and functionality within graphical user interface, such as one or more web environments or web pages in which constituent images 804, composite images 810, image sets 1404 or any other image or video data can be presented to the users. User interface provided by the user interface provider can include any data or information from a data processing system 1402, including any images or videos captured by image capture systems 114 responsive to user-initiated requests for particular zoomed in or directed images. User interface provider 1420 can provide various input means, including, but not limited to, touchscreen inputs, keyboard and mouse inputs, voice commands, and gesture recognition, among others. User interface provider 1420 can integrate with virtual or augmented reality. User interface provider 1420 can enable remote camera control and/or live feed viewing, with hotspots, weather data, and fire perimeters overlaying on the feed. User interface provider 1420 can feature interactive maps to show live feeds.

Data processing system 1402 can include any combination of hardware and software for processing and managing data. Hardware in data processing system 1402 can include, but is not limited to, central processing units (CPUs), graphics processing units (GPUs), and field-programmable gate arrays (FPGAs) for various processing tasks. Software can include, but is not limited to, operating systems (OS), image processing libraries, machine learning (ML) frameworks, and applications customized for specific data processing tasks.

Image sets 1404 can include any set of images 804, also referred to as constituent images 804, to be combined to generate a composite image 810. The image sets 1404 can include photographs from same or diverse sources, including, but not limited to, digital cameras, scanners, or databases. The image sets 1404 can be gathered and processed by composite image manager 808 to generate composite images 810. For instance, in environmental monitoring/surveillance, image sets 1404 can include images for area coverage, which the composite image manager 808 can combine to address various objectives, including, but not limited to, enhancing resolution, broadening the field of view, or generating detailed visual representations.

Images sets 1404 can include images that have or are associated with bearings 834 which can include angles relative to a system axis, such as a system center 130. Bearings 834 can be used to piece together sets of images 804 (e.g., constituent images 804 of a composite image 810) and identify objects according to their location with respect to the bearing 834 value (e.g., angle to which the object corresponds). Bearings 834 can be established according to a consistent methodology or a reference point, such as the true north, thereby resulting in all bearings 834 across all stations 102 having a consistent distribution of angles around the composite images 810 and the constituent images 804. Bearing 834 can provide alignment during the composition of a composite image 810. For instance, bearings 834 in or associated with the set of images 804 can facilitate precise orientation and positioning for panoramic stitching. Each image in the set of images 804 (e.g., processed by composite image manager 808) can maintain its spatial relation to others based on the bearings. Bearings 834 can facilitate analyzing changes over time when images are captured from the same point but at different intervals.

Mode manager 1406 can include any combination of hardware and software for managing, controlling, configuring, or otherwise setting modes 1408 of operation of one or more image capture systems 114. Mode manager 1406 can define the functionalities, settings and parameters associated with each mode 1408, including operating mode configurations for image capture system 114 and its image capture devices 124, various sensor settings, processing pipelines, and data output formats, among others. Mode manager 1406 can include the functionality to apply different mode configurations to different image capture devices 124, including triggering an operation of an image capture device 124 in a particular mode 1408, interrupting the operation of the image capture device 124 in a particular mode 1408 and causing the image capture device 124 to begin operating in a new mode 1408. Mode manager 1406 can enable modification of various parameters within each mode 1408, such as image resolution, frame rate, or sensor settings.

Mode manager 1406 can include the functionality to cause image capture devices 124 to operate in different modes 1408 and also transition between different modes 1408 of operation. Mode manager 1406 can include the functionality to switch between different modes 1408 responsive to an action on a graphical user interface by a user interface provider 1420. For example, mode manager 1406 can switch between different operation modes 1408 responsive to a user request or a user selection, such as a selection of a button for camera controls 1510 on a graphical user interface of the user interface provider 1420. For instance, mode manager 1406 can include various mode configurations, including instructions, computer code functions, executables, settings or functionalities for causing an image capture device 124 to perform various tasks or actions as a part of an operation in a particular mode 1408. For instance, mode manager 1406 can include settings, instructions and configurations to cause an image capture device 124 to take images 804 across an area. For instance, operating in a particular scanning mode 1408 can include the mode manager 1406 triggering implementations of instructions and settings to cause the image capture device 112, operating in that particular mode 1408, set an image capture device 124 to a particular angle, then take an image 804, set the image capture device 124 to another angle set a certain bearing 834 range apart (e.g., 50 degrees clockwise) and take another image 804. Mode configuration for the scanning mode can cause the angular changes and image captures to be implemented according to a time schedule 1418 to complete a given image set 1404 of images 804 within a particular time period. For instance, a mode manager 1406 can implement a mode configuration for scanning of an area by causing the image capture device 124 to capture five images 804, every five seconds, and 60 degrees apart (e.g., around an axis), thereby covering 180 degrees by a single image capture device 124 every 25 seconds. Similarly, the mode manager 1406 can implement operation modes 1408 for various types of operations, such as scanning a specific area or a range of angles, capturing images in a particular order and at specific bearing 834 angles or at various elevations, focusing image capture devices 124 according to particular zoom levels 1414, setting image capture devices 124 at resolutions and according to time schedule 1410. Mode configuration can include a configuration to operate according to a user control mode in which the image capture devices 124 perform functions, such as to turn to particular angles and snap pictures at particular direction and with a particular zoom according to camera controls 1510 signals provided by the user utilizing a user interface.

Mode manager 1406 can send mode configurations, controls or signals to the image capture system 114. For instance, the controls, configurations or signals can include mode configurations, definitions, instructions, or configuration parameters that prompt the operational settings for each mode 1408. The signals can include instructions to stop operating according to a particular mode 1408 and start operating at a different mode 1408. The image capture system 114 can process the instructions and adjust its settings accordingly. The image capture system 114 can translate the instructions into commands for the individual image capture devices 124. Image capture system 114 can include the DPS 1402 and can perform operations of the image processing circuit 206 to generate image sets 1404 according to a particular mode 1408 and in accordance with a set time schedule 1410, which a mode manager 1406 can modify and redefine for various operating modes 1408.

Modes 1408, also referred to as modes of operation 1408, can represent operational configurations of the image capture devices 124. Modes 1408 can define sets of functionalities or parameters associated with image acquisition that an image capture device 124 performs in accordance with a particular configuration or a setting by the image capture system 114. For example, modes 1408 can include the configuration of parameters, such as resolution, exposure time, or gain, to tailor image data acquisition to specific purposes. Mode 1408 can include an angular range scanning mode in which an image capture device 124 of the image capture system 114 takes images of a range of bearings 834 for generating an image set 1404, such as an image set for creating a composite image 810 (e.g., a 180 or a 360-degree panorama). Mode 1408 can include a user control mode in which a particular image capture device 124 is configured to be controlled based on user-clicked camera controls 1510, which can allow a user to a resolution, a zoom, a camera direction, or an image capture action for the image capture device 124. Mode 1408 can include a mode for different image capture devices 124 to cover the range that was covered or scanned by another image capture device 124 in a scanning mode. For example, if three cameras covered 360 degree panoramic image capturing by each one covering 120 degree range around an axis in a first mode 1408, the mode manager 1406 can trigger a second mode 1408 in which two of the three image capture devices 124 can each cover 180 degrees, thereby covering the same 360 degree range without the third camera. Different modes 1408 can be configured or setup for different ranges of bearing angles, such as, for example, one mode for taking three images by an image capture device 124 over a range of angles of 120 degrees about an axis (e.g., 130), or another mode for taking 8 images over a range of angles of 360 degrees about the axis. A mode 1408 can be configured or optimized for speed or period of operation, such as for taking an image set 1404 over a range of 180 degrees within 12 seconds, 18 seconds, or 24 seconds.

For example, mode 1408 can include a setting in which two image capture devices 124 can cover a range of 360 degrees about a central axis 130, or about their respective axes of rotation 132. Each of the two image capture devices 124 can capture its own image set 1404 of five constituent images 804 covering the entirety of the respective 180 degree range of the respective image capture device 124. DPS 1402 can receive, identify or detect an action taken on a user interface, such as a selection of a camera controls 1510 by a user of the user interface displayed on a client device 1418 via user interface provider 1420. In response to the detected action at the user interface, the mode manager 1406 can interrupt the prior mode 1408 of operation and trigger a new mode 1408.

The new mode 1408 can include any mode 1408 of operation. For example, a new mode 1408 can trigger instructions to cause only one of the two image capture devices 1402 to cover the entire 360 degree range by capturing 10 images across the 360 degrees about the rotational axis 132 of the image capture device 124. In such a new mode 1408, the second image capture device 124 can be directed to, focus on and zoom into a particular location, continuously or periodically providing constituent images 804 of that location. In some examples, a user selection via the camera controls 1510 can include a selection or prompt of the user to indicate the direction, zoom, area, location or elevation at which the second image capture device 124 is to focus and operate.

For example, the new mode 1408 can trigger instructions to cause the first image capture device 124 to continue capturing 5 images across its prior-covered 180 degree range, while the second image capture device 124 can capture the same five images across its own prior-covered 180 degree range and in addition also capture a sixth image focused on the area or location indicated in the client request or selection via the user interface. The new mode 1408 can modify the time duration (e.g., time schedule 1410) for capturing the total of 11 images (e.g., five images by first camera and six by the second). The new mode 1408 can make the duration of the entire cycle (e.g., time schedule 1410) for both image capture devices 124 longer by the amount of time used to capture the sixth image, or can only add additional time for the second image capture device 124, leaving the first image capture device to operate at the same time rate as in the prior mode 1408.

As part of the angular range scanning mode, an image capture device 124 can start at a first bearing angle, capture an image, wait a predetermined period of time, rotate to a second bearing angle, capture a second image, wait a predetermined period of time, and then rotate again and repeat this process until the image capture device 124 captures images from each of the bearing angles that span the range of angles the image capture device 124 is configured to capture. After the image capture device 124 takes the last image, the image capture device 124 can either rotate back to the first bearing angle or complete a full revolution back to the first bearing angle. The timing between rotations between the bearing angles is configurable. The bearing angles at which the image capture device 124 captures images are also configurable. In some embodiments, the mode manager 1406 or the image capture system 114 or the image capture device 124 can determine the bearing angles based on the number of images to capture, the angular range to be covered by the images captured by the image capture device 124, the speed at which the image capture device 124 rotates between bearing angles, among others. Mode manager 1406 or the image capture system 114 can select a mode 1408 that can include a camera zoom mode in which an image capture device 124 can be manually or automatically controlled to capture one or more images of a particular object or a particular location or region corresponding to a bearing 834 range at a particular zoom level. Mode manager 1406 or the image capture system 114 can select other types of modes 1408 that can enable image capture systems 114 or the data processing system 1402 to adapt to diverse imaging requirements and environmental conditions. For example, a mode 1408 can be optimized for low-light conditions or prioritize high-speed capture, among others.

Time schedules 1410 can be configured by the mode manager 1406 (or the image capture system 114) to specify periods or durations of time during which image capture systems 114 take images according to mode 1408. Time schedules 1410 can define start and end times for image acquisition in a specific mode 1408, such as start and stop time of capturing images 804 over a range of bearings 834 to generate an image set 1404 or a composite image 810. Time schedules 1410 can be initiated manually, triggered by external events (e.g., sensor readings, time of day), or automatically based on pre-defined conditions. For instance, time schedules 1410 can dictate/define/configure image capture at minute or hourly intervals during daylight hours in a high-resolution mode or can trigger rapid sequence capture in a high-speed mode for event monitoring.

Camera controller 1412 can include any combination of hardware and software for controlling, establishing, or managing direction, operation, mode, or zoom of an image capture device 124. For example, camera controller 1412 can include the functionality to take control of, manage, turn, operate and focus an image capture device 124. Camera controller 1412 can adjust the direction of the camera (e.g., bearing 834 at which the camera is pointed) and a focal length of a camera lens, providing magnification or reduction of image size. Camera controller 1412 can communicate with hardware drivers to manage lens motor and/or sensor feedback for angular, rotational, inclination or focal length adjustments. Camera controller 1412 can operate remotely for capturing images or monitoring distant objects, including wildfires in surveillance applications. Camera controller 1412 can provide user interaction mechanisms (e.g., via the user interface provider 1420) for zoom operations. Camera controller 1412 can minimize latency between user input and lens movement. Camera controller 1412 can manage power consumption by directing display power consumption. The functionality of the camera controller 1412 can be included and implemented on a station 102 or a image capture system 114, such as a camera controller 1416 of an image capture system 114 at a station 102. For example, the camera controller 1416 can include any functionalities of the image controller 1412, or vice versa.

Zoom levels 1414 can include any settings, configurations, or instructions for adjusting the magnification of a camera lens, altering the size of the captured image. Zoom levels 1414 can include, for example, magnification values, such as 2X, 4X, 10X, 20X, or higher. Zoom levels 1414 can be stored as numerical values, descriptive strings, or encoded commands depending on the system architecture. Zoom levels 1414 can be translated into digital processing instructions (e.g., via the camera controller 1412) and can be used to control direction turning or zooming functionality of the cameras, responsive to a user request 1422, such as a user click on a camera control 1510 button on a user interface on a client device (e.g., user's computer).

Figure 15:
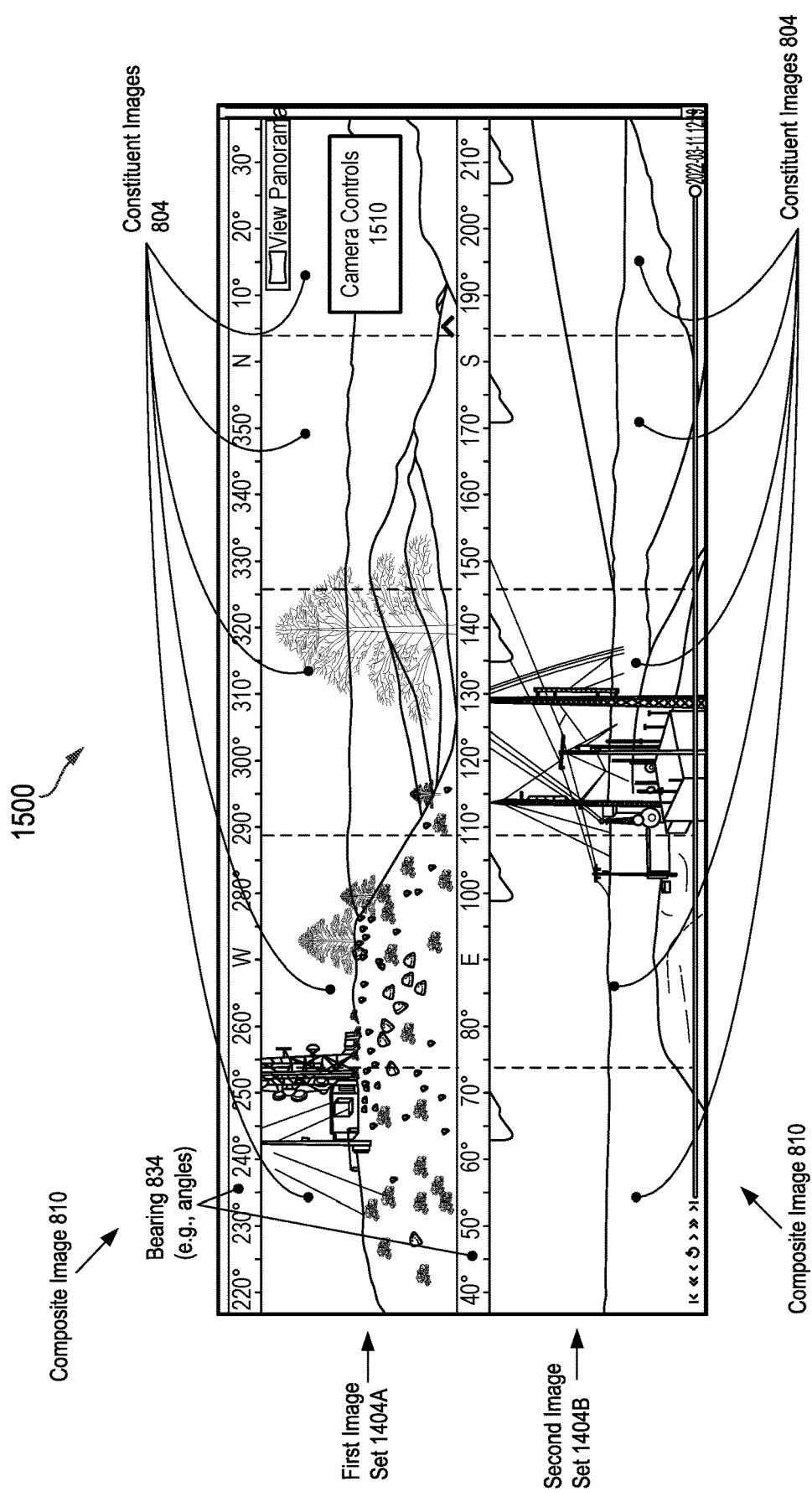
FIG. 15 is an example of a display view of an example composite image displayed with image sets in accordance with the system features of the present disclosure.

FIG. 15 illustrates an example display view 1500 displayed on a client device's display. The display view 1500 can present/display two composite images 810 positioned vertically with respect to each other. The display view 1500 can display any positive integer of composite images 810. The upper composite image 810 can be formed by stitching together a first set of images 1404A (e.g., a group of constituent images 804) which can cover a first range of angles (e.g., bearings 834), such as angles 220 degrees to 30 degrees across the north and west. The first set of images 1404A may include a combination of five images 804, or any positive integer of images 804. The lower composite image 810 can be derived from a second, distinct set of images 1404B, covering a second range of angles, such as angles 40 degrees to 210 degrees across east and south. Each composite image 810 can capture a combined field of view, with bearing 834 (e.g., angles) displaying the covered angular range.

The display view 1500 can include a camera control 1510 that can include any number of control buttons, dials or selections for the user to use to control an image capture device 124. Camera control 1510 can include manual button controls to perform any action by a camera controller 1412, including turning or pointing an image capture device 124 in a particular direction, zooming an image capture device 124 in or out at any zoom level, adjusting image resolution or type of images, taking action to capture an image or a video, or any other functionality or operation. Camera control 1510 can be provided, activated or be made available to the user interface in a particular mode 1408 of operation, such as a user control mode. The camera control 1510 can include any actionable buttons or commands to initiate image capture actions. For example, a simple interaction (e.g., tapping) with the camera controls 1510 can cause the image capture system 114 to capture an image, and a long press can activate a menu for selecting different capture modes. The camera controls 1510 can incorporate a virtual joystick to remotely control the camera's direction. For example, by dragging the joystick, users can pan the camera left, right, up, or down, causing the data processing system 1402 (or the image capture system 114) to adjust or alter the camera's field of view. The camera controls 1510 can trigger API calls to the system to trigger actions to control the image capture device 124.

Camera control 1510 can include a timeout feature to control the time duration for which a user can control, operate or otherwise manage the mode 1408 of one or more image capture devices 124. Camera controls 1510 can be used to select and control (e.g., apply) modes 1408 of operation. Using features (e.g., controls, buttons or prompts) of the camera control 1510, the user can trigger or start a new mode of operation on one or more image capture devices. Camera control 1510 can be accessible to users based on authentication and authorization mechanisms for client accounts associated with the users. For example, a user can enter a username and a password of a client account to gain access onto a user interface of the user interface provider 1420. For instance, a user can enter a username and a password to access a web page having the user interface with the camera controls 1510. DPS 1402 can authenticate and authorize the client account and grant the user access to one or more camera controls 1510. Camera controls 1510 can include features (e.g., buttons, selections or menu) allowing the user to selection operation of an image capture device 124, such as by directing the image capture device 124 to a particular direction (e.g., bearing 834 range or elevation). Camera controls 1510 can allow the user to specify a zoom level for the image capture device 124, a rate of images to capture (e.g., rate of refresh). User interface can provide the user with images (e.g., 804) from the directed or controlled image capture device 124.

Timeout feature can allow the user to control the image capture device 124 for a given time duration, such as a minute, 5 minutes or 10 minutes. Mode manager 1406 can interrupt and change the mode 1408 of operation for the image capture devices 124 based on a start of the timeout feature (e.g., when user gains access or control of a camera). The mode manager 1408 can reset the mode 1408 to its original setting after the user ends the camera control (e.g., closes the user interface or unselects the control feature) or when the timeout feature indicates that the camera control time duration has expired.

During the time when the image capture devices 124 operate in a new or modified mode 1408 of operation responsive to the user control of a particular image capture device 124 (e.g., to zoom into a particular area or feature), other users can access the user interface (e.g., web page with the camera controls) and view images captured responsive to the user control. For example, other users can be authenticated or authorized to the website and the user interface in order to view the images from the user controlled image capture device 124. For example, other users may access the web page allowing the users to view the images on their client devices 1418 without authentication or authorization.

The user interface can allow for multiple users to control multiple image capture devices 124 at the same time. For example, aside from a first user controlling a first image capture device 124, other users can (e.g., upon authentication or authorization) get access to control image capture devices 124 other than the first image capture device. In such instances, for example, a mode 1408 can cause two or more image capture devices 124 or two or more sets of image capture devices 124 to switch from a first mode 1408 to a second mode 1408 that accommodates the user's request to control the image capture device 124 to capture images at a particular location, range, direction, elevation, bearing range or zoom.

The first and second sets of images 1404A, 1404B can be captured by one or multiple image capture devices 124. A first image capture device 124 (or a first camera 124A) can obtain the first set of images 1404A, and a second image capture device 124 (e.g., a second camera 124B) can capture the second set of images 1404B. The first set of images 1404A and/or the second set of images 1404B can be acquired by the first and/or second image capture device 124 under varying conditions or modes. A third image capture device (e.g., 124C for illustrative purposes) can capture the first set of images 1404A and/or the second set of images 1404B or can be directed to another angular range (e.g., range of bearings 834) to cover another portion of the surrounding.

Figure 16:
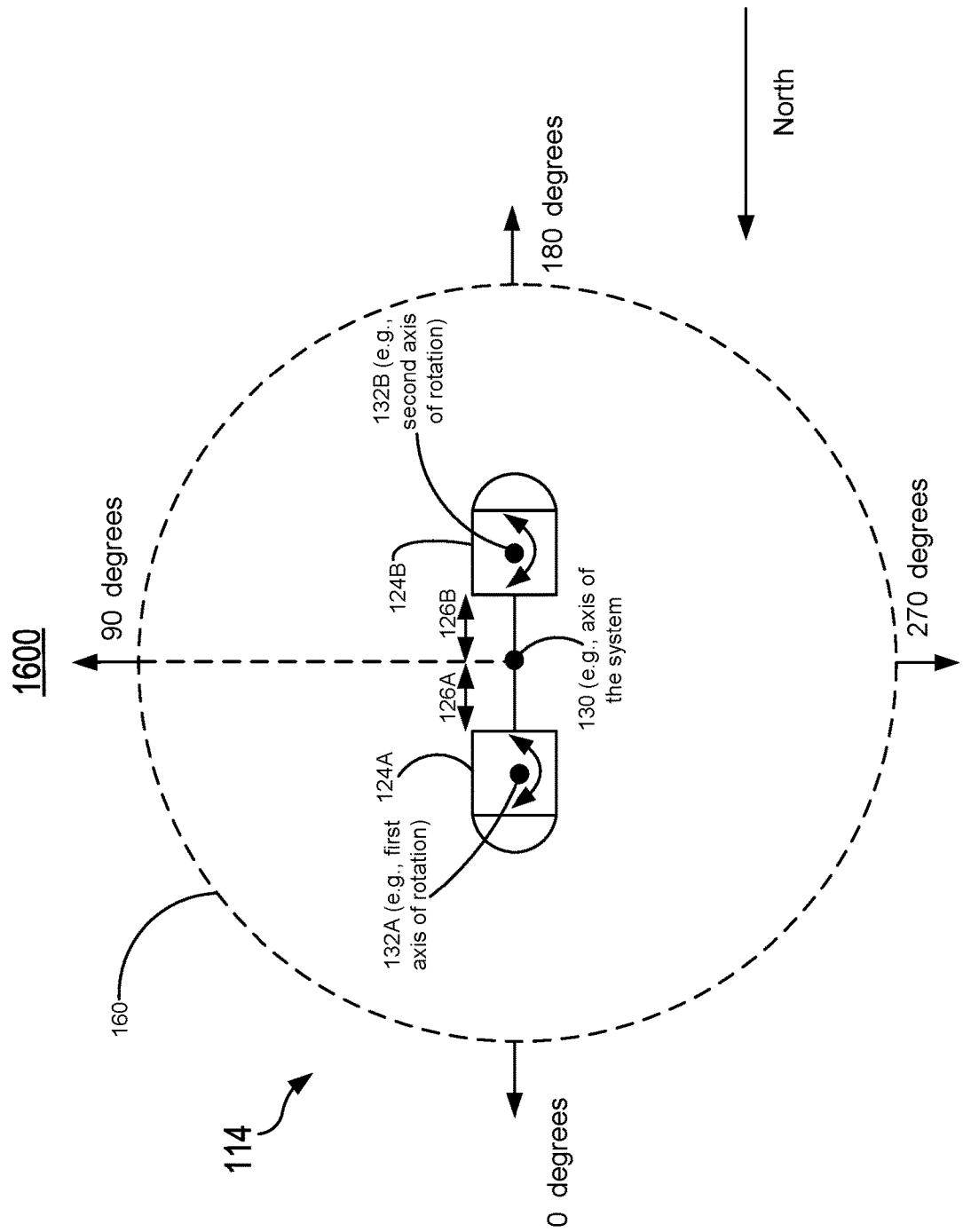
FIG. 16 is a top view of a schematic illustration of an image capture system included in a multi-camera system for providing multi-mode image capture device operation, according to an example embodiment.

Referring to FIG. 16, depicted is a schematic illustration 1600 of an example top view of an image capture system 114. The image capture system 114 can define a center 130 between the first image capture device 124A and the second image capture device 124B. Center 130 can function as an axis 130 (system axis 130) of the system (e.g., station 102) having bearings 834 for the image capture devices 124A-B be calculated based on the location or point (axis 130). The plurality of image capture devices (e.g., 124A-B) can center and operate around the axis 130. The first image capture device 124A can be positioned at a distance 126A from the center 130, and the second image capture device 124B can be positioned at a distance 126B from the center 130. The first image capture device 124A can rotate around a first axis of rotation 132A, and the second image capture device 124B can rotate around a second axis of rotation 132B. The image capture devices 124 can rotate around their respective axes 132 to various degrees, such as 90, 180, 270, and 360 degrees. Image capture devices 124A-B can rotate around center point 130, or around their axes 132, depending on the mode of operation. When images captured by image capture devices 124 are focused to objects at a distance that is much greater (e.g., more than 100 times greater) than the distance between the two axes 132A and 132B, image capture devices 124 can rotate around 132 axes while having the bearings 834 determined based on the axis 130.

As illustrated in FIGS. 14-16, the image capture system 114 can utilize image capture devices 124 to generate image sets 1404 and provide a panoramic view of the surrounding area 160, including to generate composite images 810. Each image capture device 124 can capture objects and incidents within images at a certain distance from the center 130 of the image capture system 114. The distance of the objects or locations of interest from the center 130 can be such that the rotational axes of the first image capture device 124A (e.g., axis 132A) and the second image capture device 124B (e.g., axis 132B) can be considered coincident. For example, due to the spatial relationship between the image capture devices 124 relative to the center 130, their operational axes 132 converge functionally, despite each having its own independent axis of rotation. In some implementations, offsets to bearings 834 of particular objects captured by different image capture devices 124 can be determined to adjust for the distance between the axes 132 of different image capture devices 124. In this manner, the first image capture device 124A and the second image capture device 124B can operate in unison and cover or zoom in on the same object or area from their respective positions.

The system of the technical solutions can include any combination of features discussed herein, including any features of example systems 100, 800, 1600, and 1800, which can be combined with any features of the system 1400. Such combination, e.g., system 1400, can include any system for multi-mode image capture device operation. System 1400 can include instructions stored in a memory, such as a non-transitory computer readable medium. Instructions can be accessed from memory 218 and executed to configure or cause the one or more processors 208 to implement any functionality of the technical solutions.

The one or more processors 208 can obtain from a first image capture device 124A (e.g., a camera 124A) in accordance with a first mode 1408, a first set of images (e.g., 1404A) corresponding to a first range of angles (e.g., bearings 834) about an axis (e.g., 130). For example, the first mode 1408 can include an operational mode 1408 in which images 804 are captured periodically into image sets 1404 to be combined by the composite image manager 808 into composite images 810. The mode 1408 of the first image capture device can include a mode 1408 in which the camera 124A is configured to continuously capture images 840 to generate image sets 1404 over a range of bearings 834. For instance, camera 124A can be configured to generate ten images over the course of 30 seconds covering 180 degrees about the axis 130 of an image capture system 114 or a station 102. For instance, camera 124A can be configured to generate eight images over the course of 24 seconds covering 180 degrees about the axis 130 of an image capture system 114 or a station 102. For instance, camera 124A can be configured to generate five images over the course of 25 seconds covering 180 degrees about the axis 130 of an image capture system 114 or a station 102.

The image capture system 114, managed by processors 208, can operate in numerous modes to address various surveillance capabilities, utilizing zoom capabilities for detailed observation. For example, the image capture system 114 can execute a 360-degree rotation around the axis 130 to capture each specific angle or bearing 834. The image capture system 114 can maintain a continuous visual record of the surrounding area 160 to form the basis for a detailed panoramic composite image 810. For example, the image capture system 114 can optimize resource use by capturing images within specific areas, objects, or areas of interest (e.g., sets of bearings 834). The image capture system 114 can respond upon detecting triggers by capturing images at an increased rate or adjusting zoom levels to intensify the focus on areas of activity. For long-term monitoring, the image capture system 114 can capture images at a defined pace. This operational approach can be used for detailed surveillance, where each composite image 810 can be produced by combining a defined set of images 1404. It is to be noted that the aforementioned examples are non-limiting and serve to illustrate the flexible capabilities of the image capture system 114 in addressing various surveillance objectives.

The image capture system 114 can obtain a second set of images 1404B from a second image capture device 114 (e.g., a second camera 124B) in accordance with the first mode 1408. The second set of images 1404B can correspond to a second range of angles (e.g., bearings 834) about the axis 130. The first mode 1408 can include various operational definitions or modes, such as capturing images across predefined surveillance zones or responding to triggered events (e.g., fire, smoke, etc.). The second set of images 1404B can provide flexibility in capturing angles distinct from the first set 1404A captured by the first camera 124A. In a 360-degree panoramic view, for example, the first set of images 1404A can cover 180 degrees, leaving the remaining half for the second set of images 1404B. The second set of images 1404B can capture a different range of angles, independent of the first set's coverage.

The image capture system 114 can interrupt the ongoing operating mode 1408 of the first image capture device 142A responsive to a request, a message or an instruction, such as a user request 1422. The image capture system 114 can receive an API call or an instruction from a data processing system 1402, responsive to a ML model determining that one or more previously image sets 1404 previously captured by the first image capture device 124A has a likelihood of an incident (e.g., a fire or a smoke) that is greater than a threshold for detecting an incident. Responsive to such a determination, the data processing system 1402 can send an API call to interrupt the current operating mode 1408 of the first image capture device 142A of scanning an area to focus the image capture device 142A towards a bearing 834 at which the incident was detected by the ML model.

The image capture system 114 can interrupt the ongoing operating mode 1408 of the first image capture device 142A responsive to a request by a user from a client device 1418 to allow the user to manually control and direct the image capture device 142A toward any particular area, object, or a region. The image capture system 114 can interrupt the operating mode 1408 of the first image capture device 142 responsive to a message or a signal that the image capture device 142A is faulty, has experienced an error, or is due for maintenance or repair. The image capture system 114 can interrupt the operating mode 1408 of the first image capture device 142 responsive to a message that a user on a client device 1418 has successfully authenticated and received authorization to utilize the first image capture device 142A for a period of time (e.g., 10 minutes).

The image capture system 114, responsive to an interruption of the first mode, can trigger, initiate, or cause (e.g., via the data processing system 1402) the second image capture device (e.g., the second camera 124B) to obtain a third set of images (e.g., 1404C). The third set of images (e.g., 1404C) can correspond to the first range of angles around the axis 130 but can be acquired/captured in accordance with a second mode 1408. Interruptions of the first mode 1408 may result from user requests 1422 (e.g., via the user interface provider 1420), system events, or other triggers. The third set of images 1404C can replicate the coverage provided by the first set of images 1404A (captured by the first camera 124A in the first mode 1408). The second mode 1408 can differ from the first mode 1408 by altering image capture parameters or by focusing on specific details within the first range of angles. During the second mode 1408, one or more users can be given access to view images captured by the first image capture device 124A. For instance, a user may receive access to use and control the camera 124A and one or more additional users may be granted access to view the images captured by the camera 124A during the second mode 1408.

The image capture system 114, responsive to the interruption of the first mode 1408, can cause the second image capture device 124B (the second camera 124B) to obtain the third set of images 1404C corresponding to the first range of angles about the axis 130 and a fourth set of images (e.g., 1404D) corresponding to the second range of angles about the axis 130. The third set of images 1404C can include both the first set of images 1404A captured by the first image capture device 142A during the initial mode 1408 of operation (e.g., panoramic scanning mode) and by the second set of images 1404B captured by the second image capture device 142B during the same initial mode 1408 (e.g., panoramic scanning mode), prior to the interruption of the mode 1408. For instance, the fourth set of images 1404D can include capturing angles 834 beyond the first range to cover additional perspectives or areas not included in the first set of images 1404A. The fourth set of images 1404D can include the second set of images 1404B described herein, enabling the image capture system 114 to adapt to various preferences. For instance, the fourth set 1414D can capture specific details within the second range of angles or provide a different perspective on that area in case its capture by the second camera 124B is interrupted.

During the adjusted modes 1408 of operation of the plurality of cameras 124, responsive to the change in the mode of operation of the first camera 124A, the third and the fourth sets of images 1404 can be captured by the plurality of cameras 124 to cover the range of bearings 834 that was covered by the first camera prior to the change of the first mode 1408. For instance, if cameras 124A, 124B and 124C were configured to each cover a different range of 120 degrees for a total of angular coverage of 360 degrees during the first mode 1408, following the interruption of the first mode on the first camera 124A, the second and the third cameras 124B and 124C can have their modes of operation 1408 adjusted to each cover 180 degrees. In doing so, during the second mode 1408 of the cameras 124B and 124C, each of the 124B and 124C cameras can cover a portion of the range of images previously covered by the first camera 124A.

To obtain the first set of images 1404A, the first image capture device 124A can obtain images at a first zoom level 1414 to generate a panoramic view via the composite image manager 808. The image capture system 114 can receive a request to cause the first image capture device 124A to obtain an image at a second zoom level. For instance, the image capture system 114 can receive a request to switch from the first zoom level 1414 to the second zoom level 1414. Upon receiving the request, the image capture system 114 (via the mode manager 1406) can interrupt the first mode 1408, which can interrupt/pause the ongoing panoramic capture at the first zoom level 1414. The first image capture device 124A can be instructed to capture an image at the second zoom level 1414. The second zoom level 1414 can include a closer view of a specific object or an area of interest falling within a defined range of angles. The activation of the second zoom level 1414 can be initiated automatically by the image capture system 114 (e.g., via the camera controller 1412) or can be triggered by receiving a specific user request 1422 through the user interface provider 1420.

The image capture system 114 can cause the interruption of the first mode 1408 responsive to receiving a request 1422 to cause the first image capture device 124A to restrict the first image capture device 124A from obtaining images in accordance with the first mode 1408. Request 1422 can include a request of a user from a client device 1418 generated by interacting with the interactive camera control button 1510 or an application programming interface (API) call or instruction generated by a computing system, such as a server 200 or a data processing system 1402. When the image capture system 114 receives the request 1422 via a communication channel (e.g., dedicated communication protocol, API, etc.), the mode manager 1406 can interrupt the existing mode 1408 (e.g., the first mode 1408). The image capture system 114 can instruct/prompt the first camera 124A to cease/stop capturing images within the specified area according to the rules or parameters of the first mode.

The image capture system 114 can process a specific user request 1422 received via a communication channel, directing the first image capture device 124A to restrict the first image capture device 124A from obtaining images 804 in accordance with the first mode 1408. As described herein, the user request 1422 can be generated by interacting with the camera control button 1510 on the user interface (e.g., display view 1500). Upon receiving the user request 1422 (e.g., via secure protocols, API, network protocols such as Wi-Fi/Bluetooth), the mode manager 1406 can recognize the request as a trigger for mode interruption. Following this determination, the mode manager 1406 can instruct (e.g., through the same protocol) the first camera 124A to cease capturing images 804 according to the rules and parameters that define the first mode 1408.

A user can have independent control over the image capture system 114 through the user interface. For example, the user can interact with the camera control button 1510 on the display view 1500 to send a request 1422 to the image capture system 114 to stop capturing images in the first mode 1408. In some implementations, the user can grant (via the data processing system 1402) access to another user to control the camera through a shared link.

The image capture system 114 can execute a predefined plan (e.g., mode 1408) to obtain each image 804 (or a series of images) at specific intervals of time (e.g., timing schedules 1410). For instance, the first image capture device 124A can capture a first image 804 of the first set of images 1404A corresponding to a first subset of the first range of angles at a first time corresponding to the timing schedule 1410 (e.g., specified by the mode manager 1406). Each image 804 can capture a defined portion of the view (subset of angles) at a specific time point. The first image capture device 124A can capture a second image 804 of the first set of images 1404A corresponding to a second subset of the first range of angles at a second time corresponding to the timing schedule 1410. In this manner, the image capture system 114 can maintain a structured approach (mode 1408) combined with precise timing (time schedule 1410) to capture panoramic views of the system's surroundings.

Upon detecting an interruption of any of the cameras/image capture devices 124 (e.g., the first camera 124A in this instance), the image capture system 114 can access the first set of images 1404A at a specific first time interval. The time interval can be pre-defined or dynamically adjustable. The image capture system 114 can access a third set of images 1404C at a second time interval following the first time interval. The second time interval can be shorter or longer than the first time interval, depending on the desired overlap or gap between the captured sets of images 1404.

The image capture system 114 can present the first set of images 1404A captured in accordance with the current mode on a client device (e.g., the display output circuit 318) via the user interface provider 1420. The user interface provider 1420 can enable users to visualize the captured scene (e.g., the composite image 810). The image capture system 114 can receive a request 1422 from the user to initiate the second mode 1408. The request 1422 can be initiated by various user actions, such as selecting a different mode option or interacting with an interactive button, among others. In response to receiving the request 1422 to initiate the second mode 1408, the image capture system 114 can interrupt the first mode 1408 in a controlled manner.

The image capture system 114 can receive a request to obtain an image corresponding to a specific angle 834 about the axis 130. For example, a user or other systems can prompt/request the image capture system 114 to capture an image of an object or an area of interest from a certain angle in relation to the axis 130. Upon receiving the request, the image capture system 114 can assess which camera 124 (e.g., the first camera or the second camera) has access to the specified angle. If the requested angle falls within the coverage area of, for example, the first range, the image capture system 114 can pause/interrupt the first mode that the first image capture device 124A is currently using to capture images. The image capture system 114 can cause/instruct the first image capture device 124A to capture the image 804 at the requested angle.

The image capture system 114 can receive a request from a client device (e.g., a phone, tablet, laptop, etc.) to obtain an image of a specific object or area at the requested angle. Based on the object's location or the size of the area within the first set of images 1404A, the image capture system 114 can determine an appropriate zoom level 1414 (e.g., via the camera controller 1412) to capture a detailed image of that object/area. Once the zoom setting is determined, the image capture system 114 can instruct the first image capture device 124A (presumably the one that captured the first set of images 1404A) to capture a new image of the identified object/area. The new image can be captured using the selected zoom setting to provide a closer view compared to the original first set of images 1404A.

The image capture system 114 can identify a plurality of image capture systems capturing images across a range of angles around axis 130. The plurality of image capture systems can include the first image capture device 124A configured to capture images over a first part/portion of the range of angles and a second image capture device 124B configured to capture images across a second part/portion of the range of angles.

The image capture system 114 can receive a request to capture an image 804 of an object or an area of interest at a desired angle (e.g., a first angle 834) of the range of angles where the object is located. Upon receiving the request, the image capture system 114 can determine (via the data processing system 1402) whether the request angle (the first angle) falls within the capability/operational range of any of the plurality of cameras 124. The image capture system 114 can determine whether the object is located in the area covered by the respective camera 124 based on pre-defined rules or modes 1408. If the requested angle matches the first camera's range, the image capture system 114 can take control of the first camera 124A (initiate control). The image capture system 114 can instruct the first camera 124A to direct towards the object. The image capture system 114 can configure the second camera 124B to capture images 804. The second camera 124B can capture images 804 across its entire range, covering its usual area (second part) and the area of the first camera 124A (first part).

The image capture system 114 (via the data processing system 1402) can adjust, responsive to the initiation, a zoom of the first image capture device 124A according to the object in an image 804 captured at the first angle. As described herein, based on the captured image 804 at the first angle, the image capture system 114 can determine the size and position of the object of interest. The image capture system 114 can automatically adjust the zoom level 1414 of the first image capture device 124A such that the object occupies a specific portion of the frame (e.g., fills the frame, covers 50% of the frame, etc.). The image capture system 114 can capture the image at the first angle with a default zoom level 1414. A user can analyze the captured image 804 and request a zoomed-in view by specifying a desired zoom level or area of interest within the image 804. The image capture system 114 can adjust the first camera's zoom based on the request to provide a closer look at the object.

The data processing system 1402 can identify, from the request, a distance between the object and the first image capture device 124A. The image capture system 114 can determine the appropriate zoom level 1414 based on the angle and distance information. The determination may include relevant factors such as desired image resolution, object size, and sensor capabilities, among others.

Figure 17:
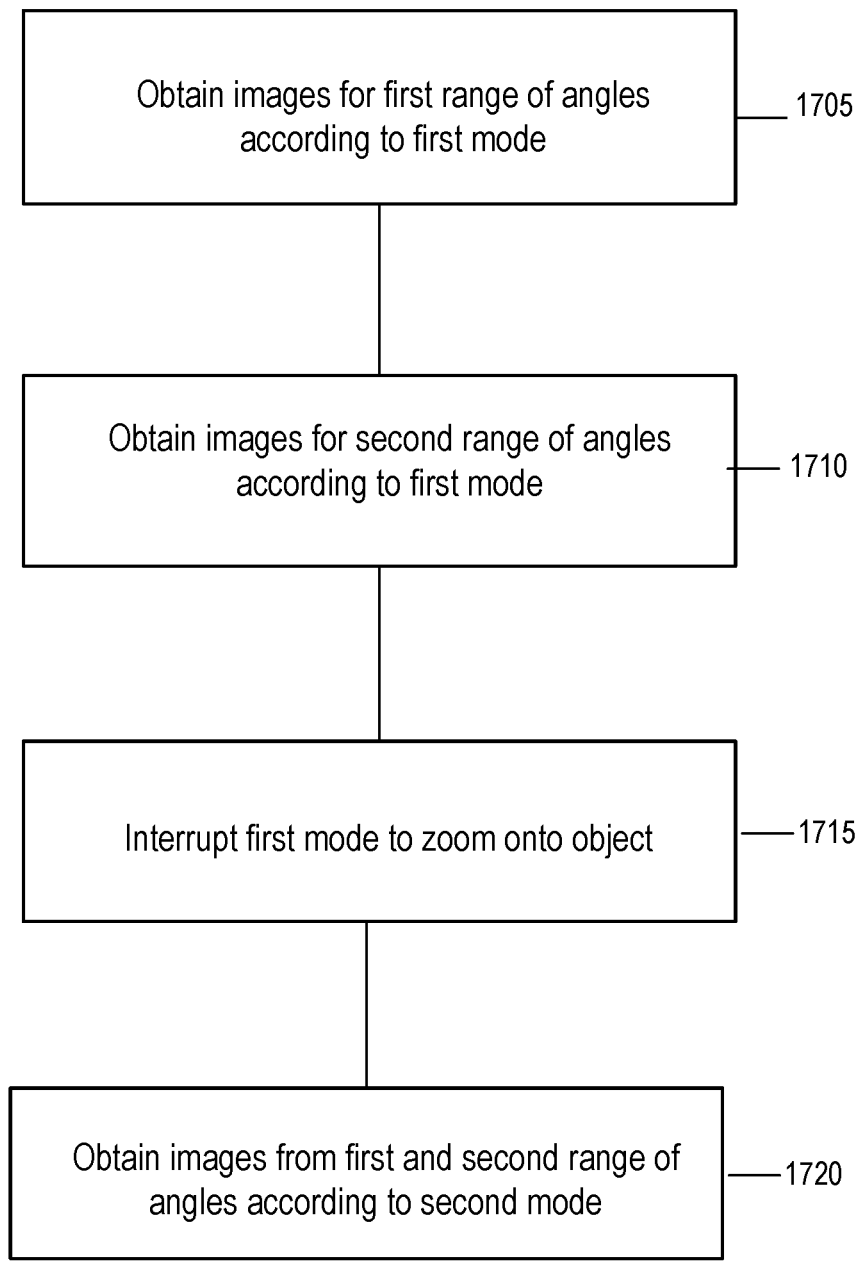
FIG. 17 is an example of a flow diagram illustrating an example method for multi-mode image capture device operation in a multi-camera system in accordance with the system features of the present disclosure.

FIG. 17 illustrates a method 1700 of multi-mode image capture device operation of an image capture system. The method 1700 can be implemented using a system 100, 800, 1600, 1800, or any other features discussed in FIGS. 1-16. The method can include acts 1705-1720. At 1705, a data processing system can obtain images for a first range of angles according to a first mode. At 1710, the data processing system can obtain images for second range of angles according to a second mode. At 1715, the data processing system interrupt first mode to zoom onto an object. At 1720, the data processing system can obtain images from the first and the second ranges of angles according to the second mode.

At 1705, a data processing system can obtain images for a first range of angles according to a first mode. For example, the data processing system can obtain a first set of images from a first image capture device in accordance with a first mode. The first mode can include a mode of operation for scanning a field of view by capturing a set of images to generate a composite image (e.g., a panoramic image). The first mode can include a mode of operation of surveilling an area or a region by taking periodic images across a range of angles. The first set of images can correspond to a first range of angles about an axis. In one operational range, the first range can include or correspond to 360 degrees around the system axis. In another operational mode 1408, the first range can focus on an object or an area of interest with a narrower angle sweep, for example.

The data processing system can configure the first image capture device to obtain images at a first zoom level. A zoom level of 2× or 3× can provide detailed close-ups suitable for object recognition within the range. A lower zoom level (e.g., 1×) can capture a wider field of view for situational awareness.

The data processing system can configure the first image capture device to obtain each image of the first set of images in accordance with a timing schedule for the first mode. For example, the first image capture device can capture a first image of the first set of images corresponding to a first subset of the first range of angles at a time (e.g., a first time) defined by the timing schedule and a second image of the set corresponding to a second subset of the range at another time (e.g., a second time) defined by the schedule. For instance, the time schedule can include capturing an image every 5 seconds. For object or area tracking, the time schedule can include capturing images at varying intervals based on detected motion.

The data processing system can configure the first image capture device to obtain the first set of images at a first time interval. The time interval can be used to determine the duration of the capture process. For example, a short interval of 10 seconds can capture a quick snapshot of the scene. A longer interval of 60 seconds can allow for wider ranges or slower object movement.

At 1710, the data processing system can obtain images for a second range of angles according to a second mode. For example, the second mode may include capturing an overlapping or complementary range to the first mode to provide 360-degree coverage. In another operational mode 1408, the second range can focus on a different area of interest to expand the monitored zone.

The data processing system can obtain a second set of images from a second image capture device in accordance with the first mode. A dual-camera or multi-camera setup can double the image acquisition speed by providing simultaneous capture of overlapping ranges. In cases where only one camera exists, the camera can be reconfigured to the new range after completing the first set of images. The second set of images can correspond to a second range of angles about the axis.

The data processing system can configure the second image capture device to obtain the third set of images at a second time interval subsequent to the first time interval. For example, a short delay (e.g., 1 second) can minimize the gap between image sets while allowing processing of the first set. A longer delay (e.g., 30 seconds) can be used for dynamic scenes where the second range captures changes after the first range.

At 1715, the data processing system can interrupt the first mode to zoom onto an object. The first mode of operation can be interrupted responsive to a request, such as a user request from a client device to access or utilize a first camera of the plurality of cameras. The first mode can be interrupted responsive to an API call from a data processing system generated responsive to a ML model determining that an image from an image set captured by the first camera includes an object that corresponds to an incident (e.g., a fire or a smoke). The API can request the first camera to turn and focus to a region or direction of the object or incident and take additional images or data. The additional images or data can be fed to the ML model to confirm or improve the accuracy of the determination of the presence of the incident. The interruption can be caused by an alert indicating that the first camera has experienced an error, is out of commission, is due for maintenance or repair or is otherwise not available.

The data processing system can interrupt the first mode of operation of the first camera scanning a surround area about an axis in response to a user request to capture an image of an object. Upon receiving the request, the data processing system can temporarily suspend/interrupt the first mode's ongoing operation. The data processing system can be configured to receive a request to cause/instruct/prompt the first image capture device to obtain/capture an image at a second zoom level. The data processing system can retrieve the desired second zoom level from the request, which can include predefined zoom levels such as 2× zoom, 3× zoom, or 5× zoom for varying levels of detail. The data processing system can determine/calculate the optimal zoom based on the size or distance of an object within the first mode image for dynamic zoom adjustment. The data processing system can instruct the first image capture device to capture an image of an object or an area of interest at the selected second zoom level for better identification or analysis.

The data processing system can cause the interruption of the first mode responsive to receiving a request to cause the first image capture device to restrict the first image capture device from obtaining images in accordance with the first mode. The data processing system can present the first set of images on a user interface on a client device. The data processing system can receive a request from the client device to initiate the second mode via the user interface. For instance, a user may want to switch to a different mode with different characteristics (e.g., a higher zoom level, a faster frame rate, etc.). In such situations, the user can select the desired second mode through the user interface on their client device. The data processing system can interrupt the first mode responsive to the request to initiate the second mode. For example, after acquiring/capturing an image of a wide-angle view in the first mode, the user can switch to a zoomed-in mode to focus on a specific object or area of interest.

The data processing system can receive a request to obtain an image corresponding to a first angle about the axis. For instance, the data processing system can receive a request when a user identifies an object of interest on the live feed or captured image displayed on their client device. The data processing system can determine that the first angle corresponds to the first range of angles of the first image capture system. For instance, the data processing system can determine that the angle corresponding to the location of the identified object or area falls within the first range of angles of the first image capture system. In response to the determination, the data processing system can interrupt the first mode, such as continuous scanning or instructing the first camera to capture an image at a specific angle.

The system can automatically detect an object or area of interest moving within the first camera's range during continuous capture and track its movement to predict its future location. The system can calculate the corresponding angle within the first range based on the predicted location. The system can interrupt the first mode and instruct the first camera (or any other camera) to capture an image at the predicted angle to maintain focus on the moving object.

The data processing system can receive a request to obtain an image of an object identified within the first set of images from a client device. The data processing system can determine a zoom setting according to which to obtain the image of the object. The data processing system can transmit the image of the object captured according to the zoom setting to the client device.

The method can allow for a user to utilize to trigger switching of a mode from a first mode to a second mode. For example, a user interface can detect that a mode selection request or command was selected via a camera control on the user interface (e.g., a website), and in response a mode can be changed for a set of image capture devices. The method can include detecting that a camera control feature operates or controls an image capture device according to timeout feature. The timeout feature can include or use a time counter to control the time duration for which a user can control, operate or otherwise manage the mode of one or more image capture devices. User interface features to provide the camera control features can be accessible to users based on authentication and authorization mechanisms for client accounts. For example, a data processing system can provide access to a client account to access a user interface providing camera controls to a user in response to receiving a username and a password associated with the client account. DPS can receive instructions or commands responsive to user actions (e.g., selections, prompts or requests on the control features of the user interface) to select, move, adjust, direct or otherwise control one or more image capture devices. For instance, DPS can receive instructions responsive to camera control actions (e.g., selections or controls) by the user to control the operation of an image capture device, including to direct, move, adjust, focus, or snap images using a selected image capture device.

Instructions can direct the DPS to direct the camera towards a particular direction bearing range or elevation. Instructions can be used to specify a zoom level for the image capture device 124a rate of images to capture (e.g., rate of refresh of images), image resolution, zoom level or any other setting. User interface can be used to display the images captured by the image capture devices responsive to camera control actions.

Modes of operation can include a setting in which two image capture devices can cover a range of 360 degrees about a central axis of an image capture system or a station, or about the respective axes of rotation of the image capture devices. The method can include switching from a first mode to a second mode. The second mode of operation can be switched to responsive to an indication that a user has taken control of one or more image capture devices. The first mode can be a mode in which each of the two image capture devices can capture their own set of images across their designated range of angles. For instance, each camera of a plurality of cameras (e.g., 2 cameras) can capture a predetermined number (e.g., 5) constituent images covering a respective degree range (e.g., 180 degrees) of the respective image capture device.

The second mode of operation can include a first image capture device covering the entirety of 360 degrees about the axis or axes (e.g., captures 10 images across the 360 degree range about the axis), while a second image capture device (e.g., that is controlled by the user) is focused, directed, zoom in, or otherwise controlled to take one or more images towards a particular object or location (e.g., direction, bearing range, zoom, elevation). The second mode of operation can include a first image capture device capturing all of the images across the 360 degrees about the axis or axes, except for a single image that coincides with the second image capture device, its pole, equipment, a tree, a building or any other obstructing object. In doing so, the first image capture device can omit capturing images about the axis that are obstructed. Instead of capturing the image that is obstructed (e.g., by a second image capture device or equipment), the first image capture device can focus onto the user instructed direction or object to take an image at the user specified location, direction, zoom level or elevation.

The second mode of operation can include the first camera capturing the same number (e.g., 5) images across the same range as in the first mode, while the second camera captures also the same number (e.g., 5 images) across the same range as in the first mode and then also capturing another (e.g., $6^{th}$) image towards the desired or user specified direction. Time schedule can be adjusted to accommodate capturing of the additional image by the second camera. Timeout feature can allow the user to control the image capture device for a given time duration, such as a minute, 5 minutes or 10 minutes. Mode manager can interrupt and change the mode of operation for the image capture devices based on a start of the timeout feature (e.g., when user gains access or control of a camera). The mode manager can reset the mode to its original setting after the user ends the camera control (e.g., closes the user interface or unselects the control feature) or when the timeout feature indicates that the camera control time duration has expired.

At 1720, the data processing system can obtain images from the first and second ranges of angles according to the second mode. Responsive to an interruption of the first mode, the data processing system can cause the second image capture device to obtain a third set of images corresponding to the first range of angles about the axis in accordance with a second mode. The data processing system can cause the second image capture device to obtain the third set of images corresponding to the first range of angles about the axis and a fourth set of images corresponding to the second range of angles about the axis. The data processing system can cause the first image capture device to obtain an image corresponding to the first angle.

During the second operation modes of multiple cameras, when the mode of the first camera changes, the remaining cameras of the plurality of cameras can capture additional sets of images over an additional angular range to cover the same area the first camera covered during the first mode of operation. For instance, if each of three cameras initially covered 120 degrees, totaling 360 degrees of coverage, after the first camera's mode interruption, the remaining cameras of the plurality of cameras can adjust the bearing range of their coverage to cover 180 degrees each. This way, during the second mode, the remaining cameras can collectively cover the same range that the plurality of cameras had covered during the first mode of operation, before the first camera was taken out of commission for angular surveillance.

Responsive to the first camera being used for different operation, the remaining cameras of the plurality of cameras can adjust their timing between photos in order to account for the first camera being used in a different mode. For example, during the first mode three cameras can be configured to each capture sets of 3 images covering a range of 120 degrees within 15 seconds (e.g., for a total of 360-degree panorama field of view), by taking an image covering 40 degrees field of view every 5 seconds. In response to the first camera being used at a different mode, the second and the third cameras can be reconfigured to each capture images covering 180 degrees within 15 seconds, by taking 4 images of 45 degrees each within the same time period.

A user, using a wildfire surveillance system, can obtain and view a series of images. Upon identifying smoke or flame interruptions within these images displayed on their client device, the user can, via zoom control, send a request to view the region in which the smoke or flame can be seen. The user request can identify a location or a desired zoom level. The data processing system can determine the appropriate zoom setting based on the user's request or selection and can instruct the image capture system to take a new image with the selected zoom setting. The data processing system can adjust zoom settings automatically based on predefined rules or settings. In a collaborative setting, multiple users can connect to the system, and one user's request to zoom in on an object can be broadcasted to all participants once a zoom level is agreed upon.

Responsive to changing the mode of operation of the first camera, the mode of operation of any number of other cameras of the plurality of cameras can be changed or modified. For example, one or more remaining cameras of the plurality of cameras at the same station or at another station can be directed toward an area or a field that was covered by the first camera during the first mode. For instance, a camera from a second station at a second geolocation can be directed towards an area or a region covered by the first camera during the first mode. For instance, one or more cameras of the plurality of cameras can cover one or more fields of view or angular ranges to account for an obstacle (e.g., supporting pole carrying the first camera) in the field of view. For example, one or more remaining cameras of the plurality of cameras can have their ranges of angles adjusted to account for the coverage of the first camera. For example, one or more cameras covering the range of the first camera can offset their bearings to account for the distance between the locations or axis of those one or more cameras and the location or axis of the first camera.

E. Computer Architecture

Figure 18:
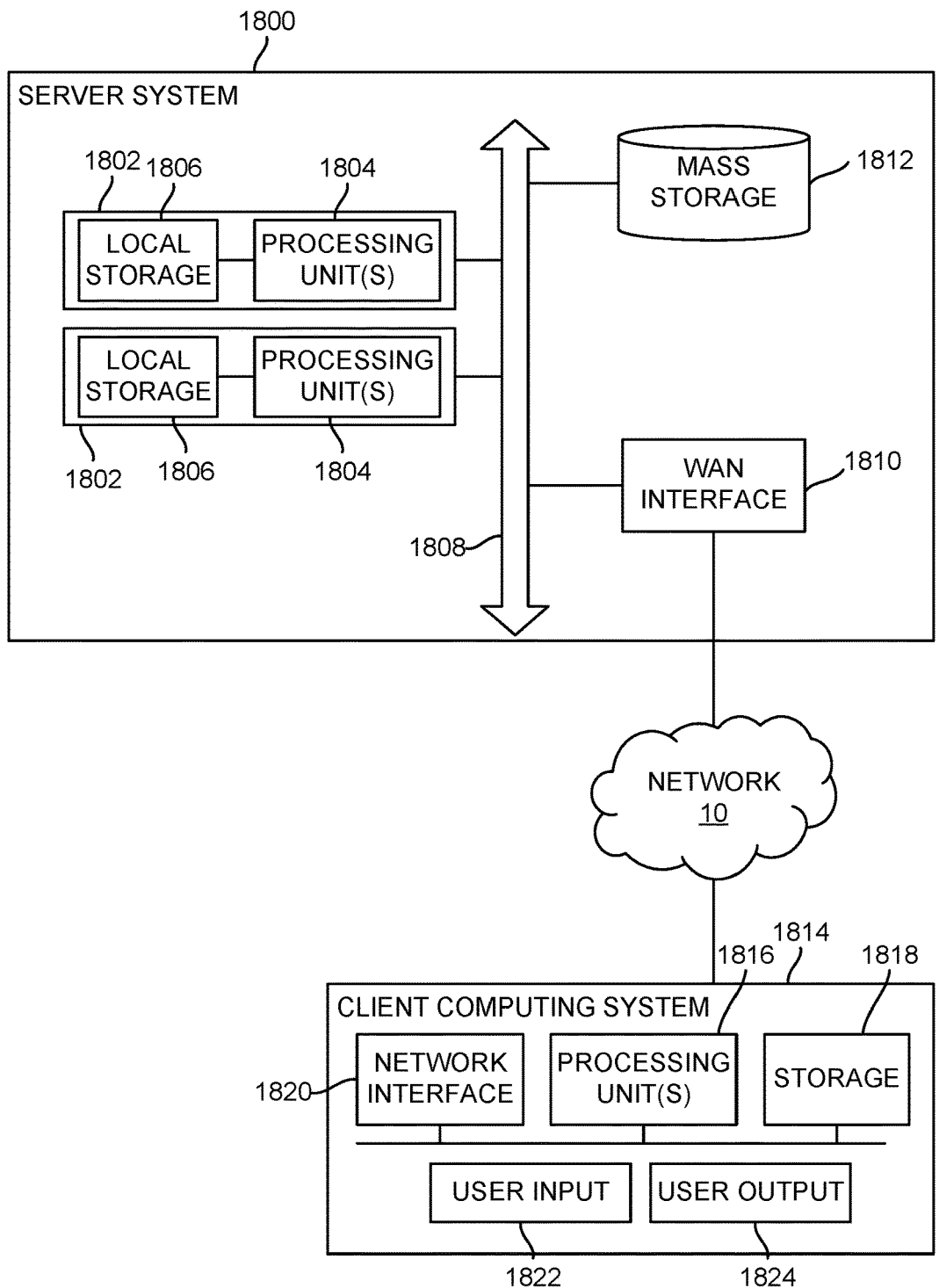
FIG. 18 illustrates a block diagram of a server system and a client computer system according to embodiments of the present disclosure.

Various operations described herein can be implemented on computer systems, which can be of generally conventional design. FIG. 18 shows a simplified block diagram of a representative server system 1800 and client computer system 1814 usable to implement certain embodiments of the present disclosure. In various embodiments, server system 1800 or similar systems can implement services or servers described herein or portions thereof. For example, the server system 1800 may share one or more features as the sever(s) 200 described herein. Client computing system 1814 or similar systems can implement clients described herein. For example, the client computing system 1814 may share one or more features as the computing device(s) 304 described herein. The system 100 and others described herein can be similar to the server system 1800.

Server system 1800 can have a modular design that incorporates a number of modules 1802 (e.g., blades in a blade server embodiment); while two modules 1802 are shown, any number can be provided. Each module 1802 can include processing unit(s) 1804 and local storage 1806.

Processing unit(s) 1804 can include a single processor, which can have one or more cores, or multiple processors. In some embodiments, processing unit(s) 1804 can include a general-purpose primary processor as well as one or more special-purpose co-processors such as graphics processors, digital signal processors, or the like. In some embodiments, some or all processing units 1804 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1804 can execute instructions stored in local storage 1806. Any type of processors in any combination can be included in processing unit(s) 1804.

Local storage 1806 can include volatile storage media (e.g., conventional DRAM, SRAM, SDRAM, or the like) and/or non-volatile storage media (e.g., magnetic or optical disk, flash memory, or the like). Storage media incorporated in local storage 1806 can be fixed, removable or upgradeable as desired. Local storage 1806 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1804 need at runtime. The ROM can store static data and instructions that are needed by processing unit(s) 1804. The permanent storage device can be a non-volatile read-and-write memory device that can store instructions and data even when module 1802 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 1806 can store one or more software programs to be executed by processing unit(s) 1804, such as an operating system and/or programs implementing various server functions such as functions of the server 200 of FIG. 1A, or any other system described herein.

"Software" refers generally to sequences of instructions that, when executed by processing unit(s) 1804 cause server system 1800 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 1804. Software can be implemented as a single program or a collection of separate programs or program modules that interact as desired. From local storage 1806 (or non-local storage described below), processing unit(s) 1804 can retrieve program instructions to execute and data to process in order to execute various operations described above.

In some server systems 1800, multiple modules 1802 can be interconnected via a bus or other interconnect 1808, forming a local area network that supports communication between modules 1802 and other components of server system 1800. Interconnect 1808 can be implemented using various technologies including server racks, hubs, routers, etc.

A wide area network (WAN) interface 1810 can provide data communication capability between the local area network (interconnect 1808) and a larger network (e.g., the network 10), such as the Internet. Conventional or other activities technologies can be used, including wired (e.g., Ethernet, IEEE 802.3 standards) and/or wireless technologies (e.g., Wi-Fi, IEEE 802.11 standards).

In some embodiments, local storage 1806 is intended to provide working memory for processing unit(s) 1804, providing fast access to programs and/or data to be processed while reducing traffic on interconnect 1808. Storage for larger quantities of data can be provided on the local area network by one or more mass storage subsystems 1812 that can be connected to interconnect 1808. Mass storage subsystem 1812 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1812. In some embodiments, additional data storage resources may be accessible via WAN interface 1810 (potentially with increased latency).

Server system 1800 can operate in response to requests received via WAN interface 1810. For example, one of modules 1802 can implement a supervisory function and assign discrete tasks to other modules 1802 in response to received requests. Conventional work allocation techniques can be used. As requests are processed, results can be returned to the requester via WAN interface 1810. Such operation can generally be automated. Further, in some embodiments, WAN interface 1810 can connect multiple server systems 1800 to each other, providing scalable systems capable of managing high volumes of activity. Conventional or other techniques for managing server systems and server farms (collections of server systems that cooperate) can be used, including dynamic resource allocation and reallocation.

Server system 1800 can interact with various user-owned or user-operated devices via a wide-area network such as the Internet. An example of a user-operated device is shown in FIG. 18 as client computing system 1814. Client computing system 1814 can be implemented, for example, as an edge computer (e.g., the station computing device(s) 104) and/or a consumer device (e.g., the computing device(s) 304) such as a smartphone, other mobile phone, tablet computer, wearable computing device (e.g., smart watch, eyeglasses), desktop computer, laptop computer, and so on.

For example, client computing system 1814 can communicate via WAN interface 1810. Client computing system 1814 can include conventional computer components such as processing unit(s) 1816, storage device 1818, network interface 1820, user input device 1822, and user output device 1824. Client computing system 1814 can be a computing device implemented in a variety of form factors, such as a desktop computer, laptop computer, tablet computer, smartphone, other mobile computing device, wearable computing device, or the like.

Processor 1816 and storage device 1818 can be similar to processing unit(s) 1804 and local storage 1806 described above. Suitable devices can be selected based on the demands to be placed on client computing system 1814; for example, client computing system 1814 can be implemented as a "thin" client with limited processing capability or as a high-powered computing device. Client computing system 1814 can be provisioned with program code executable by processing unit(s) 1816 to enable various interactions with server system 1800 of a message management service such as accessing messages, performing actions on messages, and other interactions described above. Some client computing systems 1814 can also interact with a messaging service independently of the message management service.

Network interface 1820 can provide a connection to a wide area network (e.g., the Internet) to which WAN interface 1810 of server system 1800 is also connected. In various embodiments, network interface 1820 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1822 can include any device (or devices) via which a user can provide signals to client computing system 1814; client computing system 1814 can interpret the signals as indicative of particular user requests or information. In various embodiments, user input device 1822 can include any or all of a keyboard, touch pad, touch screen, mouse or other pointing device, scroll wheel, click wheel, dial, button, switch, keypad, microphone, and so on.

User output device 1824 can include any device via which client computing system 1814 can provide information to a user. For example, user output device 1824 can include a display to display images generated by or delivered to client computing system 1814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1824 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1804 and 1816 can provide various functionality for server system 1800 and client computing system 1814, including any of the functionality described herein as being performed by a server or client, or other functionality associated with message management services.

It will be appreciated that server system 1800 and client computing system 1814 are illustrative and that variations and modifications are possible. Computer systems used in connection with embodiments of the present disclosure can have other capabilities not specifically described here. Further, while server system 1800 and client computing system 1814 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

The machine learning model may be periodically and/or continuously trained. For instance, as the recommendations (or other predictions and derived information) are presented to the end-user, the system may monitor the end-user's behavior (e.g., whether a recommendation was accepted/rejected or whether a predicted attribute was revised). The monitored data may be fed back into the machine learning model to improve its accuracy. The machine learning model can re-calibrate itself accordingly, such that the results are customized for the end-user.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in a certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field-programmable gate array (FPGA), and/or an application-specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having." "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What we claim is:

1. A system, comprising:
one or more processors coupled with memory and configured to:
obtain, from a first image capture device in accordance with a first mode, a first set of images corresponding to a first range of angles about an axis;
obtain, from a second image capture device in accordance with the first mode, a second set of images corresponding to a second range of angles about the axis;
receive a request to obtain an image corresponding to a first angle about the axis;
determine that the first angle corresponds to the first range of angles of the first image capture system;
interrupt, responsive to the determination, the first mode according to which the first image capture device is obtaining images;
cause, responsive to the interruption of the first mode, the second image capture device to obtain a third set of images corresponding to the first range of angles about the axis in accordance with a second mode; and
cause the first image capture device to obtain an image corresponding to the first angle.

2. The system of claim 1, wherein the one or more processors are configured to cause, responsive to the interruption of the first mode, the second image capture device to obtain the third set of images corresponding to the first range of angles about the axis and a fourth set of images corresponding to the second range of angles about the axis.

3. The system of claim 1, wherein to obtain the first set of images, the first image capture device is configured to obtain images at a first zoom level and wherein the one or more processors are configured to receive a request to cause the first image capture device to obtain an image at a second zoom level and wherein the one or more processors are configured to interrupt the first mode responsive to the request.

4. The system of claim 1, wherein the one or more processors are configured to cause the interruption of the first mode responsive to receiving a request to cause the first image capture device to restrict the first image capture device from obtaining images in accordance with the first mode.

5. The system of claim 1, wherein to obtain the first set of images from the first image capture device in accordance with the first mode, the one or more processors is configured to obtain each image of the first set of images in accordance with a timing schedule, wherein the first image capture device is configured to capture a first image of the first set of images corresponding to a first subset of the first range of angles at a first time corresponding to the timing schedule and a second image of the first set of images corresponding to a second subset of the first range of angles at a second time corresponding to the timing schedule.

6. The system of claim 1, wherein the first set of images is obtained at a first time interval and the third set of images is obtained at a second time interval subsequent to the first time interval.

7. The system of claim 1, wherein the one or more processors are configured to:
cause, on a user interface at a client device, presentation of the first set of images;
receive, from the client device, a request to initiate the second mode via the user interface; and
interrupt the first mode responsive to the request to initiate the second mode.

8. The system of claim 1, wherein the one or more processors are configured to:
determine that a time duration for the interruption of the first mode has expired; and
reset, responsive to the expiration of the time duration, the first image capture device to the first mode to obtain a new first set of images corresponding to the first range of angles about the axis.

9. The system of claim 1, wherein the one or more processors are configured to:
receive the request from a client device to obtain an image of an object identified within the first set of images, the object corresponding to a smoke of a fire;
determine a zoom setting according to which to obtain the image of the object; and
transmit to the client device the image of the object captured according to the zoom setting, the image including the smoke of the fire.

10. A method, comprising:
obtaining, by one or more processors coupled with memory, from a first image capture device in accordance with a first mode, a first set of images corresponding to a first range of angles about an axis;
obtaining, by the one or more processors, from a second image capture device in accordance with the first mode, a second set of images corresponding to a second range of angles about the axis;
receiving, by the one or more processors, a request to obtain an image corresponding to a first angle about the axis;
determining, by the one or more processors, that the first angle correspond s to the first range of angles of the first image capture system;
interrupting, by the one or more processors, responsive to the determination, the first mode according to which the first image capture device is obtaining images;
causing, by the one or more processors, responsive to the interruption of the first mode, the second image capture device to obtain a third set of images corresponding to the first range of angles about the axis in accordance with a second mode; and
causing, by the one or more processors, the first image capture device to obtain an image corresponding to the first angle.

11. The method of claim 10, comprising:
causing, by the one or more processors, responsive to the interruption of the first mode, the second image capture device to obtain the third set of images corresponding to the first range of angles about the axis and a fourth set of images corresponding to the second range of angles about the axis.

12. The method of claim 10, comprising:
configuring, by the one or more processors, the first image capture device to obtain images at a first zoom level;
configuring, by the one or more processors, to receive a request to cause the first image capture device to obtain an image at a second zoom level; and
interrupting, by the one or more processors, the first mode responsive to the request.

13. The method of claim 10, comprising:
causing, by the one or more processors, the interruption of the first mode responsive to receiving a request to cause the first image capture device to restrict the first image capture device from obtaining images in accordance with the first mode.

14. The method of claim 10, comprising:
configuring, by the one or more processors, the first image capture device to obtain each image of the first set of images in accordance with a timing schedule of the first mode, wherein the first image capture device is configured to capture a first image of the first set of images corresponding to a first subset of the first range of angles at a first time corresponding to the timing schedule and a second image of the first set of images corresponding to a second subset of the first range of angles at a second time corresponding to the timing schedule.

15. The method of claim 10, comprising:
configuring, by the one or more processors, the first image capture device to obtain the first set of images at a first time interval; and
configuring, by the one or more processors, the second image capture device to obtain the third set of images at a second time interval subsequent to the first time interval.

16. The method of claim 10, comprising:
causing, by the one or more processors, on a user interface at a client device, presentation of the first set of images;
receiving, by the one or more processors, from the client device, a request to initiate the second mode via the user interface; and
interrupting, by the one or more processors, the first mode responsive to the request to initiate the second mode.

17. The method of claim 10, comprising:
determining, by the one or more processors, that a time duration for the interruption of the first mode has expired; and
resetting, by the one or more processors, responsive to the expiration of the time duration, the first image capture device to the first mode to obtain a new first set of images corresponding to the first range of angles about the axis.

18. The method of claim 10, comprising:
receiving, by the one or more processors, the request from a client device to obtain an image of an object identified within the first set of images, the object corresponding to a smoke of a fire;
determining, by the one or more processors, a zoom setting according to which to obtain the image of the object; and transmitting, by the one or more processors, to the client device the image of the object captured according to the zoom setting, the image including the smoke of the fire.

19. A non-transitory computer readable medium storing instructions that, when executed by one or more processors, cause the one or more processors to:
obtain, from a first image capture device in accordance with a first mode, a first set of images corresponding to a first range of angles about an axis;
obtain, from a second image capture device in accordance with the first mode, a second set of images corresponding to a second range of angles about the axis;
receive a request to obtain an image corresponding to a first angle about the axis;
determine that the first angle corresponds to the first range of angles of the first image capture system;
interrupt, responsive to the determination, the first mode according to which the first image capture device is obtaining images;
cause, responsive to the interruption of the first mode, the second image capture device to obtain a third set of images corresponding to the first range of angles about the axis in accordance with a second mode; and
cause the first image capture device to obtain an image corresponding to the first angle.

20. The non-transitory computer readable medium of claim 19, comprising the instructions, such that, when executed, cause the one or more processors to:
cause, responsive to the interruption of the first mode, the second image capture device to obtain the third set of images corresponding to the first range of angles about the axis and a fourth set of images corresponding to the second range of angles about the axis.

* * * * *